United States Patent
Yamaguchi et al.

(10) Patent No.: US 11,958,392 B2
(45) Date of Patent: Apr. 16, 2024

(54) SEAT PAD MANUFACTURING METHOD

(71) Applicant: Archem Inc., Tokyo (JP)

(72) Inventors: Yukiko Yamaguchi, Tokyo (JP);
Taisuke Yonezawa, Tokyo (JP);
Yoshiyuki Takahashi, Tokyo (JP)

(73) Assignee: Archem Inc., Tokyo (JP)

( * ) Notice: Subject to any disclaimer, the term of this patent is extended or adjusted under 35 U.S.C. 154(b) by 172 days.

(21) Appl. No.: 18/062,017

(22) Filed: Dec. 6, 2022

(65) Prior Publication Data

US 2023/0116023 A1 Apr. 13, 2023

Related U.S. Application Data

(62) Division of application No. 17/292,934, filed as application No. PCT/JP2019/039381 on Oct. 4, 2019.

(30) Foreign Application Priority Data

Nov. 20, 2018 (JP) .................................. 2018-217627

(51) Int. Cl.
*B60N 2/70* (2006.01)
*B60N 2/68* (2006.01)

(52) U.S. Cl.
CPC .......... *B60N 2/7017* (2013.01); *B60N 2/686* (2013.01)

(58) Field of Classification Search
CPC ..... B60N 2/7017; B60N 2/7035; B60N 2/686
See application file for complete search history.

(56) References Cited

U.S. PATENT DOCUMENTS 3,727,980 A 4/1973 Tischler
3,840,269 A * 10/1974 Ambrose ................ B29C 44/12
297/452.64

(Continued)

FOREIGN PATENT DOCUMENTS

CN 1942116 A 4/2007
CN 203601044 U 5/2014

(Continued)

OTHER PUBLICATIONS

Dec. 29, 2022, Office Action issued by the United States Patent and Trademark Office in the U.S. Appl. No. 17/292,934.

(Continued)

*Primary Examiner* — Philip F Gabler
(74) *Attorney, Agent, or Firm* — KENJA IP LAW PC

(57) ABSTRACT

A seat pad manufacturing method is provided. The method includes disposing a sheet member inside a foaming mold for shaping a seat pad, then injecting a foaming resin material into the foaming mold and foaming a resin foamed body through mold clamping, and demolding the resin foamed body in a state in which the sheet member is buried in the resin foamed body. Both end parts of the sheet member in the right-left direction and both end parts of the sheet member in the extending direction are each temporarily fastened to the surface of the mold through a fastener. The foaming resin material is injected into a space between the mold surface and the sheet member. A central part of the sheet member deforms into a shape curved in a convex shape as the sheet member is pressed upward through expansion of the foaming resin material.

5 Claims, 32 Drawing Sheets

(56) References Cited

U.S. PATENT DOCUMENTS

| | | | |
|---|---|---|---|
| 3,853,352 A * | 12/1974 | Ambrose | A47C 7/20 |
| | | | 297/452.57 |
| 3,961,823 A | 6/1976 | Caudill, Jr. | |
| 4,191,424 A | 3/1980 | Mundell | |
| 4,579,389 A | 4/1986 | Shimbori et al. | |
| 5,226,188 A | 7/1993 | Liou | |
| 6,428,095 B1 | 8/2002 | Hirata | |
| 7,533,941 B2 | 5/2009 | Saitou et al. | |
| 8,506,016 B2 | 8/2013 | Mizobata | |
| 8,566,987 B1 * | 10/2013 | Burge | A47C 7/024 |
| | | | 5/655.9 |
| 9,056,568 B2 | 6/2015 | Matsumoto et al. | |
| 9,073,469 B2 | 7/2015 | Fujikawa et al. | |
| 9,167,901 B2 | 10/2015 | Suenaga et al. | |
| 9,283,867 B2 * | 3/2016 | Nil | B60N 2/002 |
| 9,427,901 B2 * | 8/2016 | Itabashi | B29C 44/588 |
| 10,470,577 B2 * | 11/2019 | Tobata | B29C 43/18 |
| 2014/0139003 A1 | 5/2014 | Fujikawa et al. | |
| 2018/0297490 A1 | 10/2018 | Murata et al. | |
| 2022/0001779 A1 | 1/2022 | Yamaguchi et al. | |

FOREIGN PATENT DOCUMENTS

| | | |
|---|---|---|
| CN | 105539232 A | 5/2016 |
| CN | 108724580 A | 11/2018 |
| JP | S5353533 Y2 | 12/1978 |
| JP | H1158329 A | 3/1999 |
| JP | 2005131277 A | 5/2005 |
| JP | 2008212345 A | 9/2008 |
| JP | 2012050693 A | 3/2012 |
| JP | 2017000586 A | 1/2017 |
| JP | 2017070628 A | 4/2017 |
| JP | 2017071368 A | 4/2017 |
| JP | 2018175483 A | 11/2018 |
| WO | 2005077219 A1 | 8/2005 |

OTHER PUBLICATIONS

Response to Office Action filed Feb. 22, 2023 for the U.S. Appl. No. 17/292,934.

Dec. 17, 2019, International Search Report issued in the International Patent Application No. PCT/JP2019/039381.

Jul. 13, 2022, search result of Office Action issued by the China National Intellectual Property Administration in the corresponding Chinese Patent Application No. 201980076263.1.

May 25, 2021, International Preliminary Report on Patentability issued in the International Patent Application No. PCT/JP2019/039381.

Oct. 5, 2022, Office Action issued by the United States Patent and Trademark Office in the U.S. Appl. No. 17/292,934.

Response to Office Action filed on Nov. 30, 2022 for U.S. Appl. No. 17/292,934.

Mar. 6, 2023, Office Action issued by the United States Patent and Trademark Office in the U.S. Appl. No. 17/292,934.

Response to Office Action filed May 12, 2023, for the U.S. Appl. No. 17/292,934.

Apr. 12, 2023, search result of Office Action issued by the China National Intellectual Property Administration in the corresponding Chinese Patent Application No. 201980076263.1.

May 31, 2023, Office Action issued by the United States Patent and Trademark Office in the U.S. Appl. No. 17/292,934.

Response to Office Action filed Aug. 15, 2023 for the U.S. Appl. No. 17/292,934.

* cited by examiner

FIG. 2
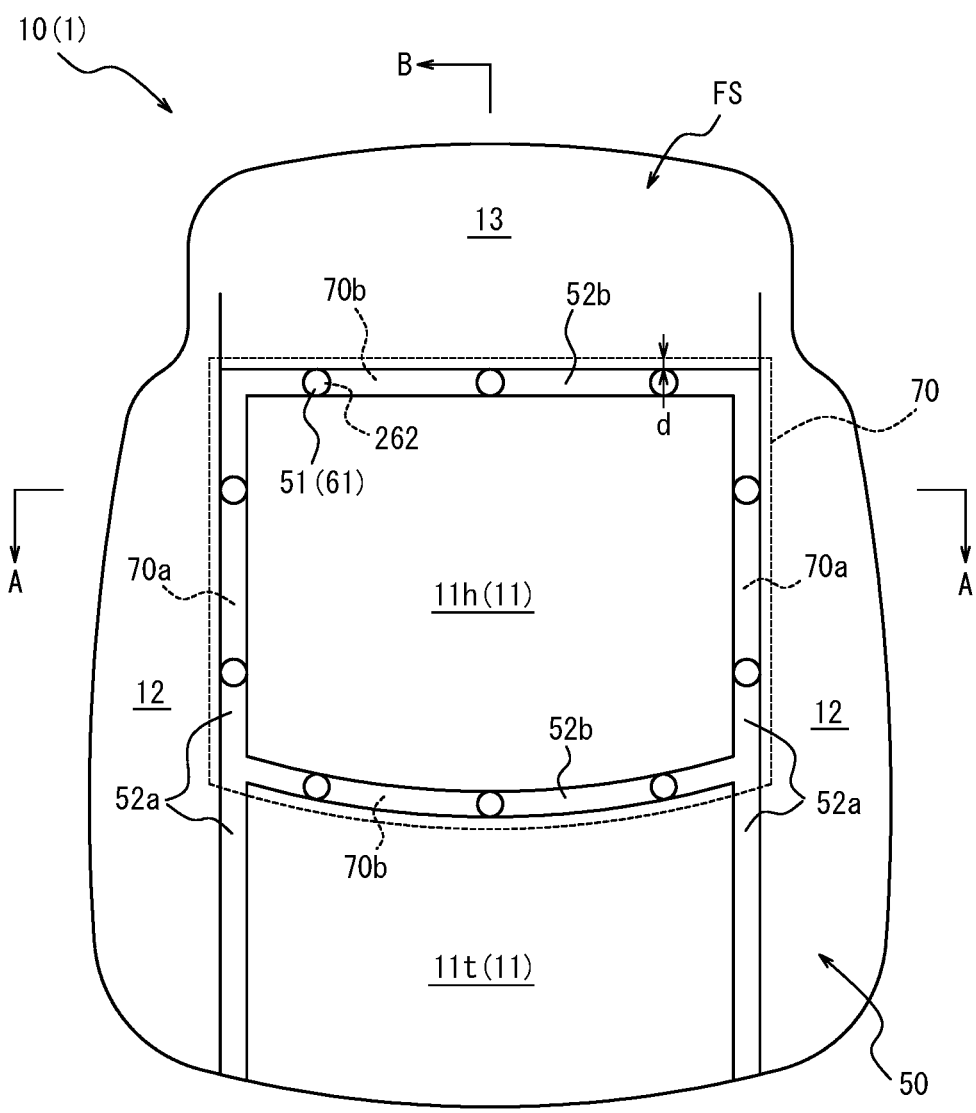
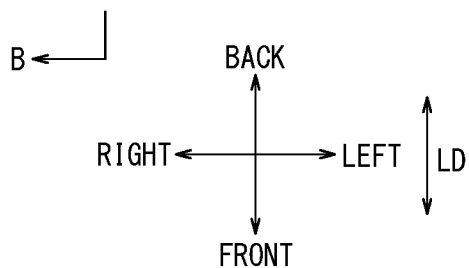

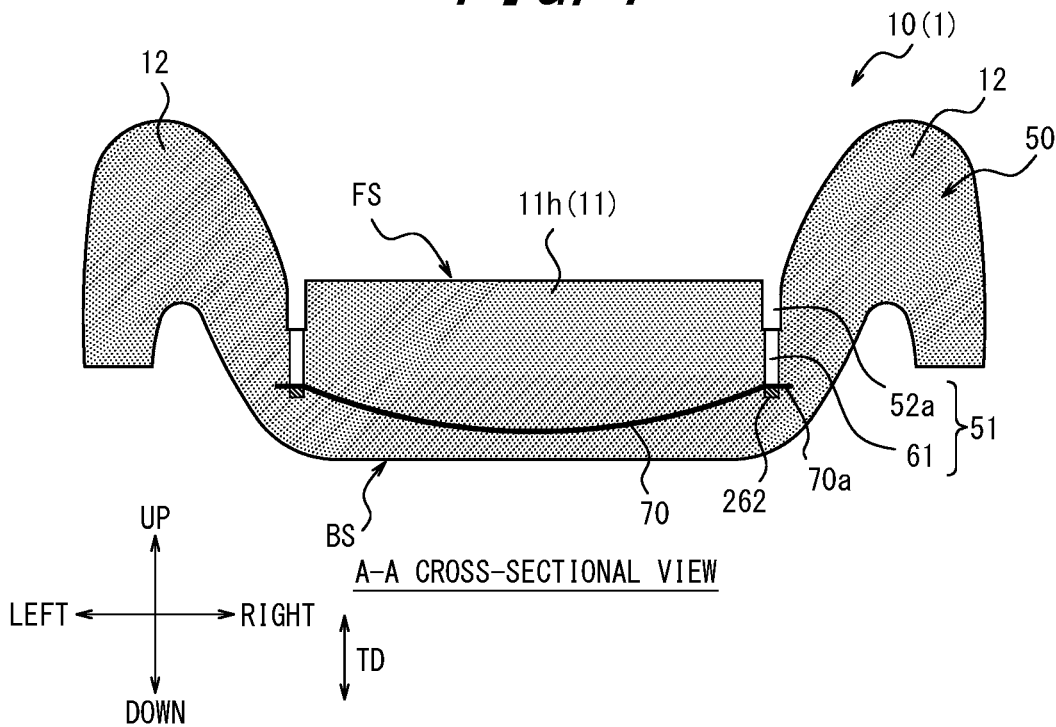
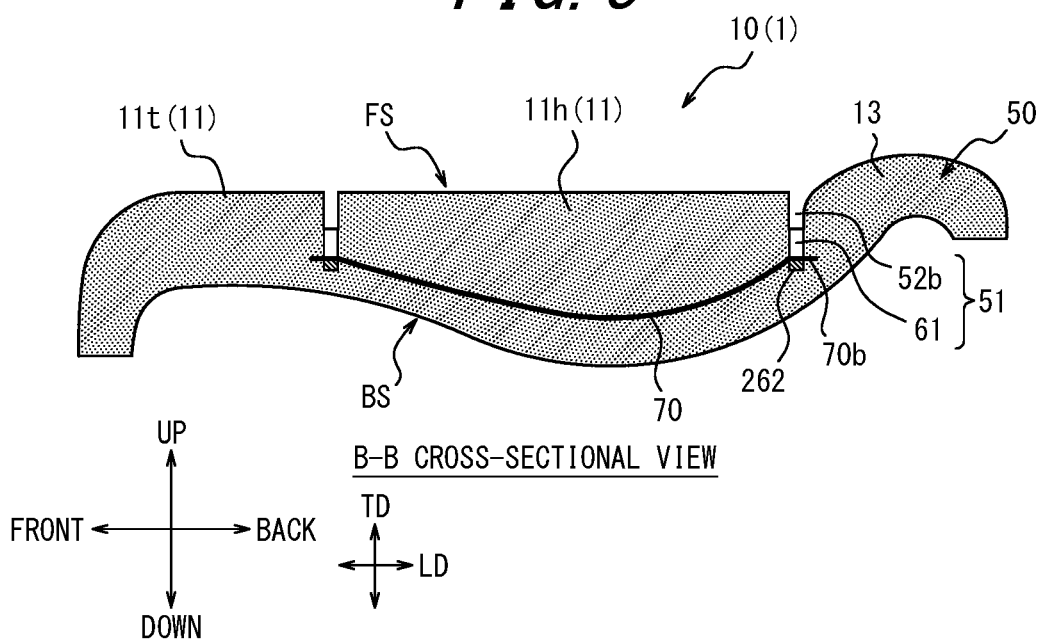

C'-C' CROSS-SECTIONAL VIEW

D'-D' CROSS-SECTIONAL VIEW

FIG. 25
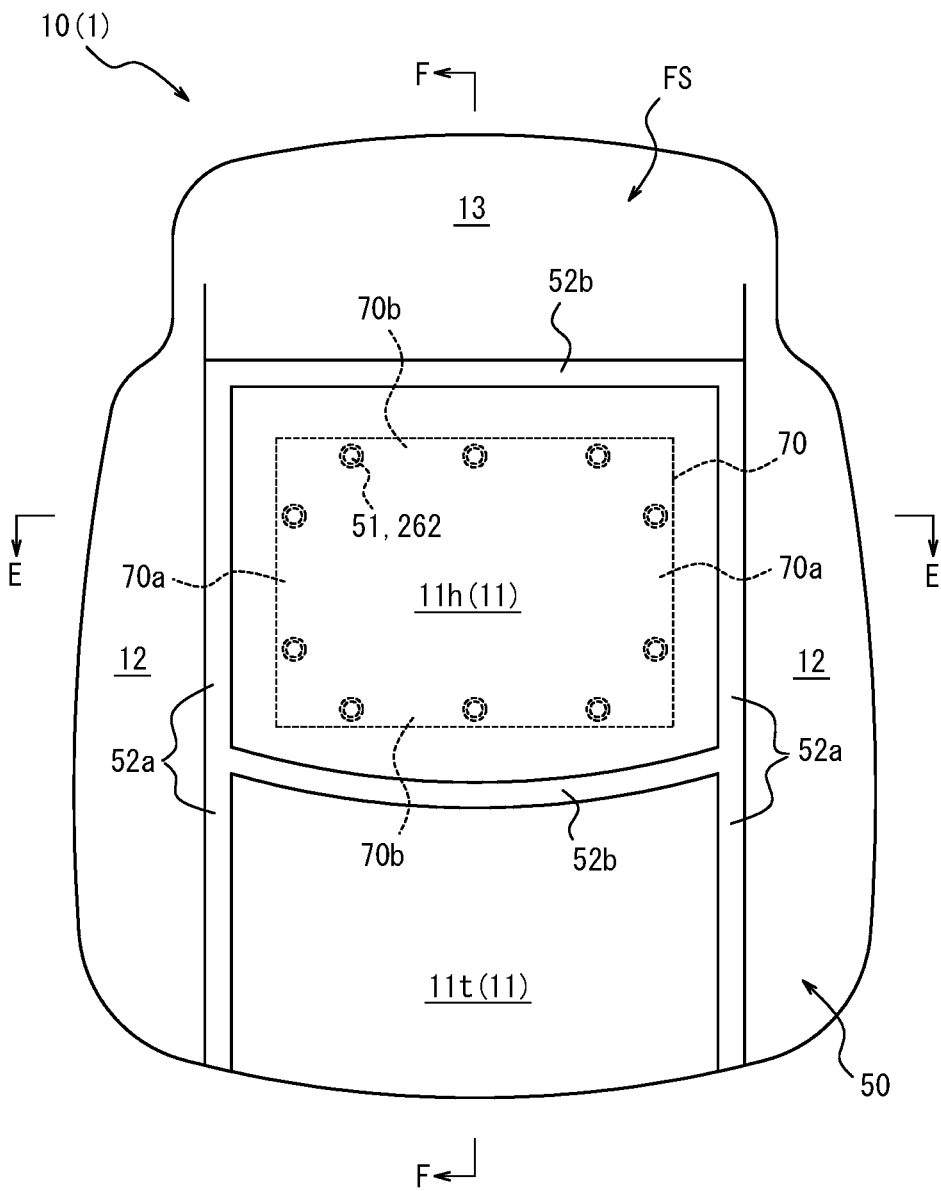
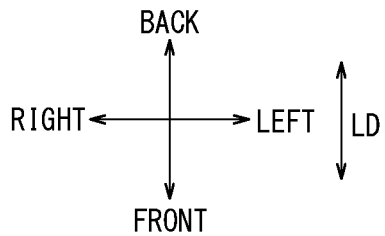

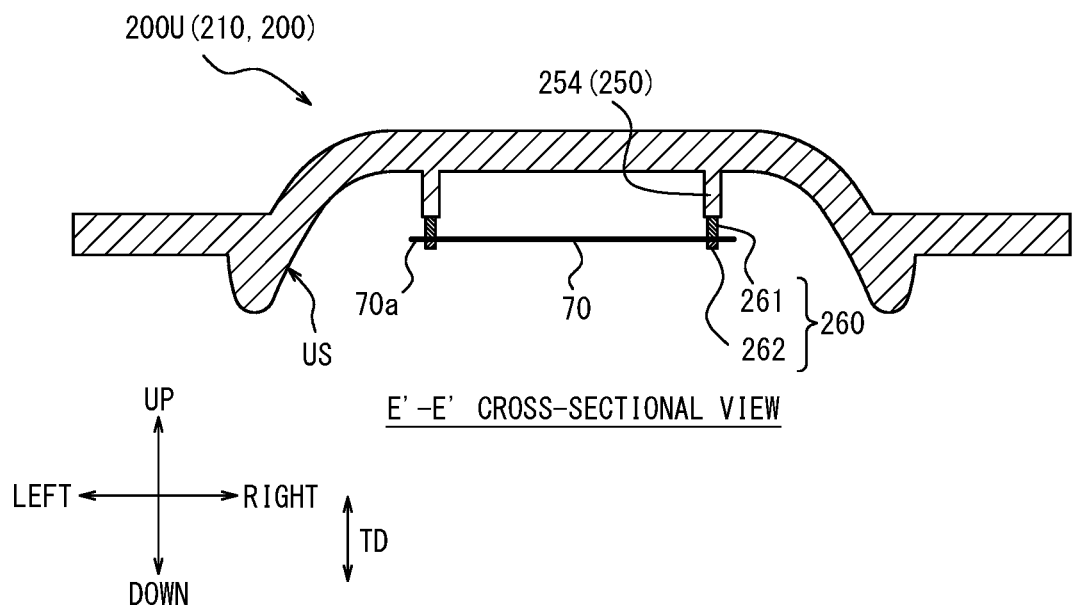
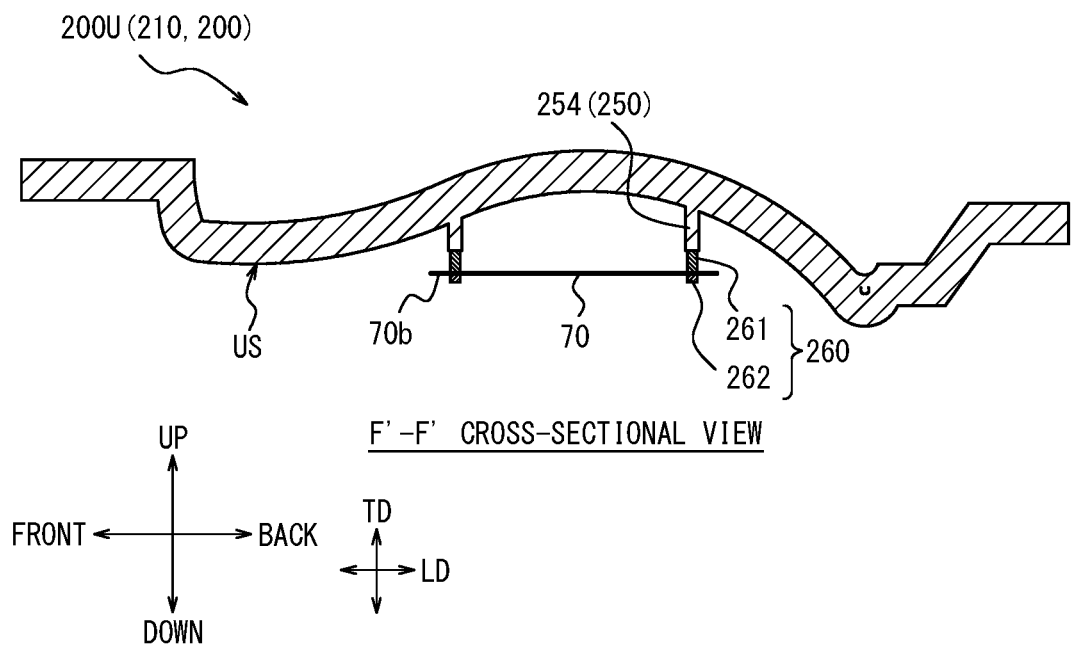

G-G CROSS-SECTIONAL VIEW

H-H CROSS-SECTIONAL VIEW

SEAT PAD MANUFACTURING METHOD

CROSS-REFERENCE TO RELATED APPLICATIONS

The present application is a divisional application of U.S. patent application Ser. No. 17/292,934 filed May 11, 2021, which is a National Stage Application of PCT/JP2019/039381 filed Oct. 4, 2019, which claims priority of Japanese Patent Application No. 2018-217627 filed Nov. 20, 2018. The disclosures of the prior applications are hereby incorporated by reference herein in their entirety.

TECHNICAL FIELD

The present disclosure relates to a seat pad and a seat pad manufacturing method.

BACKGROUND

In a conventional seat pad, a flat cloth body is buried in a resin foamed body (for example, PTL 1). This cloth body has a flat shape. According to PTL 1, it is possible to provide improved seating comfort with such a configuration.

CITATION LIST

Patent Literature

PTL 1: Japanese Patent Laid-Open No. 2017-586

SUMMARY

Technical Problem

However, the conventional seat pad has room for further improvement on seating comfort.

The present disclosure is intended to provide a seat pad capable of providing improved seating comfort, and a seat pad manufacturing method by which a seat pad capable of providing improved seating comfort can be obtained.

Solution to Problem

A seat pad of the present disclosure is a seat pad comprising:
  a resin foamed body; and
  a sheet member buried in the resin foamed body,
  wherein when a direction orthogonal to a right-left direction and a thickness direction of the seat pad is referred to as an extending direction of the seat pad,
  at least a central part of the sheet member is curved in a convex shape on a back surface side of the seat pad in the extending direction.

A seat pad manufacturing method of the present disclosure is a seat pad manufacturing method comprising:
  a sheet disposition step of disposing a sheet member inside a foaming mold for shaping a seat pad;
  a foaming step of injecting a foaming resin material into the foaming mold and foaming a resin foamed body through mold clamping after the sheet disposition step; and
  a demolding step of demolding the resin foamed body in a state in which the sheet member is buried in the resin foamed body, wherein
  the foaming mold includes a lower mold piece having a lower-mold-piece shaping surface for shaping a surface of the seat pad on a seated person side, and an upper mold piece having an upper-mold-piece shaping surface for shaping a back surface of the seat pad, and
  when a direction orthogonal to a right-left direction and a thickness direction of the seat pad is referred to as an extending direction of the seat pad,
  in the sheet disposition step, both end parts of the sheet member in the right-left direction and both end parts of the sheet member in the extending direction are each temporarily fastened to the lower-mold-piece shaping surface or the upper-mold-piece shaping surface through one or a plurality of fasteners, and
  in the foaming step, the foaming resin material is injected into a space between the lower-mold-piece shaping surface and the sheet member, and at least a central part of the sheet member deforms into a shape curved in a convex shape on the upper-mold-piece shaping surface side in each of the right-left direction and the extending direction as the sheet member is pressed upward to the upper-mold-piece shaping surface side through expansion of the foaming resin material.

Advantageous Effect

According to the present disclosure, it is possible to provide a seat pad capable of providing improved seating comfort, and a seat pad manufacturing method by which a seat pad capable of providing improved seating comfort can be obtained.

BRIEF DESCRIPTION OF THE DRAWINGS

In the accompanying drawings:

FIG. 2 is a plan view illustrating a seat pad according to a first embodiment of the present disclosure, which is formed as a cushion pad;

FIG. 4 is a right-left direction cross-sectional view illustrating the cushion pad in FIGS. 2 and 3 at a section taken along line A-A in FIGS. 2 and 3;

FIG. 5 is a front-back direction (extending direction) cross-sectional view illustrating the cushion pad in FIGS. 2 and 3 at a section taken along line B-B in FIGS. 2 and 3;

FIG. 25 is a plan view illustrating a seat pad according to a third embodiment of the present disclosure, which is formed as a cushion pad;

FIG. 29 is a right-left direction cross-sectional view illustrating the upper mold piece in FIG. 28 at a section taken along line E'-E' in FIG. 28;

FIG. 30 is a front-back direction (extending direction) cross-sectional view illustrating the upper mold piece in FIG. 28 at a section taken along line F'-F' in FIG. 28;

DETAILED DESCRIPTION

Figure 1:
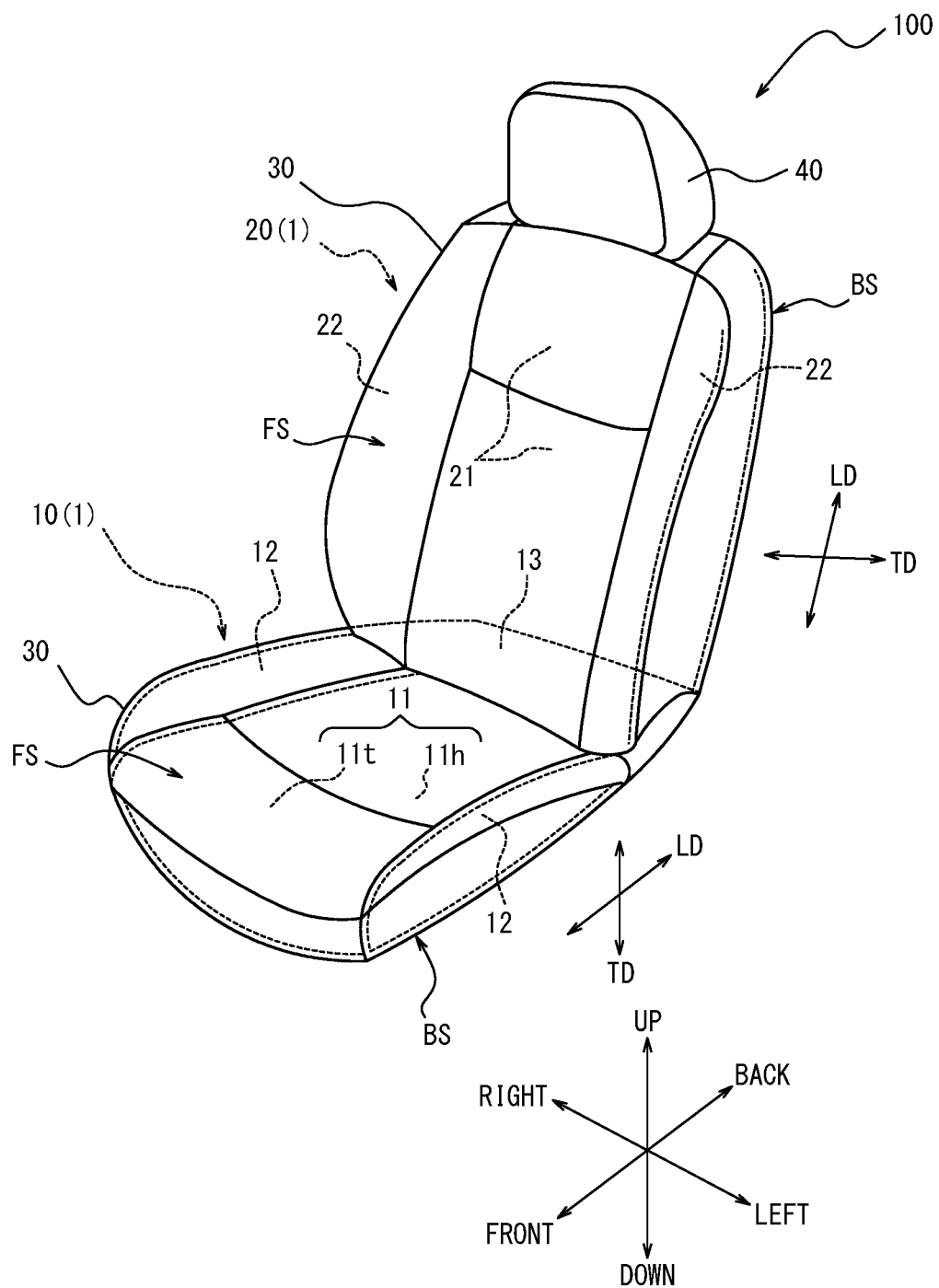
FIG. 1 is a perspective view schematically illustrating a car seat including a seat pad according to an embodiment of the present disclosure.

A seat pad of the present disclosure, and a seat pad manufactured by a seat pad manufacturing method of the present disclosure are preferably used for an optional vehicle seat and an optional vehicle seat pad, and are particularly preferably used for a car seat and a car seat pad.

Embodiments of the seat pad and the seat pad manufacturing method according to the present disclosure will be exemplarily described below with reference to the accompanying drawings.

Any common component in the drawings is denoted by the same reference sign.

FIG. 1 is a perspective view schematically illustrating an exemplary car seat 100 including a seat pad 1 according to an optional embodiment of the present disclosure.

As illustrated with dashed lines in FIG. 1, the seat pad 1 is formed as a car seat pad and includes a cushion pad 10 on which a seated person sits and a back pad 20 for supporting the back of the seated person. The cushion pad 10 and the back pad 20 each serves as the seat pad 1. Hereinafter, the cushion pad 10 or the back pad 20 may also be simply referred to as the "seat pad 1". The car seat 100 includes, in addition to the seat pad 1, for example, a top skin 30 covering a top side (seated person side) of the seat pad 1, a frame (not illustrated) supporting the cushion pad 10 from below, a frame (not illustrated) installed on a back side of the back pad 20, and a head rest installed above the back pad 20 to support the head of the seated person. The top skin 30 is made of, for example, a material (cloth or the like) that allows ventilation. In the example illustrated in FIG. 1, the cushion pad 10 and the back pad 20 are separated from each other, but may be integrated with each other.

In the example illustrated in FIG. 1, the head rest 40 is separated from the back pad 20, but may be integrated with the back pad 20.

As illustrated with dashed lines in FIG. 1, the cushion pad 10 includes a main pad part (also referred to as a "seating part") 11 formed to support a hip region and a femoral region of the seated person from below, a pair of side pad parts 12 positioned on the right and left sides of the main pad part 11 and protruding beyond the main pad part 11 to support the seated person from the right and left sides, and a back-pad opposing part 13 positioned on the back side of the main pad part 11 and disposed opposite to the back pad 20 in an up-down direction. The main pad part 11 is constituted by a femoral region-placed part 11t formed to support the femoral region of the seated person from below, and an under-hip part 11h positioned on the back side of the femoral region-placed part 11t to support the hip region of the seated person from below.

The back pad 20 includes a main pad part 21 formed to support the back of the seated person from the back side, and a pair of side pad parts 22 positioned on the right and left sides of the main pad part 21 and protruding on the front side of the main pad part 21 to support the seated person from the right and left sides.

In the present specification, when the car seat 100 and the seat pad 1 are described, "up", "down", "left", "right", "front", and "back" directions when viewed by the seated person who sits on the car seat 100 are simply referred to as, for example, "up", "down", "left", "right", "front", "back", respectively, as illustrated in FIGS. 1 to 5, FIGS. 17 to 19, FIGS. 25 to 27, and FIGS. 35 to 37. In addition, in the present specification, when a foaming mold 200 for shaping the seat pad 1 is described, directions corresponding to "left", "right", "front", and "back" directions when viewed by the seated person who sits on the seat pad 1 shaped by the foaming mold 200 are simply referred to as, for example, "left", "right", "front", and "back", respectively, and "up" and "down" in the vertical direction at foaming are simply referred to as, for example, "up" and "down", respectively, as illustrated in FIGS. 8 to 16, FIGS. 20 to 24, FIGS. 28 to 34, and FIGS. 38 to 40.

In the present specification, an "extending direction (LD) of the seat pad 1" (hereinafter simply also referred to as "extending direction (LD)") is a direction orthogonal to the right-left direction and the thickness direction (TD) of the seat pad 1, and as illustrated in FIG. 1, is the front-back direction in a case of the cushion pad 10 and is a direction in which the main pad part 21 extends from a lower surface of the main pad part 21 of the back pad 20 to an upper surface thereof in a case of the back pad 20.

As illustrated in FIG. 1, the "thickness direction (TD) of the seat pad 1" (hereinafter simply also referred to as "thickness direction (TD)") is the up-down direction in a case of the cushion pad and is a direction in which the main pad part 21 extends from a surface (front surface) FS of the main pad part 21 of the back pad 20 on the seated person side to a back surface BS thereof in a case of the back pad 20.

The "surface (front surface; FS) of the seat pad 1 on the seated person side" is an upper surface in a case of the cushion pad 10 and is a front surface in a case of the back pad 20. The "back surface (B S)" of the seat pad 1 is a lower surface in a case of the cushion pad 10 and is a rear surface in a case of the back pad 20.

First Embodiment

The seat pad 1 according to a first embodiment of the present disclosure and a seat pad manufacturing method according to the first embodiment of the present disclosure will be described below with reference to FIGS. 2 to 16.

Figure 6:
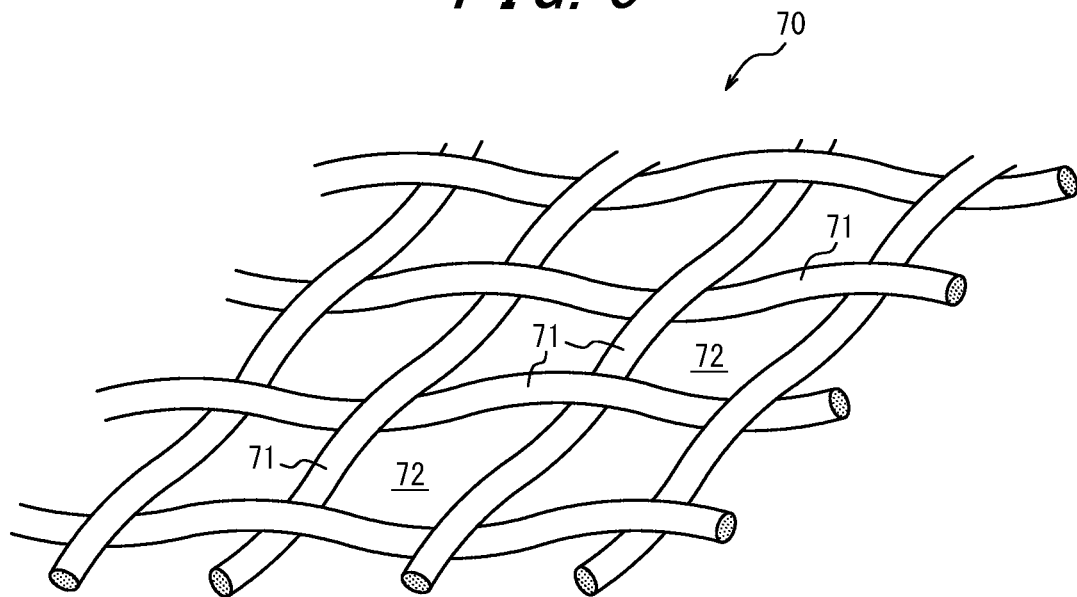
FIG. 6 is a perspective view illustrating an example of a sheet member in FIG. 2 in an enlarged manner.
Figure 7:
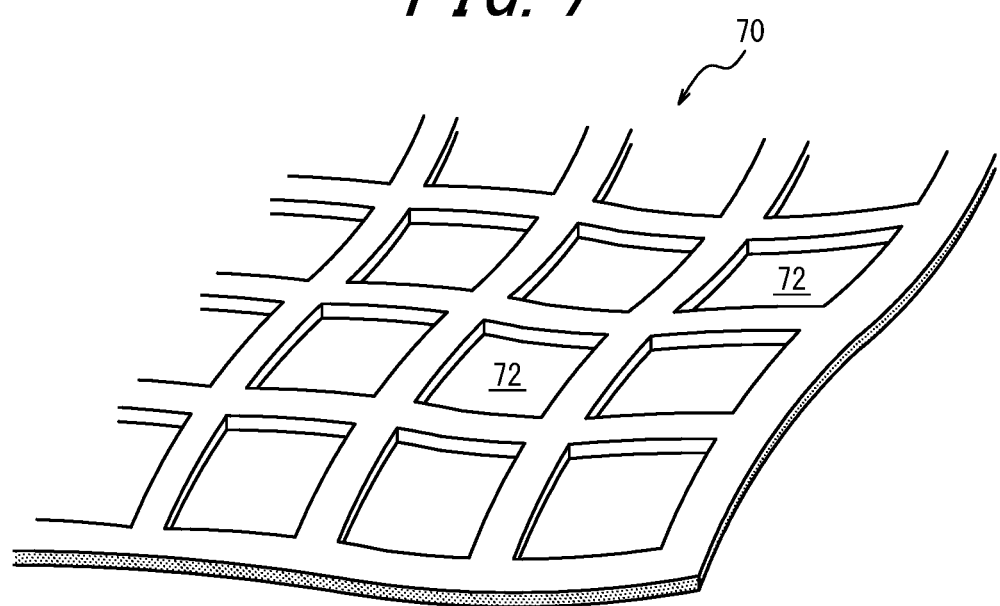
FIG. 7 is a perspective view illustrating another example of the sheet member in FIG. 2 in an enlarged manner.

FIGS. 2 to 5 illustrate the seat pad 1 according to the first embodiment, which is formed as the cushion pad 10, and FIGS. 8 to 16 are drawings for description of the seat pad manufacturing method according to the first embodiment, which can be used to manufacture the cushion pad 10 in FIGS. 2 to 5. FIGS. 6 and 7 illustrate different examples of a sheet member 70 to be described later.

Figure 3:
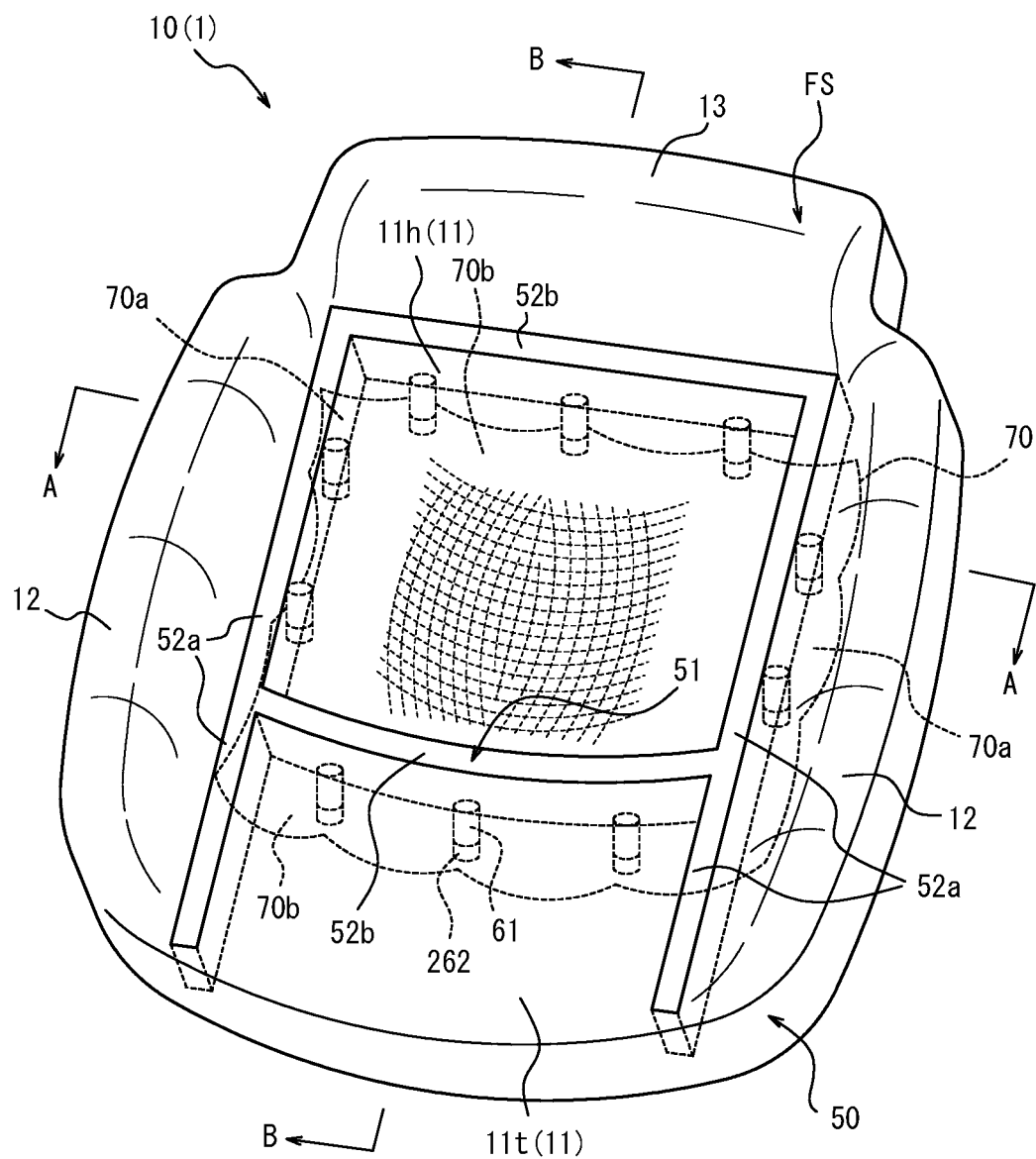
FIG. 3 is a perspective view illustrating the cushion pad in FIG. 2.

First, the seat pad 1 (hereinafter also referred to as the "cushion pad 10") of the present embodiment will be described below with reference to FIGS. 2 to 7. FIG. 2 is a plan view illustrating a situation in which the surface (upper surface) FS of the cushion pad of the present embodiment on the seated person side is planarly viewed. FIG. 3 illustrates a situation in which the cushion pad 10 in FIG. 2 is viewed obliquely from the upper side. FIG. 4 illustrates the cushion pad 10 in FIGS. 2 and 3 at a section taken along line A-A extending in the right-left direction in FIGS. 2 and 3. FIG. 5 illustrates cushion pad 10 in FIGS. 2 and 3 at a section taken along line B-B extending in the front-back direction (extending direction LD) in FIGS. 2 and 3.

As illustrated in FIGS. 2 to 5, the cushion pad 10 of the present embodiment includes a resin foamed body 50, and the sheet member 70 buried in the resin foamed body 50.

Resin of which the resin foamed body 50 is made is flexible resin, and specifically, is preferably elastomer resin, more preferably polyurethane.

The resin foamed body 50 forms the surface FS of the cushion pad 10 on the seated person side and the back surface BS thereof. A plurality (in the illustrated example, two) of grooves 52a extending substantially in the front-back direction (extending direction LD) and separated from each other in the right-left direction, and one or a plurality (in the illustrated example, two) of grooves 52b extending substantially in the right-left direction are formed at the surface FS of the cushion pad 10 on the seated person side. In the illustrated example, each of the two grooves 52a extending substantially in the front-back direction (extending direction LD) serves as a boundary between the main pad part 11 and the corresponding one of the side pad parts 12, the groove 52b positioned on the front side among the two grooves 52b extending substantially in the right-left direction serves as a boundary between the femoral region-placed part 11t and the under-hip part 11h, and the groove 52b positioned on the back side among the two grooves 52b extending substantially in the right-left direction serves as a boundary between the under-hip part 11h (which is the main pad part 11) and the back-pad opposing part 13. However, the grooves 52a and 52b may be formed in a configuration different from that in FIG. 2 at the surface FS of the cushion pad 10 on the seated person side.

For example, attachments for attaching the top skin 30 (FIG. 1) are provided at the grooves 52a and 52b.

The sheet member 70 has a sheet shape that is thin in the thickness direction TD of the seat pad 1. The sheet member 70 is disposed at a position separated from both the surface FS of the seat pad 1 on the seated person side and the back surface BS thereof. As illustrated in FIGS. 3 to 5, at least a central part of the sheet member is curved in a convex shape on the back surface (lower surface) BS side of the cushion pad 10 in each of the right-left direction and the extending direction LD. Specifically, at least the central part of the sheet member 70 is curved in a substantially spherical shape that is convex on the back surface (lower surface) BS side of the cushion pad 10. In the illustrated example, a part (in other words, a part on the inner periphery side of the plurality of buried members 262) surrounded by a plurality of buried members 262 to be described later, which are disposed at both end parts 70a of the sheet member 70 in the right-left direction and both end parts 70b thereof in the front-back direction (extending direction LD) are curved in a convex shape on the back surface BS side of the cushion pad 10 in each of the right-left direction and the extending direction LD.

Note that being "curved in a convex shape . . . in each of the right-left direction and the extending direction LD" means being curved in a convex shape at each of a section (FIG. 4) in the right-left direction and a section (FIG. 5) in the extending direction LD.

As illustrated in FIGS. 2 to 5, the cushion pad 10 also includes the plurality of buried members 262 made of a metal or a magnet and buried in the resin foamed body 50. In the present example, each buried member 262 is made of a metal. Note that, as described later, each buried member 262 is a second fastener component 262 (FIGS. 15 and 16) as part of a fastener 260 used in manufacturing of the seat pad 1.

The plurality of buried members 262 each contact a surface of the sheet member 70 on any one side (in the illustrated example, a surface on the back surface BS side).

In the present example, in planar view (FIG. 2) of the seat pad 1 (cushion pad 10), the sheet member 70 overlaps with the entire under-hip part 11h, and the area of the sheet member 70 is slightly larger than the area of the under-hip part 11h.

In planar view (FIG. 2) of the seat pad 1 (cushion pad 10), both end parts 70a of the sheet member 70 in the right-left direction and both end parts 70b of the sheet member 70 in the extending direction LD each overlap with one or a plurality of buried members 262.

More specifically, in planar view of the seat pad 1 (cushion pad 10), at least one (in the example illustrated in FIG. 2, both) of both end parts 70a of the sheet member 70 in the right-left direction overlaps with the corresponding some of the buried members 262 at a plurality (in the example illustrated in FIG. 2, two) of positions separated from each other in the extending direction LD. In planar view of the seat pad 1 (cushion pad 10), at least one (in the example illustrated in FIG. 2, both) of both end parts 70b of the sheet member in the extending direction LD overlaps with the corresponding some of the buried members 262 at a plurality (in the example illustrated in FIG. 2, three) of positions separated from each other in the right-left direction.

Note that each "end part 70a of the sheet member 70 in the right-left direction" is, for example, a part extending from an edge (outer edge) of the sheet member 70 in the right-left direction to a right-left direction position separated by 30 mm from the edge (outer edge) of the sheet member 70 in the right-left direction toward the center of the sheet member 70 in the right-left direction. Each "end part 70b of the sheet member 70 in the extending direction LD" is, for example, a part extending from an edge (outer edge) of the sheet member 70 in the extending direction LD to an extending direction LD position separated by 30 mm from the edge (outer edge) of the sheet member 70 in the extending direction LD toward the center of the sheet member 70 in the extending direction LD.

In planar view (FIG. 2) of the seat pad 1 (cushion pad 10), at least some (in the example illustrated in FIG. 2, all) of the plurality of buried members 262 buried in the resin foamed body 50 are positioned overlapping with the grooves 52a and 52b provided at the surface FS of the seat pad 1 (cushion pad 10) on the seated person side.

As illustrated in FIGS. 3 to 5, a plurality of bottomed concave parts (hereinafter referred to as "reaching concave parts") 51 opened at the surface FS of the seat pad 1 (cushion pad 10) on the seated person side and extending to and terminating at the sheet member 70 are formed in the resin foamed body 50. As illustrated in FIGS. 4 and 5, in the present example, each reaching concave part 51 is constituted by the corresponding above-described groove 52a or 52b opened at the surface FS on the seated person side, extending in the thickness direction TD, terminating before reaching the sheet member 70, and a coupling hole 61 extending in the thickness direction TD from a groove bottom surface of the groove 52a or 52b to the sheet member 70. The plurality of buried members 262 that are buried in the resin foamed body 50 face the respective reaching concave parts 51 through the sheet member 70. Note that each coupling hole 61 is formed by a first fastener component 261 (FIGS. 15 and 16) as part of the corresponding fastener 260 used in manufacturing of the seat pad 1 as described later.

In the present embodiment, the sheet member 70 has a mesh shape and has a large number of holes 72 penetrating through the sheet member 70. FIGS. 6 and 7 illustrate different exemplary configurations of the sheet member 70.

The sheet member 70 is preferably formed into a mesh shape by plating or interlacing one or a plurality of strings 71 as illustrated in, for example, FIG. 6. In this case, each hole 72 is partitioned between the strings 71. Each string 71 may be formed of one single fiber or may be formed by twisting or bundling a plurality of single fibers.

Alternatively, as illustrated in, for example, FIG. 7, the sheet member 70 may be formed into a mesh shape by forming a large number of holes 72 through a continuous sheet (including a cloth) by punching or the like.

In the examples of FIGS. 6 and 7, the material of which the sheet member 70 made is preferably, for example, synthesis resin.

In the present example, the sheet member 70 has bending rigidity lower than that of the resin foamed body 50 (in other words, can be easily bent). However, the sheet member 70 may have bending rigidity higher than that of the resin foamed body 50.

Subsequently, the seat pad manufacturing method according to the first embodiment of the present disclosure for manufacturing the seat pad 1 (cushion pad 10) according to the first embodiment of the present disclosure described above will be described below with reference to FIGS. 8 to 16.

Figure 8:
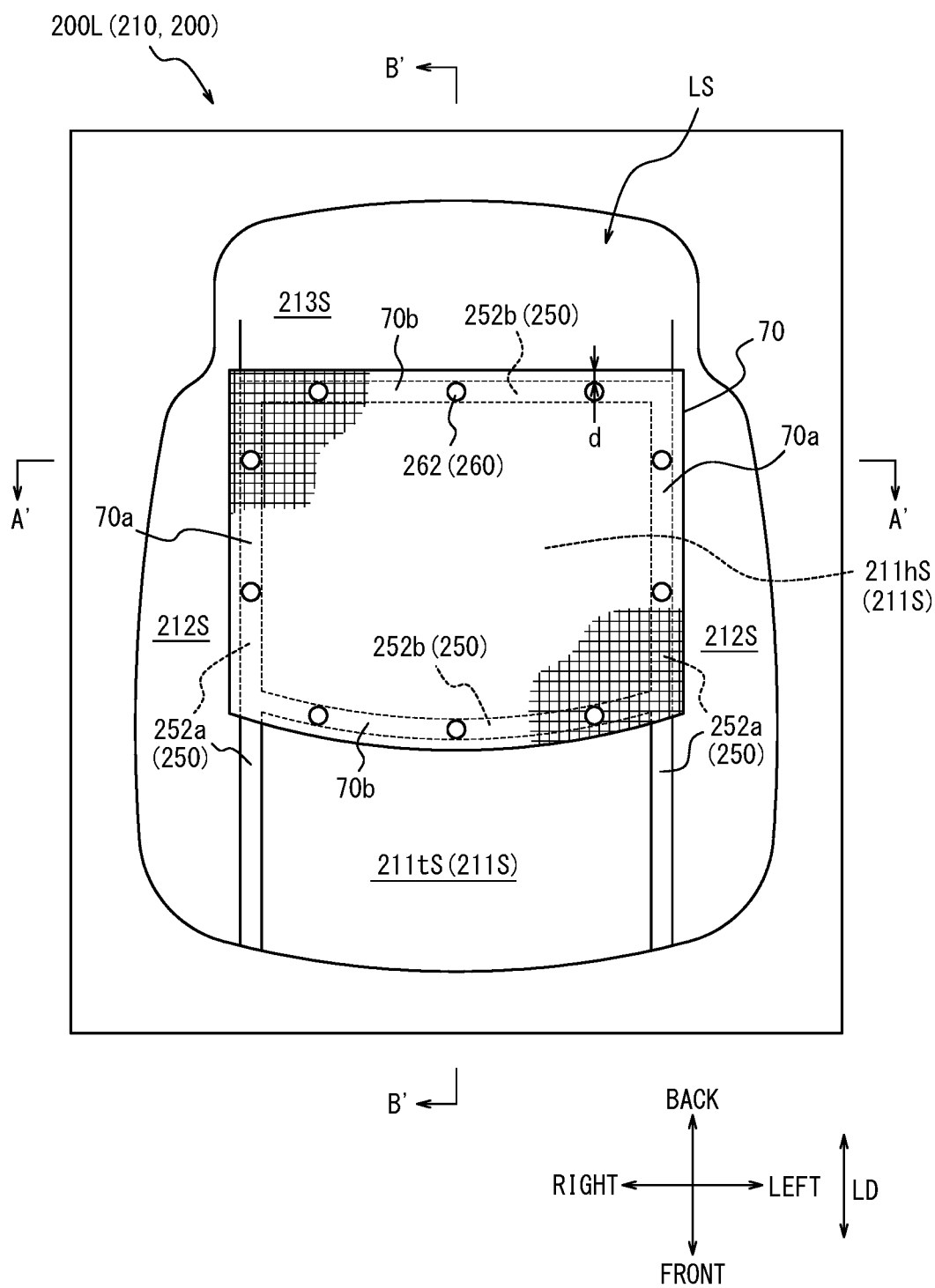
FIG. 8 is a plan view illustrating a lower mold piece of a cushion-pad foaming mold for shaping the cushion pad in FIG. 2 in a state before a foaming resin material is injected.
Figure 15:
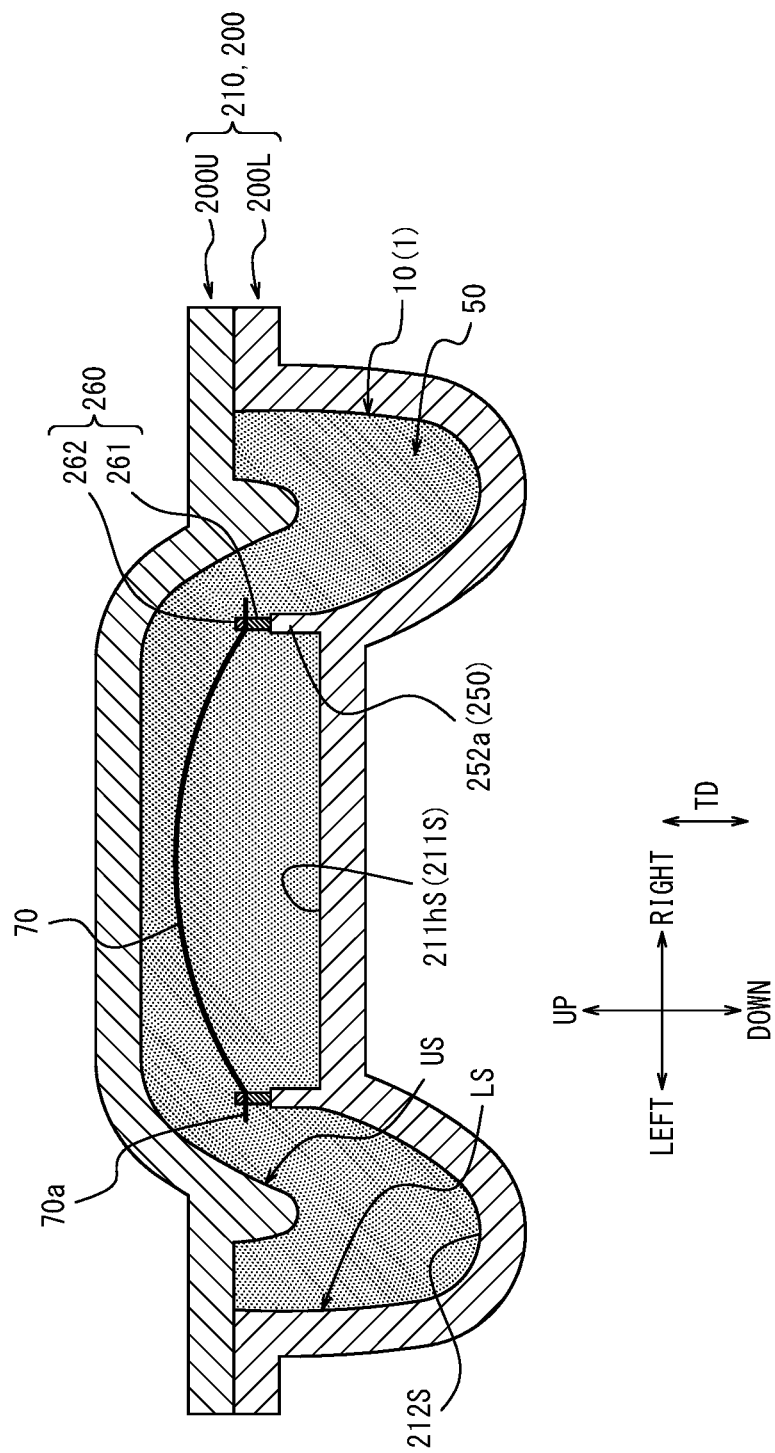
FIG. 15 is a right-left direction cross-sectional view illustrating a situation in which a resin foamed body is foamed by the cushion-pad foaming mold in which an upper mold piece is fitted to the lower mold piece in FIG. 14.
Figure 16:
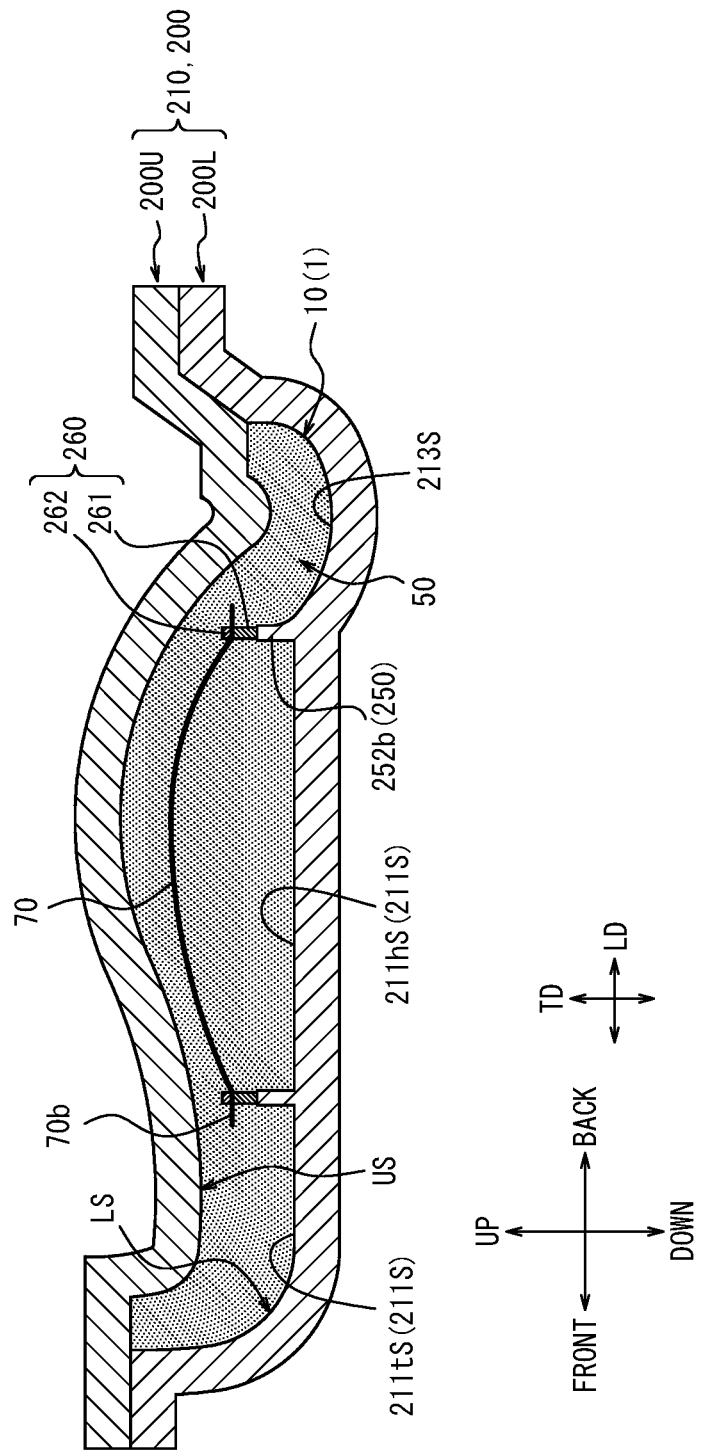
FIG. 16 is a front-back direction (extending direction) cross-sectional view illustrating the cushion-pad foaming mold in the state in FIG. 15.

In the present embodiment, the cushion pad 10 is manufactured by using a cushion-pad foaming mold 210. As illustrated in FIGS. 15 and 16 to be described later, the cushion-pad foaming mold 210 includes a lower mold piece 200L having a lower-mold-piece shaping surface LS provided for shaping the surface FS of the cushion pad 10 on the seated person side, and an upper mold piece 200U having an upper-mold-piece shaping surface US provided for shaping the back surface BS of the cushion pad 10. The upper mold piece 200U is disposed on the upper side of the lower mold piece 200L in the vertical direction. As illustrated in FIG. 8, the lower-mold-piece shaping surface LS includes a main-pad-part (seating-part) shaping surface 211S provided for shaping the surface FS on the seated person side of a main pad part (seating part) 11 of the cushion pad 10, a pair of side-pad-part shaping surfaces 212S positioned on the right and left sides of the main-pad-part shaping surface 211S and provided for shaping the surface FS on the seated person side of the pair of side pad parts 12 of the cushion pad 10, and a back-pad-opposing-part shaping surface 213S positioned on the back side of the main-pad-part (seating-part) shaping surface 211S and provided for shaping the surface FS on the seated person side of the back-pad opposing part 13 of the cushion pad 10. The main-pad-part shaping surface 211S is constituted by a femoral-region-placed-part shaping surface 211tS provided for shaping the surface FS on the seated person side of the femoral region-placed part 11t of the cushion pad 10, and an under-hip-part shaping surface 211hS positioned on the back side of the femoral-region-placed-part shaping surface 211tS and provided for shaping the surface FS on the seated person side of the under-hip part 11h of the cushion pad 10.

Figure 9:
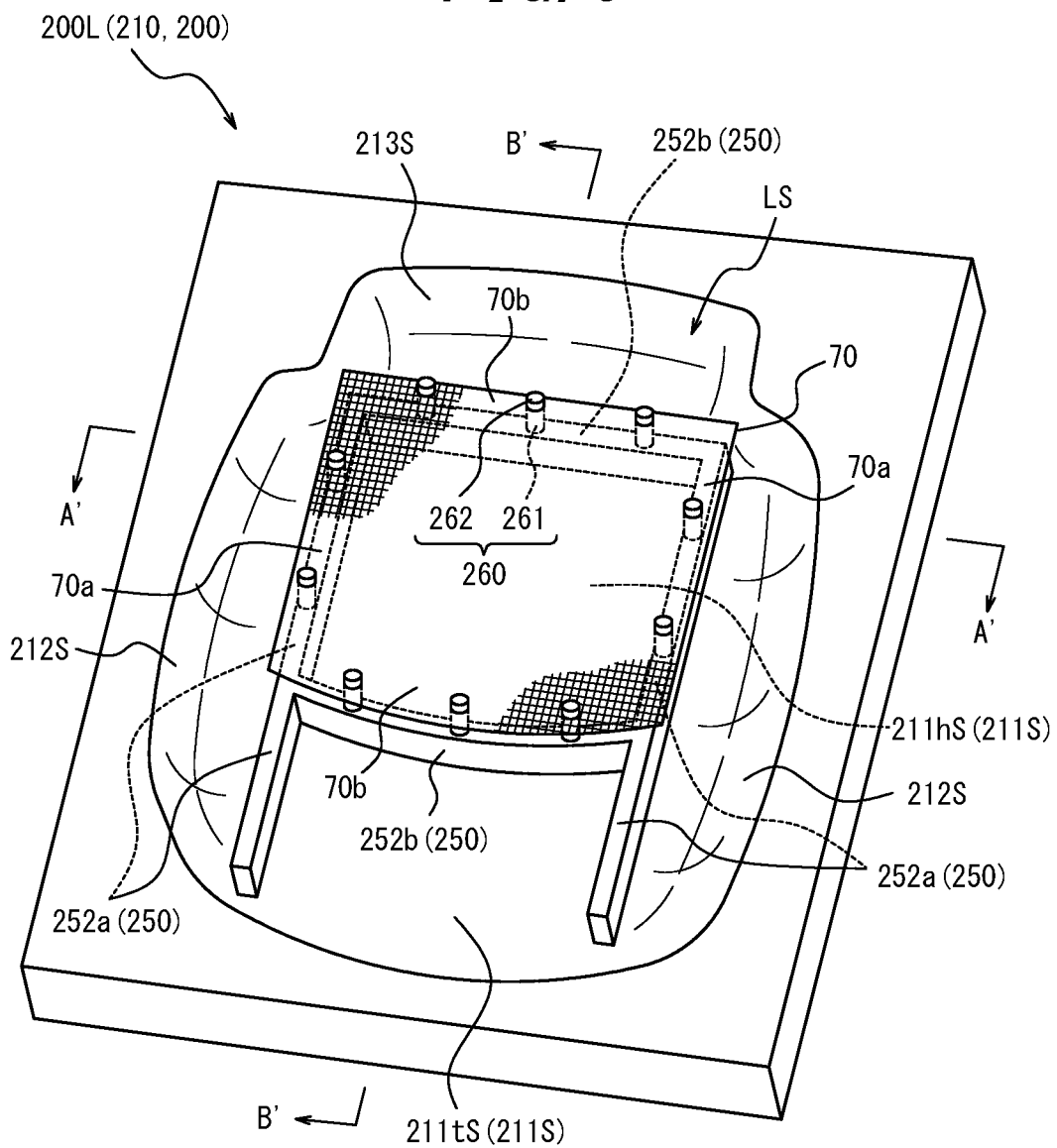
FIG. 9 is a perspective view illustrating the lower mold piece in FIG. 8.

In the present embodiment, as illustrated in FIGS. 8 and 9 to be described later, a plurality (in the illustrated example, two) ridges 252a extending substantially in the front-back direction (extending direction LD) and separated from each other in the right-left direction, and one or a plurality (in the illustrated example, two) ridges 252b extending substantially in the right-left direction are formed at the lower-mold-piece shaping surface LS. The ridges 252a extending substantially in the front-back direction (extending direction LD) are provided to shape the grooves 52a (FIGS. 2 and 3) extending substantially in the front-back direction (extending direction LD) in the cushion pad 10, and the ridges 252b extending substantially in the right-left direction are provided to shape the grooves 52b (FIGS. 2 and 3) extending substantially in the right-left direction in the cushion pad 10. In the illustrated example, the two ridges 252a extending substantially in the front-back direction (extending direction LD) each serve as a boundary between the main-pad-part shaping surface 211S and the corresponding one of the side-pad-part shaping surfaces 212S, the ridge 252b positioned on the front side among the two ridges 252b extending substantially in the right-left direction serves as a boundary between the femoral-region-placed-part shaping surface 211tS and the under-hip-part shaping surface 211hS, and the ridge 252b positioned on the back side among the two ridges 252b extending substantially in the right-left direction serves as a boundary between the under-hip-part shaping surface 211hS (which is the main-pad-part shaping surface 211S) and the back-pad-opposing-part shaping surface 213S. However, the ridges 252a and 252b may be formed in a configuration different from that in FIG. 8 at the lower-mold-piece shaping surface LS.

The method for manufacturing the seat pad 1 (cushion pad 10) of the present embodiment includes a sheet disposition step, a foaming step, and a demolding step.

<Sheet Disposition Step>

First at the sheet disposition step, the sheet member 70 is disposed inside the foaming mold 200 (cushion-pad foaming mold 210) for shaping the seat pad 1 (cushion pad 10) (FIGS. 8 to 11).

Figure 10:
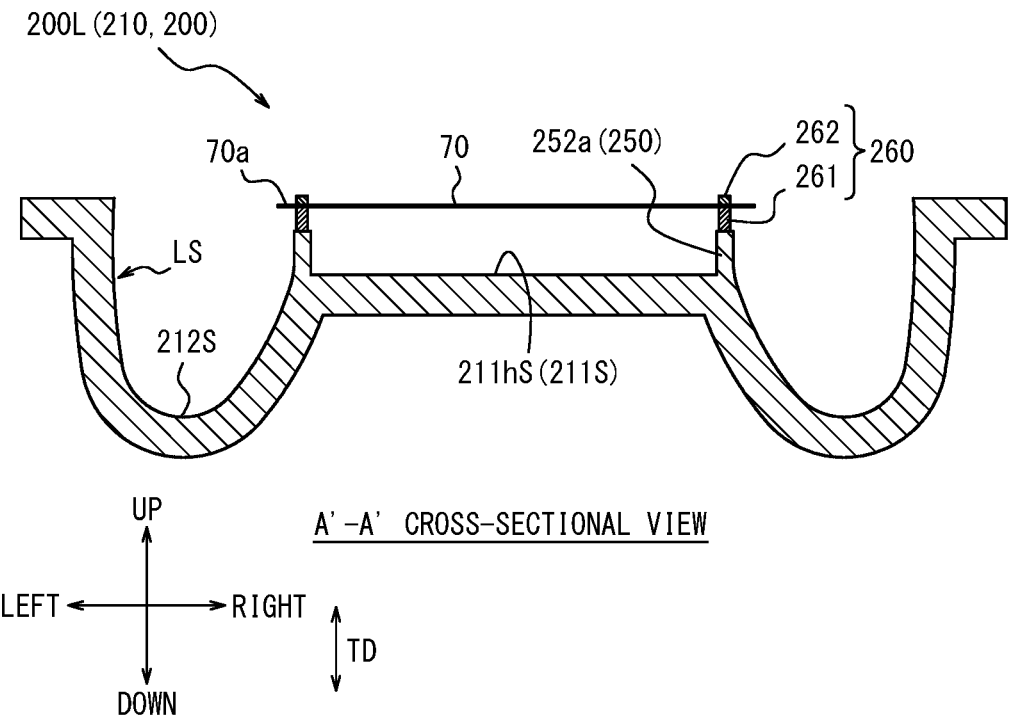
FIG. 10 is a right-left direction cross-sectional view illustrating the lower mold piece in FIGS. 8 and 9 at a section taken along line A'-A' in FIGS. 8 and 9.
Figure 11:
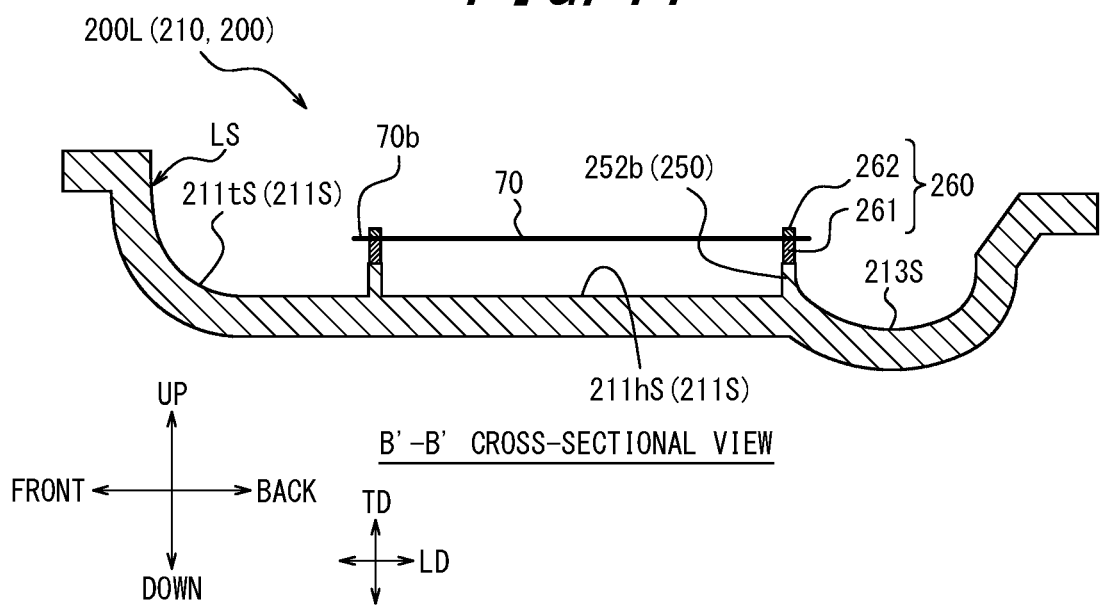
FIG. 11 is a front-back direction (extending direction) cross-sectional view illustrating the lower mold piece in FIGS. 8 and 9 at a section taken along line B'-B' in FIGS. 8 and 9.

In the present embodiment, the sheet member 70 is attached to the lower mold piece 200L of the cushion-pad foaming mold 210. FIGS. 8 to 11 illustrate a state in which the sheet member 70 is disposed in the lower mold piece 200L of the cushion-pad foaming mold 210. FIG. 8 is a plan view illustrating the lower mold piece 200L of the cushion-pad foaming mold 210 in a state before a foaming resin material is injected. FIG. 9 is a perspective view illustrating the lower mold piece 200L in FIG. 8. FIG. 10 illustrates the lower mold piece 200L in FIGS. 8 and 9 at a section taken along line A'-A' extending in the right-left direction in FIGS. 8 and 9. FIG. 11 illustrates the lower mold piece 200L in FIGS. 8 and 9 at a section taken along line B'-B' extending in the front-back direction (extending direction LD) in FIGS. 8 and 9.

As illustrated in FIGS. 8 to 11, at the sheet disposition step in the present embodiment, both end parts 70a of the sheet member 70 in the right-left direction and both end parts 70b of the sheet member 70 in the extending direction LD are each temporarily fastened to the lower-mold-piece shaping surface LS or the upper-mold-piece shaping surface US (in the present example, the lower-mold-piece shaping surface LS) through one or a plurality (in the present example, a plurality) of fasteners 260. More specifically, in the present embodiment, both end parts 70a of the sheet member 70 in the right-left direction and both end parts 70b of the sheet member 70 in the extending direction LD are temporarily fastened through the fasteners 260 to the ridges 252a and 252b as a convex part 250 provided to the lower-mold-piece shaping surface LS.

As illustrated in FIGS. 8 and 9, in the present example, at least one (in the illustrated example, both) of both end parts 70a of the sheet member 70 in the right-left direction is temporarily fastened to the convex part 250 (specifically, the ridge 252a) of the lower mold piece 200L through the corresponding some of the fasteners 260 at a plurality (in the illustrated example, two) of positions separated from each other in the extending direction LD. At least one (in the illustrated example, both) of both end parts 70b of the sheet member in the extending direction LD is temporarily fastened to the convex part 250 (specifically, the ridge 252b) of the lower mold piece 200L through the corresponding some of the fasteners 260 at a plurality (in the illustrated example, two) of positions separated from each other in the right-left direction.

As illustrated in FIGS. 9 to 11, in the present example, each fastener 260 includes the first fastener component 261 made of one (in the present example, a magnet) of a metal and a magnet, and the second fastener component 262 made of the other (in the present example, metal) of a metal and a magnet.

Each first fastener component 261 is fixed to an edge surface (upper surface) of the convex part 250 (specifically, the ridges 252a and 252b) of the lower mold piece 200L. An optional method such as a method of mechanically fixing the first fastener component 261 and the convex part 250 or a method of bonding and fixing the first fastener component 261 and the convex part 250 through adhesive can be used as a method of fixing the first fastener component 261 to the convex part 250, but the method of mechanically fixing both components can more solidly fix the components and thus is preferable. Examples of the method of mechanically fixing the first fastener component 261 and the convex part 250 include a method of forming screws in the first fastener component 261 and the convex part 250 in advance and screwing both components, and a method of forming irregular surfaces at the first fastener component 261 and the convex part 250 in advance and engaging both components.

At the sheet disposition step, each second fastener component 262 is disposed on a side opposite to the corresponding first fastener component 261 through the sheet member 70 so that the sheet member is sandwiched between the second fastener component 262 and the first fastener component 261. Accordingly, each second fastener component 262 faces the corresponding first fastener component 261 through the sheet member 70 (FIGS. 10 and 11).

In the present example, since each fastener 260 is formed as described above, the sheet member 70 is sandwiched between the first fastener component 261 and the second fastener component 262 and detachably fixed (temporarily fastened) to the lower-mold-piece shaping surface LS by magnetic force acting between the first fastener component 261 and the second fastener component 262.

Note that, in the illustrated example, at the sheet disposition step, the sheet member 70 is disposed in a flat shape so that the sheet member 70 is separated from both the lower-mold-piece shaping surface LS of the lower mold piece 200L and the upper-mold-piece shaping surface US of the upper mold piece 200U when mold clamping is performed at the subsequent foaming step.

<Foaming Step>

At the foaming step after the sheet disposition step, a foaming resin material 50' is injected into the foaming mold 200 (cushion-pad foaming mold 210), and the resin foamed body 50 is foamed through mold clamping (FIGS. 12 to 16).

Figure 12:
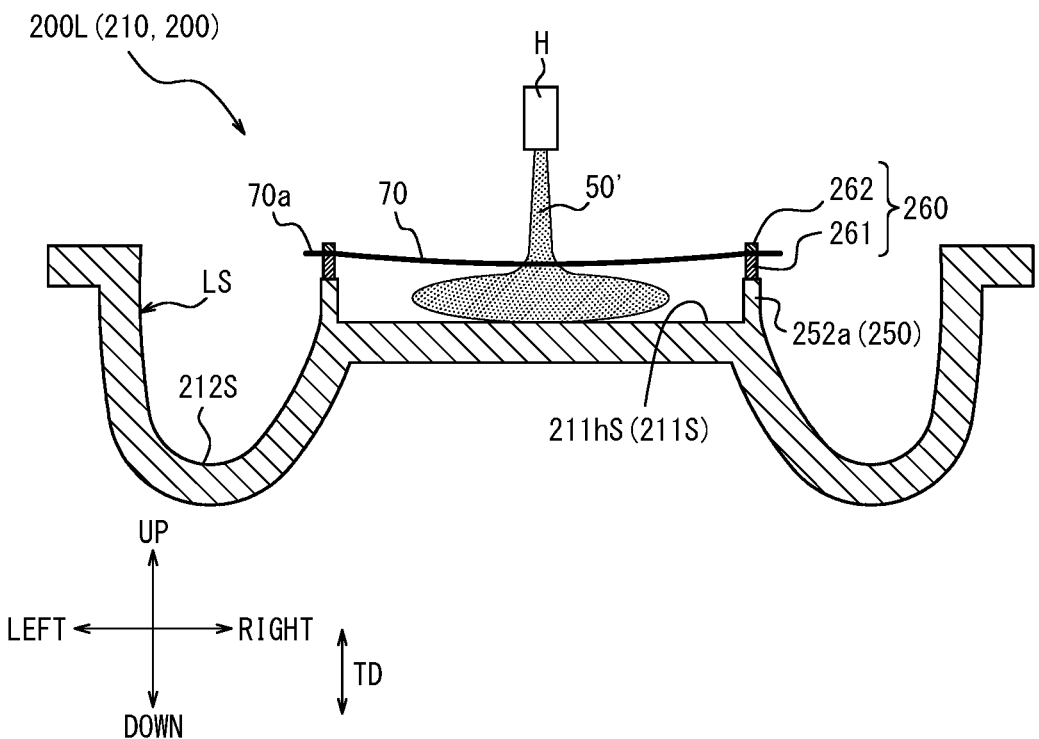
FIG. 12 is a right-left direction cross-sectional view illustrating a situation in which the foaming resin material is injected into the lower mold piece in FIG. 10.
Figure 13:
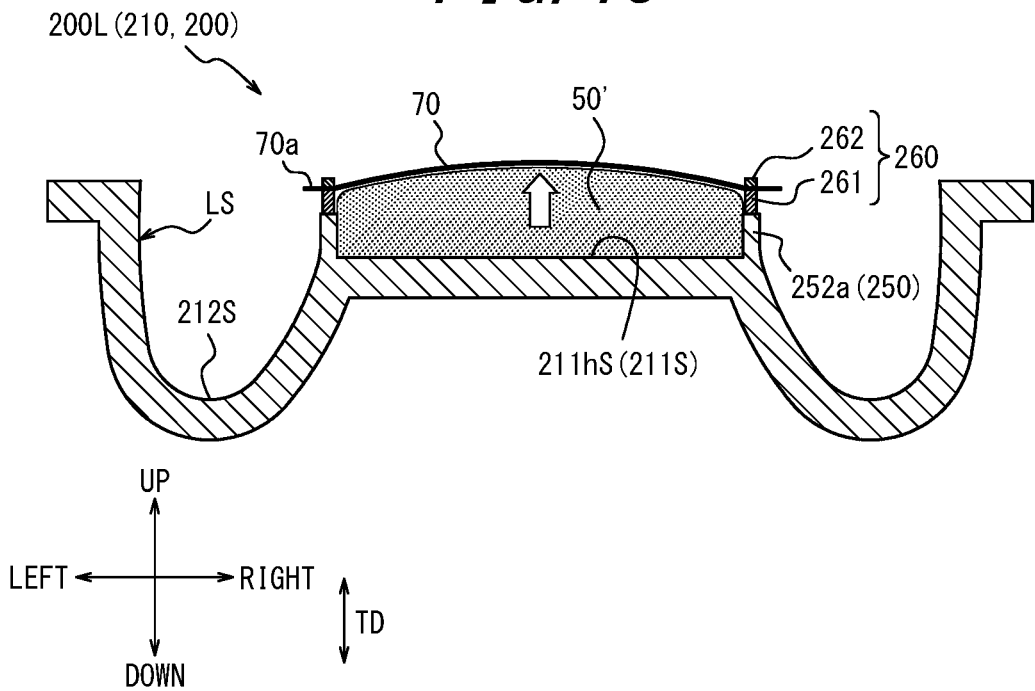
FIG. 13 is a right-left direction cross-sectional view illustrating a situation in which the injected foaming resin material expands in the lower mold piece in FIG. 12.
Figure 14:
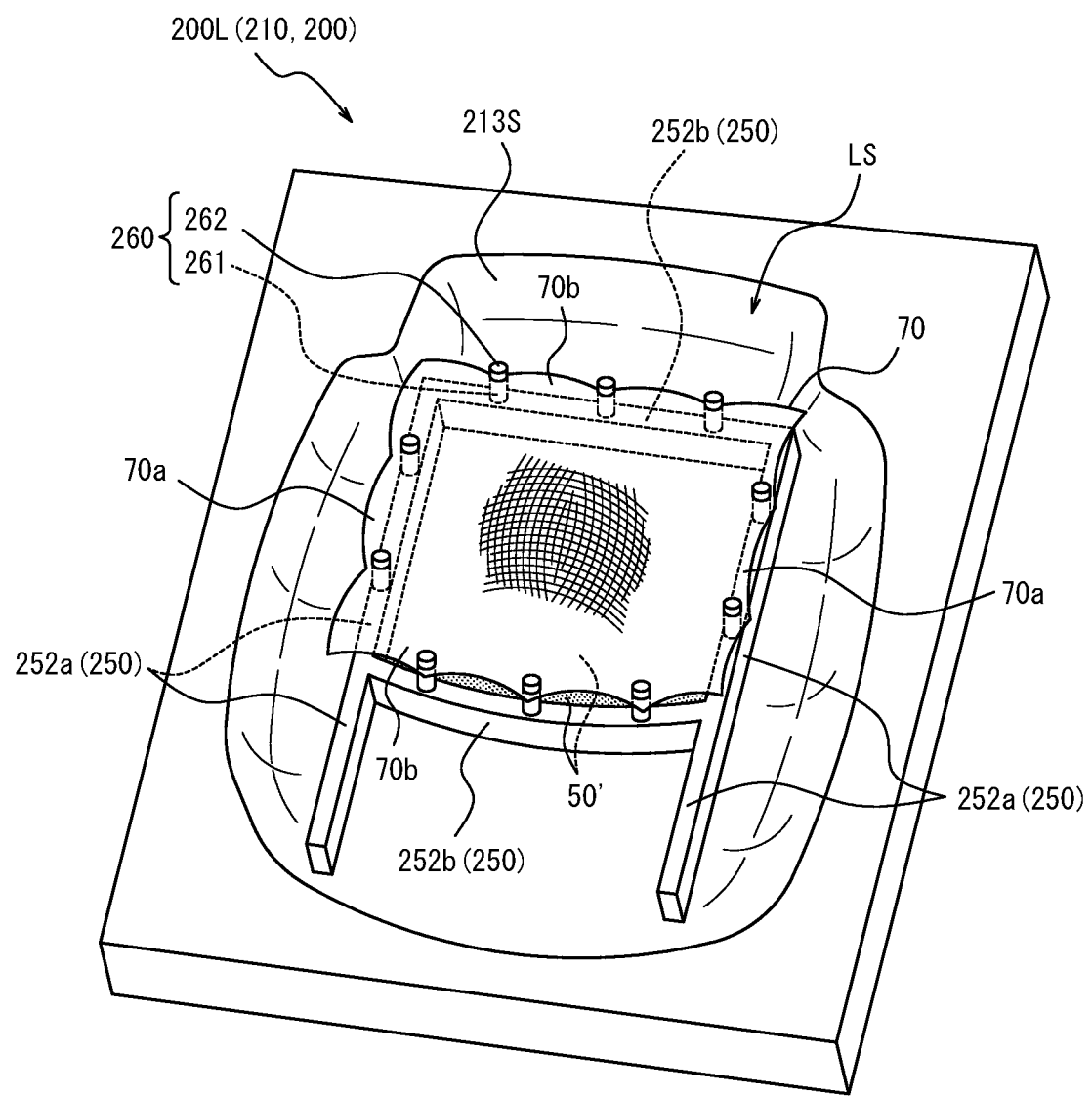
FIG. 14 is a perspective view illustrating the lower mold piece in a state in FIG. 13.

More specifically, first at the foaming step, the foaming resin material 50' that is liquid is injected as illustrated in FIG. 12. In this case, the foaming resin material 50' that is liquid is injected into at least a space between the lower-mold-piece shaping surface LS of the cushion-pad foaming mold 210 and the sheet member 70. In the illustrated example, the sheet member 70 has a mesh shape as described above, and the foaming resin material 50' is injected from above the sheet member 70 by an injection head H or the like. Then, the injected foaming resin material 50' transmits through the sheet member 70 by passing through the large number of holes 72 (FIGS. 6 and 7) of the sheet member 70 and is disposed on the lower-mold-piece shaping surface LS therebelow. Thereafter, as illustrated in FIGS. 13 and 14, part of the sheet member 70 other than places temporarily fastened by the fasteners 260 is pressed upward to the upper-mold-piece shaping surface US side (upper side) as the foaming resin material 50' disposed between the lower-mold-piece shaping surface LS and the sheet member 70 gradually expands, and accordingly, at least a central part (specifically, part on the inner periphery side of the temporarily fastened places) of the sheet member 70 deforms into a shape curved in a convex shape on the upper-mold-piece shaping surface US side (upper side) in each of the right-left direction and the extending direction LD (FIGS. 13 and 14).

Simultaneously at the foaming step, as necessary, the foaming resin material 50' is disposed at a part (such as the upper side of the side-pad-part shaping surfaces 212S) other than the space between the lower-mold-piece shaping surface LS and the sheet member 70, and then mold clamping is performed by fitting the upper mold piece 200U to the lower mold piece 200L to foam the resin foamed body 50 in a cavity partitioned by the lower mold piece 200L and the upper mold piece 200U (FIGS. 15 and 16). Note that, at the foaming step, for example, a space between the sheet member 70 and the upper-mold-piece shaping surface US is filled with the foaming resin material 50' as part of the foaming resin material 50' expanding at the space between the lower-mold-piece shaping surface LS and the sheet member 70 returns to the space between the sheet member 70 and the upper-mold-piece shaping surface US through the sheet member 70.

In this case, the grooves 52a and 52b (FIGS. 3 to 5) described above are shaped by the ridges 252a and 252b provided at the lower-mold-piece shaping surface LS. In addition, each coupling hole 61 (FIGS. 4 and 5) described above is shaped by the first fastener component 261 of the corresponding fastener 260.

<Demolding Step>

At the demolding step after the foaming step, the resin foamed body 50 is demolded in a state in which the sheet member 70 is buried therein.

In this case, in each fastener 260, the second fastener component 262 is separated from the corresponding first fastener component 261 against the magnetic force acting between the first fastener component 261 and the second fastener component 262, thereby canceling temporary fastening of the sheet member 70.

Accordingly, each second fastener component 262 remains inside the resin foamed body 50 and becomes an above-described buried member 262, and each first fastener component 261 remains on the lower mold piece 200L side. A place where each first fastener component 261 is buried in the resin foamed body 50 remains as a coupling hole 61 (FIGS. 4 and 5).

After the demolding step, the cushion pad 10 having the configuration described above with reference to FIGS. 2 to 5 can be obtained.

As described above, at the foaming step in the method for manufacturing the seat pad 1 (cushion pad 10) of the present embodiment, the foaming resin material 50' that is liquid is injected into the space between the lower-mold-piece shaping surface LS of the cushion-pad foaming mold 210 and the sheet member 70, and at least the central part of the sheet member 70 deforms into a shape curved in a convex shape on the upper-mold-piece shaping surface US side in each of the right-left direction and the extending direction LD as the sheet member 70 is pressed upward to the upper-mold-piece shaping surface US side through expansion of the foaming resin material 50' (FIGS. 12 to 16).

Accordingly, in the seat pad 1 (cushion pad 10) of the present embodiment, at least the central part of the sheet member is curved in a convex shape on the back surface side of the seat pad in each of the right-left direction and the extending direction (FIGS. 3 to 5). In this manner, in the seat pad 1 (cushion pad 10), since the sheet member 70 curved in a convex shape on the back surface BS side is buried inside the resin foamed body 50, the resin foamed body 50 is divided in the thickness direction TD by the sheet member 70 in effect, and a layer on the seated person side (upper side) of the sheet member 70 in the resin foamed body 50 of the cushion pad 10 is more likely to deflect than a layer on the back side (lower side) of the sheet member 70 in the resin foamed body 50. Accordingly, for example, when the seated person sits and a load is applied from the seated person to the cushion pad 10, the layer on the seated person side (upper side) of the sheet member 70 in the resin foamed body 50 of the cushion pad 10 deflects earlier than the layer on the back side (lower side) of the sheet member 70 in the resin foamed body 50, and thereafter the layer on the back side (lower side) of the sheet member 70 in the resin foamed body 50 deflects, in other words, the cushion pad 10 deflects at two stages.

Accordingly, when the thickness and 25% hardness of the cushion pad 10 are constant, deflection of the cushion pad 10 can be increased as compared to a case in which no sheet member 70 is provided and a case in which the sheet member 70 has a flat shape, and thus stroke feeling that the seated person has when sitting can be increased, thereby providing improved seating comfort. In other words, when the thickness of the cushion pad 10 is reduced as compared to a case in which no sheet member is provided and a case in which the sheet member 70 has a flat shape, an equivalent stroke feeling and seating comfort can be ensured, and thus favorable seating comfort can be obtained with the reduced thickness of the cushion pad 10.

The "25% hardness (N)" is measured in accordance with the JIS K6400-1 D method.

Note that, in the present embodiment, since the sheet member has a shape curved in a convex shape on the back surface BS side in each of the right-left direction and the extending direction LD, the shape of the sheet member 70 fits the body shape of the seated person as compared to a case in which the sheet member 70 has a flat shape or has a cylindrical shape curved in a convex shape on the back surface BS side in only one of the right-left direction and the extending direction LD. Accordingly, the above-described effect such as seating comfort improvement can be further achieved.

Second Embodiment

Subsequently, differences of the seat pad 1 according to a second embodiment of the present disclosure and a seat pad manufacturing method according to the second embodiment of the present disclosure from those of the first embodiment will be mainly described below with reference to FIGS. 17 to 24.

Figure 17:
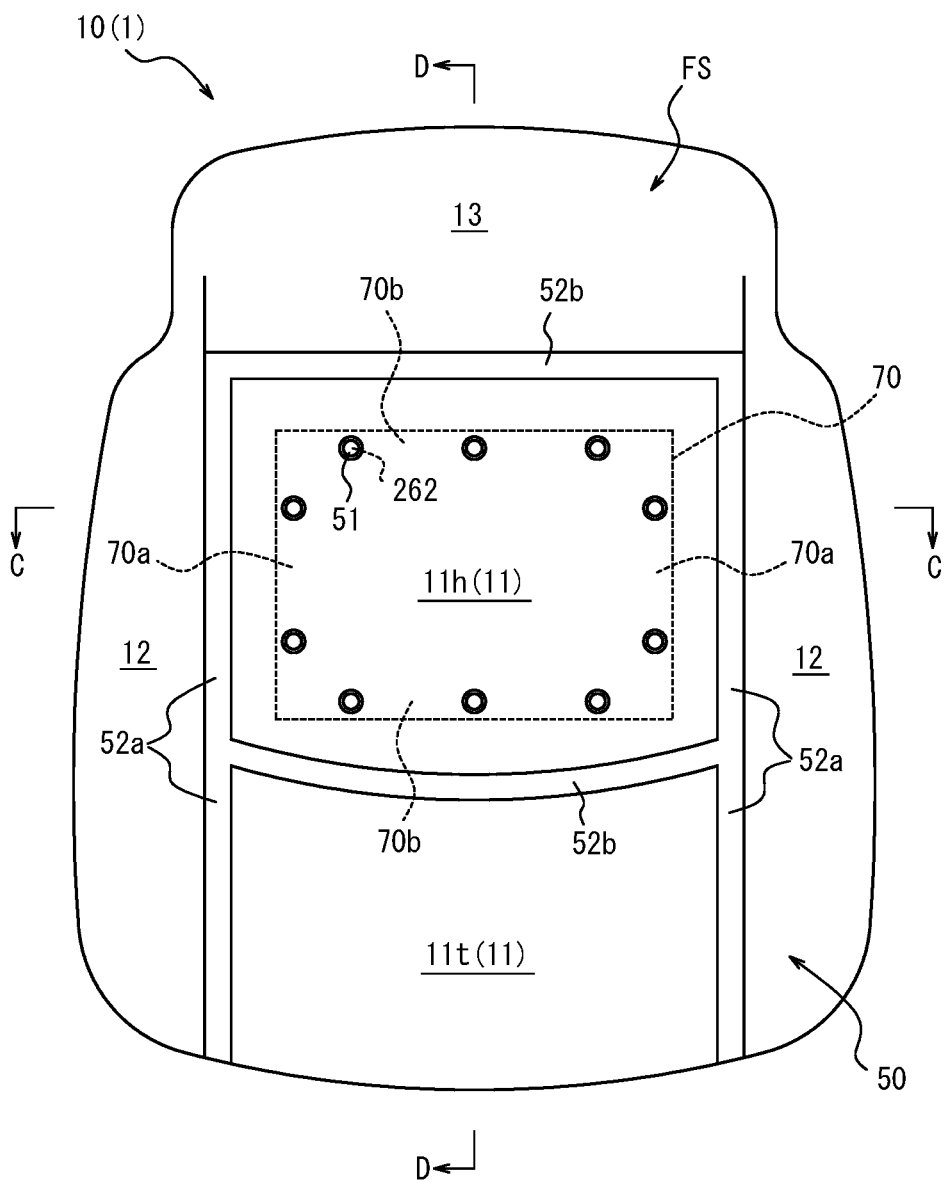
FIG. 17 is a plan view illustrating a seat pad according to a second embodiment of the present disclosure, which is formed as a cushion pad.
Figure 18:
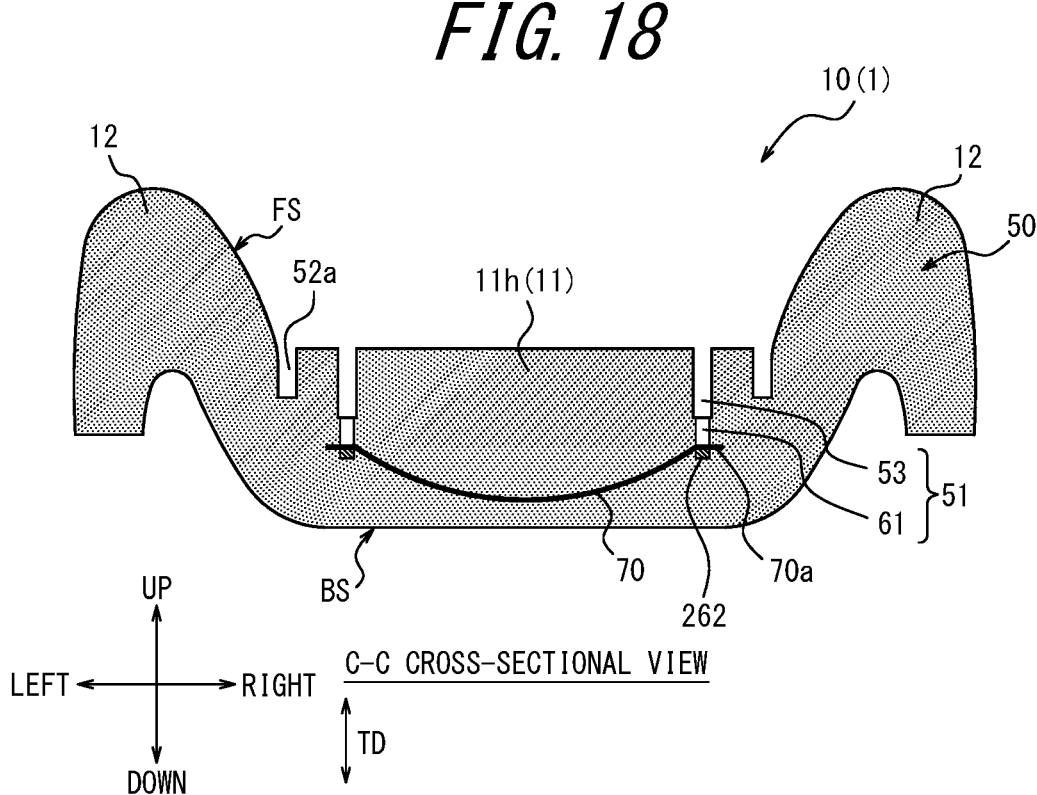
FIG. 18 is a right-left direction cross-sectional view illustrating the cushion pad in FIG. 17 at a section taken along line C-C in FIG. 17.
Figure 19:
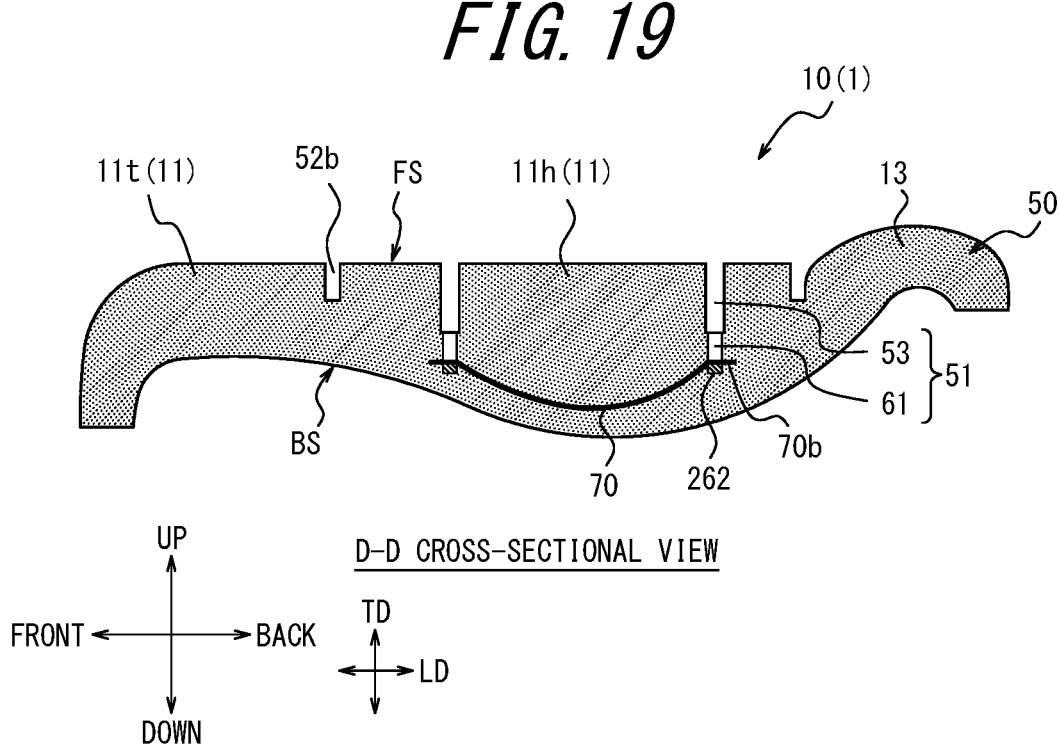
FIG. 19 is a front-back direction (extending direction) cross-sectional view illustrating the cushion pad in FIG. 17 at a section taken along line D-D in FIG. 17.

FIGS. 17 to 19 illustrate the seat pad 1 according to the second embodiment of the present disclosure, which is formed as the cushion pad 10, and FIGS. 20 to 24 are drawings for description of the seat pad manufacturing method according to the second embodiment of the present disclosure, which can be used to manufacture the cushion pad in FIGS. 17 to 19.

In the seat pad (cushion pad 10) of the first embodiment described above, the area of the sheet member 70 is larger than the area of the under-hip part 11h in planar view of the seat pad 1 (cushion pad 10). At the sheet disposition step in the method for manufacturing the seat pad (cushion pad 10) of the first embodiment, the sheet member 70 is temporarily fastened through the fasteners 260 to the ridges 252a and 252b as the convex part 250 provided at the lower-mold-piece shaping surface LS (FIGS. 8 and 9).

In the seat pad (cushion pad 10) of the second embodiment, the area of the sheet member 70 is smaller than the area of the under-hip part 11h in planar view of the seat pad 1 (cushion pad 10). At the sheet disposition step in the method for manufacturing the seat pad 1 (cushion pad 10) of the second embodiment, the sheet member 70 is temporarily fastened through the fasteners 260 to an inner convex part 253 on the inner periphery side of the ridges 252a and 252b as the convex part 250 provided at the lower-mold-piece shaping surface LS. The other features (such as the curved shape and mesh shape of the sheet member 70 and the configurations of the fasteners 260 and the buried members 262) are same as those of the first embodiment.

First, the seat pad 1 (hereinafter also referred to as the "cushion pad 10") of the present embodiment will be described below with reference to FIGS. 17 to 19. FIG. 17 is a plan view illustrating a situation in which the surface (upper surface) FS of the cushion pad of the present embodiment on the seated person side is planarly viewed. FIG. 18 illustrates the cushion pad 10 in FIG. 17 at a section taken along line C-C extending in the right-left direction in FIG. 17. FIG. 19 illustrates the cushion pad 10 in FIG. 17 at a section taken along line D-D extending in the front-back direction (extending direction LD) in FIG. 17.

In the present embodiment, the area of the sheet member 70 is smaller than the area of the under-hip part 11h in planar view of the seat pad 1 (cushion pad 10) as described above.

As illustrated in FIGS. 17 to 19, in the resin foamed body 50 of the cushion pad 10, the plurality of bottomed concave parts (reaching concave parts) 51 opened at the surface FS of the seat pad 1 (cushion pad 10) on the seated person side and extending to and terminating at the sheet member 70 are formed on the inner periphery side of the grooves 52a and 52b (in other words, between the pair of grooves 52a extending substantially in the extending direction LD and between the pair of grooves 52b extending substantially in the right-left direction) in the main pad part 11, more specifically, the under-hip part 11h. In the present example, each reaching concave part 51 is constituted by an inner concave part 53 opened at the surface FS on the seated person side, extending in the thickness direction TD, and terminating before reaching the sheet member 70, and a coupling hole 61 extending in the thickness direction TD from a bottom surface of the inner concave part 53 to the sheet member 70.

In planar view of the seat pad 1 (cushion pad 10) (FIG. 17), the plurality of buried members 262 buried in the resin foamed body 50 are each provided at a position overlapping with the corresponding reaching concave part 51. More specifically, the plurality of buried members 262 buried in the resin foamed body 50 each face the corresponding reaching concave part 51 through the sheet member 70 (FIGS. 18 and 19). Each buried member 262 is provided for the corresponding one reaching concave parts 51. Note that each coupling hole 61 is formed by the first fastener component 261 (FIGS. 23 and 24) as part of the corresponding fastener 260 used in manufacturing of the seat pad 1. Each inner concave part 53 is formed by the inner convex part 253 (FIGS. 23 and 24) provided at the lower-mold-piece shaping surface LS of the lower mold piece 200L of the cushion-pad foaming mold 210 used in manufacturing of the seat pad 1.

The plurality of buried members 262 buried in the resin foamed body 50 each contact a surface of the sheet member 70 on any one side (in the illustrated example, a surface on the back surface BS side) (FIGS. 18 and 19).

In planar view of the seat pad 1 (cushion pad 10) (FIG. 17), both end parts 70a of the sheet member 70 in the right-left direction and both end parts 70b of the sheet member 70 in the extending direction LD each overlap with one or the plurality of buried members 262.

More specifically, in planar view of the seat pad 1 (cushion pad 10), at least one (in the example of FIG. 17, both) of both end parts 70a of the sheet member 70 in the right-left direction overlaps with the corresponding some of the buried members 262 at a plurality (in the example of FIG. 17, two) of positions separated from each other in the extending direction LD. In addition, in planar view of the seat pad 1 (cushion pad 10), at least one (in the example of FIG. 17, both) of both end parts 70b of the sheet member 70 in the extending direction LD overlaps with the corresponding some of the buried members 262 at a plurality (in the example of FIG. 17, three) of positions separated from each other in the right-left direction.

In the present embodiment as well, as illustrated in FIGS. 18 and 19, at least the central part of the sheet member 70 (in the illustrated example, a part on the inner periphery side of the plurality of buried members 262) is curved in a convex shape on the back surface (lower surface) BS side of the cushion pad 10 in each of the right-left direction and the extending direction LD.

Subsequently, the seat pad manufacturing method according to the second embodiment of the present disclosure for manufacturing the seat pad 1 (cushion pad 10) according to the second embodiment of the present disclosure described above will be described below with reference to FIGS. 20 to 24.

In the present embodiment, the area of the sheet member 70 is smaller than the area of the under-hip-part shaping surface 211hS in a planar view (FIG. 20) of the lower-mold-piece shaping surface LS of the lower mold piece 200L of the cushion-pad foaming mold 210.

Figure 20:
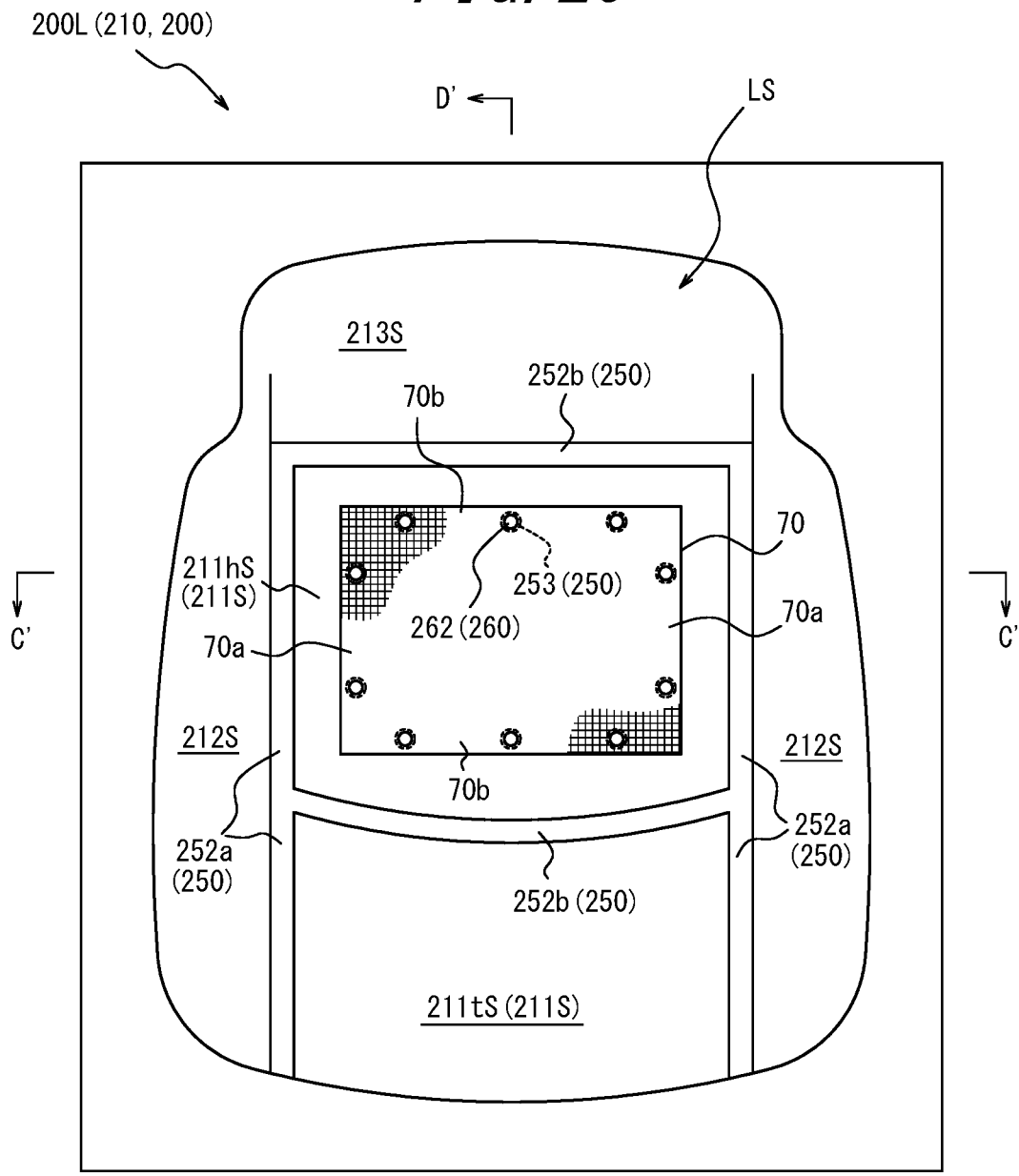
FIG. 20 is a plan view illustrating a lower mold piece of a cushion-pad foaming mold for shaping the cushion pad in FIG. 17 in a state before a foaming resin material is injected.
Figure 21:
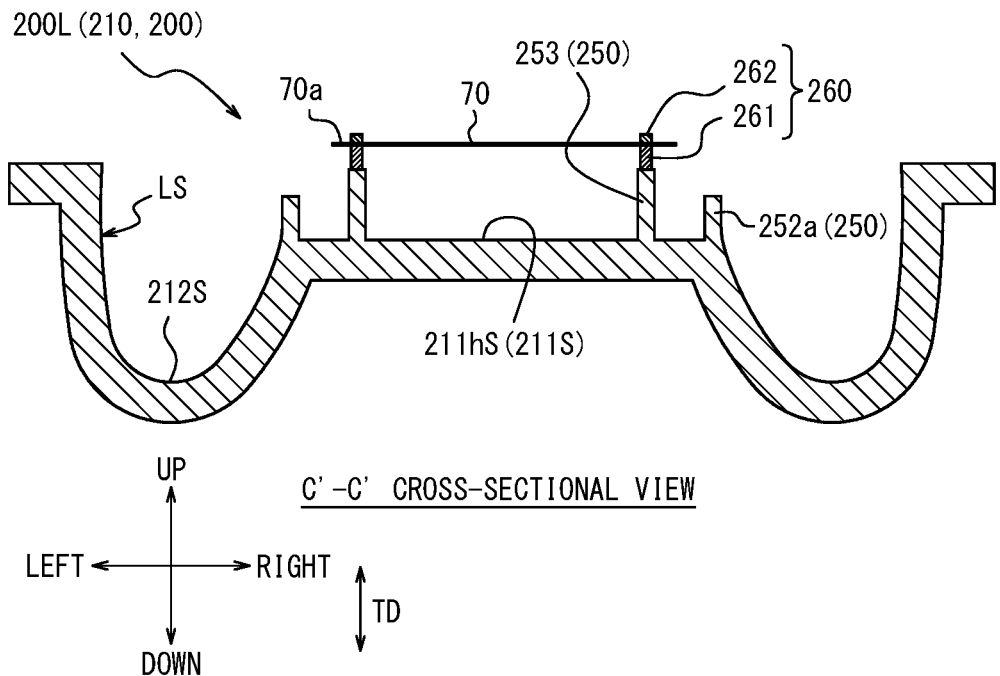
FIG. 21 is a right-left direction cross-sectional view illustrating the lower mold piece in FIG. 20 at a section taken along line C'-C' in FIG. 20.
Figure 22:
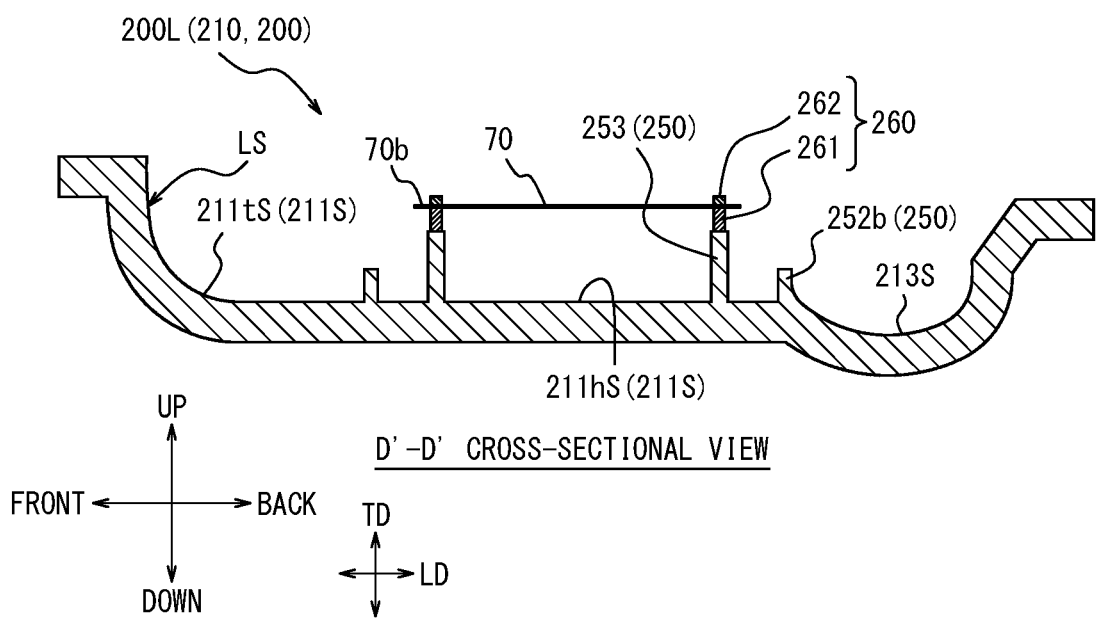
FIG. 22 is a front-back direction (extending direction) cross-sectional view illustrating the lower mold piece in FIG. 20 at a section taken along line D'-D' in FIG. 20.

At the lower-mold-piece shaping surface LS of the cushion-pad foaming mold 210 used to manufacture the cushion pad in the present embodiment, as illustrated in FIGS. 20 to 22, the plurality of inner convex parts 253 as the convex part 250 are formed on the inner periphery side of the ridges 252a and 252b (in other words, between the pair of ridges 252a extending substantially in the extending direction LD and between the pair of ridges 252b extending substantially in the right-left direction) at the main-pad-part shaping surface 211S, more specifically, the under-hip-part shaping surface 211hS.

At the sheet disposition step, as illustrated in FIGS. 20 to 22, both end parts 70a of the sheet member 70 in the right-left direction and both end parts 70b of the sheet member 70 in the extending direction LD are temporarily fastened through the fasteners 260 to the inner convex parts 253 as the convex part 250 provided at the lower-mold-piece shaping surface LS.

In the present example, as illustrated in FIG. 20, at least one (in the illustrated example, both) of both end parts 70a of the sheet member 70 in the right-left direction is temporarily fastened to the convex part 250 (specifically, the inner convex parts 253) of the lower mold piece 200L through the corresponding some of the fasteners 260 at a plurality (in the illustrated example, two) of positions separated from each other in the extending direction LD. In addition, at least one (in the illustrated example, both) of both end parts 70b of the sheet member 70 in the extending direction LD is temporarily fastened to the convex part 250 (specifically, the inner convex parts 253) of the lower mold piece 200L through the corresponding some of the fasteners 260 at a plurality (in the illustrated example, three) of positions separated from each other in the right-left direction.

As illustrated in FIGS. 20 to 22, in the present example, each fastener 260 includes the first fastener component 261 made of one (in the present example, a magnet) among a metal and a magnet, and the second fastener component 262 made of the other (in the present example, metal) of a metal and a magnet. The first fastener component 261 is fixed to the edge surface (upper surface) of the convex part 250 (specifically, the inner convex parts 253) of the lower mold piece 200L. Each second fastener component 262 is disposed on the side opposite to the corresponding first fastener component 261 through the sheet member 70 at the sheet disposition step so that the sheet member 70 is sandwiched between the second fastener component 262 and the first fastener component 261.

Accordingly, each second fastener component 262 faces the corresponding first fastener component 261 through the sheet member (FIGS. 21 and 22).

In the present example, since each fastener 260 is formed as described above, the sheet member 70 is sandwiched between the first fastener component 261 and the second fastener component 262 and detachably fixed (temporarily fastened) to the lower-mold-piece shaping surface LS by magnetic force acting between the first fastener component 261 and the second fastener component 262.

Note that, in the illustrated example, at the sheet disposition step, the sheet member 70 is disposed in a flat shape so that the sheet member 70 is separated from both the lower-mold-piece shaping surface LS of the lower mold piece 200L and the upper-mold-piece shaping surface US of the upper mold piece 200U when mold clamping is performed at the subsequent foaming step.

Figure 23:
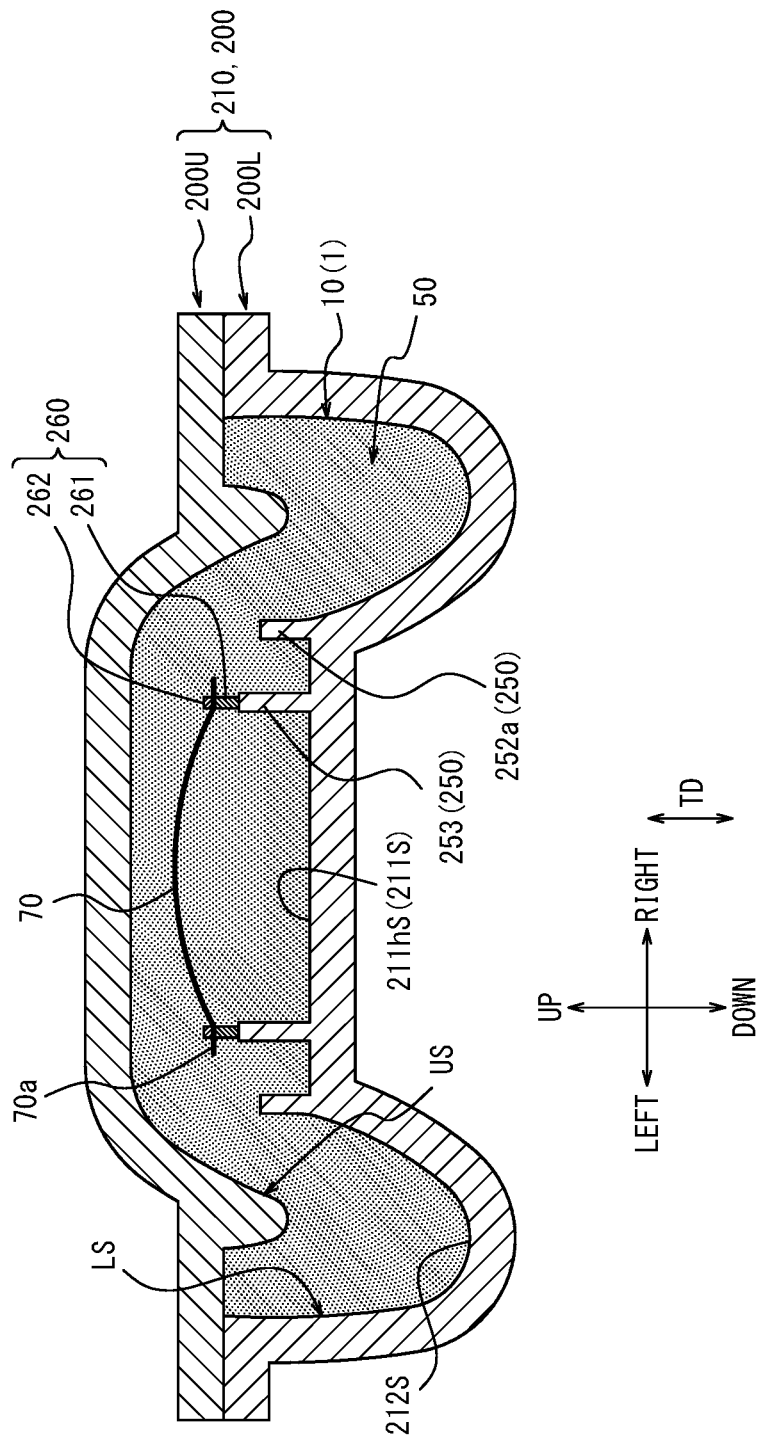
FIG. 23 is a right-left direction cross-sectional view illustrating a situation in which a resin foamed body is foamed in the cushion-pad foaming mold in which an upper mold piece is fitted to the lower mold piece in FIG. 21.
Figure 24:
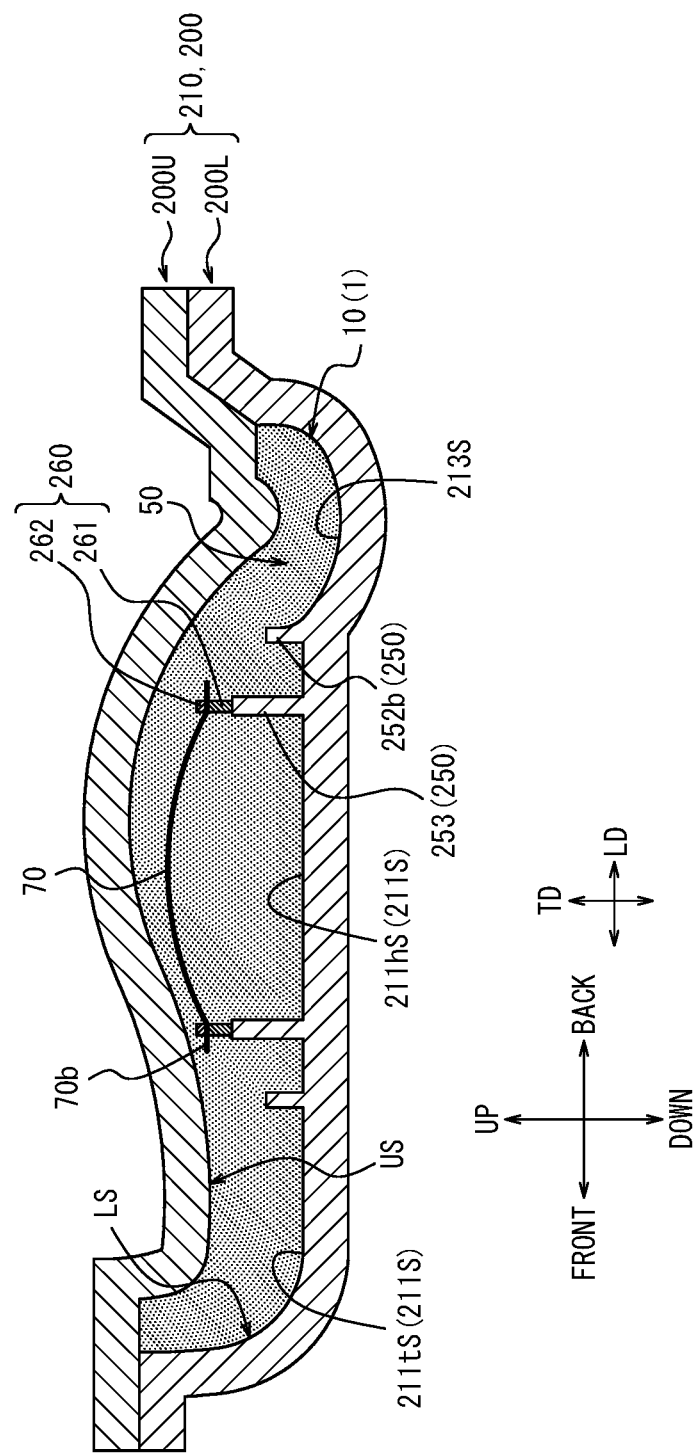
FIG. 24 is a front-back direction (extending direction) cross-sectional view illustrating the cushion-pad foaming mold in a state in FIG. 23.

In the second embodiment, the foaming step can be performed similarly to the first embodiment. FIGS. 23 and 24 illustrate a situation in which the resin foamed body 50 is foamed in the clamped cushion-pad foaming mold 210 in the present embodiment. Although not illustrated, at the foaming step, the foaming resin material 50' that is liquid is injected into the space between the lower-mold-piece shaping surface LS of the cushion-pad foaming mold 210 and the sheet member 70, and at least the central part of the sheet member 70 deforms into a shape curved in a convex shape on the upper-mold-piece shaping surface US side in each of the right-left direction and the extending direction LD as the sheet member 70 is pressed upward to the upper-mold-piece shaping surface US side through expansion of the foaming resin material (FIGS. 23 and 24). Note that each inner concave part 53 (FIGS. 18 and 19) of the cushion pad 10 described above is formed by the corresponding inner convex part 253.

In the second embodiment, the demolding step can be performed similarly to the first embodiment.

After the demolding step, the cushion pad 10 having the configuration described above with reference to FIGS. 17 to 19 can be obtained.

According to the second embodiment as well, effects same as those of the first embodiment can be achieved.

Note that, in the second embodiment, in the lower-mold-piece shaping surface LS of the lower mold piece 200L of the cushion-pad foaming mold 210, the inner convex parts 253 may be provided at the femoral-region-placed-part shaping surface 211tS between the pair of ridges 252a extending substantially in the extending direction LD and on the front side of the pair of ridges 252b extending substantially in the front-back direction, and in this case, the sheet member 70 may be temporarily fastened to the inner convex parts 253 through the fasteners 260 at the sheet disposition step.

Accordingly, in the cushion pad 10 of the present embodiment, the inner concave parts 53 may be formed at the femoral region-placed part 11t between the pair of grooves 52a extending substantially in the extending direction LD and on the front side of the pair of grooves 52b extending substantially in the front-back direction, and in this case, the sheet member 70 may be disposed at a position overlapping with the inner concave parts 53 in planar view of the cushion pad 10.

Third Embodiment

Subsequently, differences of the seat pad 1 according to a third embodiment of the present disclosure and a seat pad manufacturing method according to the third embodiment of the present disclosure from those of the first and second embodiments will be mainly described below with reference to FIGS. 25 to 34.

Figure 26:
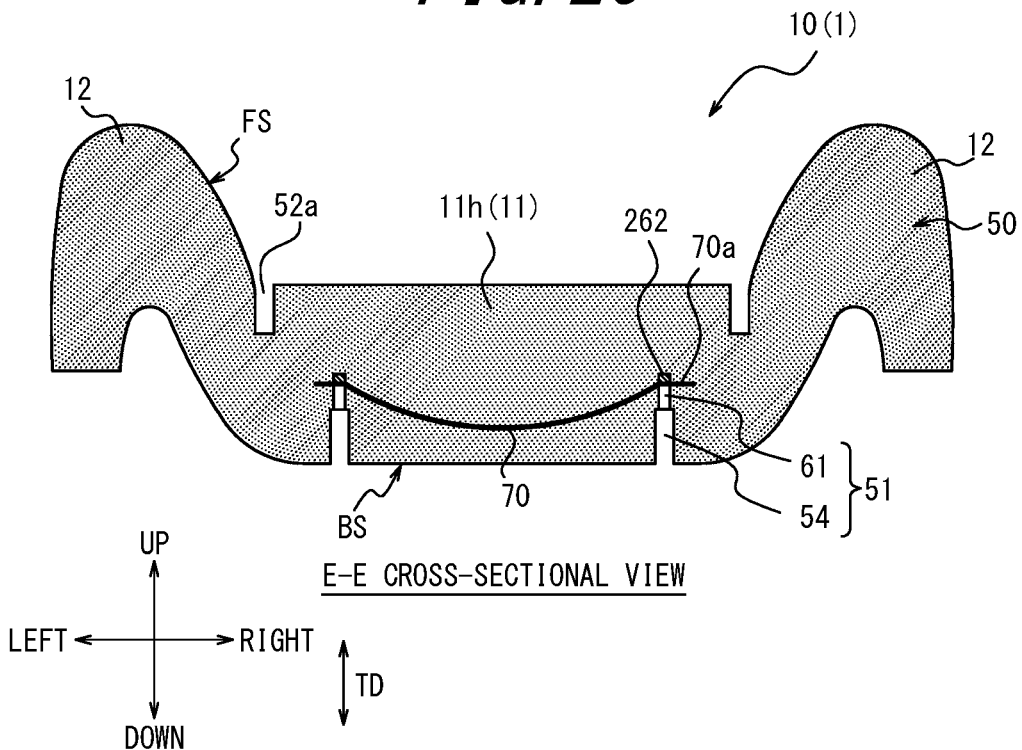
FIG. 26 is a right-left direction cross-sectional view illustrating the cushion pad in FIG. 25 at a section taken along line E-E in FIG. 25.
Figure 27:
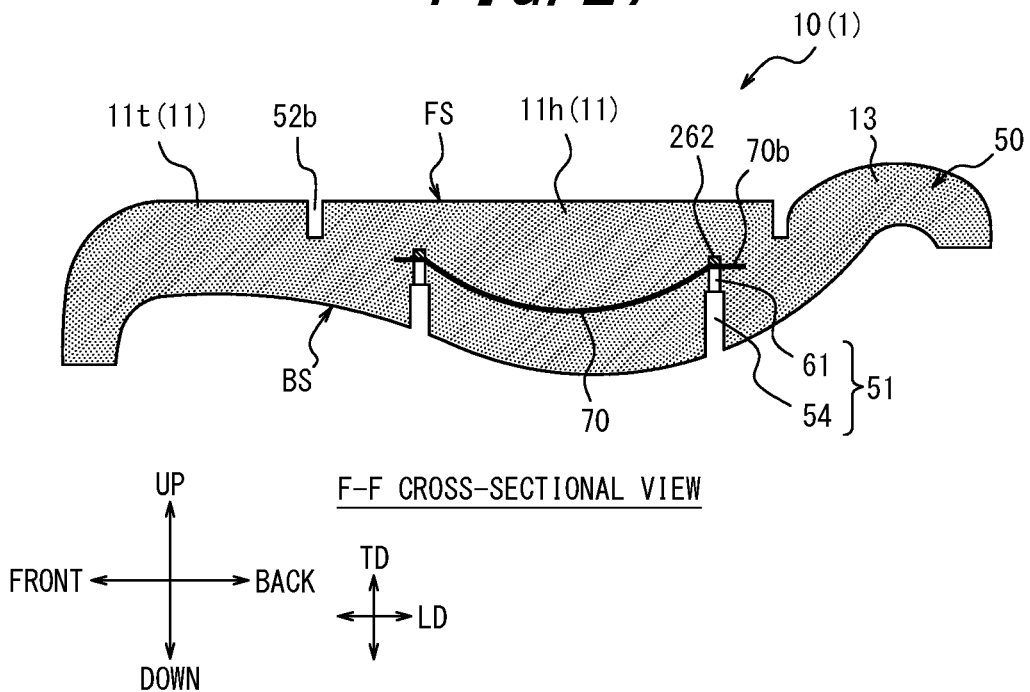
FIG. 27 is a front-back direction (extending direction) cross-sectional view illustrating the cushion pad in FIG. 25 at a section taken along line F-F in FIG. 25.

FIGS. 25 to 27 illustrate the seat pad 1 according to the third embodiment of the present disclosure, which is formed as the cushion pad 10, and FIGS. 28 to 34 are drawings for description of the seat pad manufacturing method according to the third embodiment of the present disclosure, which can be used to manufacture the cushion pad in FIGS. 25 to 27.

In the first and second embodiments described above, at the sheet disposition step, the sheet member 70 is temporarily fastened to the convex part 250 (the ridges 252a and 252b or the inner convex parts 253) provided at the lower-mold-piece shaping surface LS through the fasteners 260.

In the third embodiment, at the sheet disposition step, the sheet member 70 is temporarily fastened to the convex part 250 (back convex parts 254) provided at the upper-mold-piece shaping surface US through the fasteners 260. The other features (such as the curved shape and mesh shape of the sheet member 70 and the configurations of the fasteners 260 and the buried members 262) are same as those of the first embodiment.

First, the seat pad 1 (hereinafter also referred to as the "cushion pad 10") of the present embodiment will be described below with reference to FIGS. 25 to 27. FIG. 25 is a plan view illustrating a situation in which the surface (upper surface) FS of the cushion pad of the present embodiment on the seated person side is planarly viewed. FIG. 26 illustrates the cushion pad 10 in FIG. 25 at a section taken along line E-E extending in the right-left direction in FIG. 25. FIG. 26 illustrates the cushion pad 10 in FIG. 25 at a section taken along line F-F extending in the front-back direction (extending direction LD) in FIG. 25.

As illustrated in FIGS. 25 to 27, in the resin foamed body 50 of the cushion pad 10, the plurality of bottomed concave parts (reaching concave parts) 51 opened at the back surface BS of the seat pad 1 (cushion pad 10) and extending to and terminating at the sheet member 70 are formed in the main pad part 11, more specifically, the under-hip part 11h. In the present example, each reaching concave part 51 is constituted by a back concave part 54 opened at the back surface BS, extending in the thickness direction TD, and terminating before reaching the sheet member 70, and a coupling hole 61 extending in the thickness direction TD from a bottom surface of the back concave part 54 to the sheet member 70 (FIGS. 26 and 27).

In planar view of the seat pad 1 (cushion pad 10) (FIG. 25), the plurality of buried members 262 buried in the resin foamed body 50 are each provided at a position overlapping with the corresponding reaching concave part 51. More specifically, the plurality of buried members 262 buried in the resin foamed body 50 each face the corresponding reaching concave part 51 through the sheet member 70 (FIGS. 26 and 27). Each buried member 262 is provided for the corresponding one reaching concave part 51. Note that each coupling hole 61 is formed by the first fastener component 261 (FIGS. 33 and 34) as part of the corresponding fastener 260 used in manufacturing of the seat pad 1. Each back concave part 54 is formed by the corresponding back convex part 254 (FIGS. 33 and 34) as the convex part 250 provided at the upper-mold-piece shaping surface US of the upper mold piece 200U of the cushion-pad foaming mold 210 used in manufacturing of the seat pad 1.

As illustrated in FIGS. 26 and 27, the plurality of buried members 262 buried in the resin foamed body 50 each contact a surface of the sheet member 70 on any one side (in the illustrated example, a surface on the surface FS side on the seated person side).

In planar view of the seat pad 1 (cushion pad 10) (FIG. 25), both end parts 70a of the sheet member 70 in the right-left direction and both end parts 70b of the sheet member 70 in the extending direction LD each overlap with one or the plurality of buried members 262.

More specifically, in planar view of the seat pad 1 (cushion pad 10), at least one (in the example of FIG. 26, both) of both end parts 70a of the sheet member 70 in the right-left direction overlaps with the corresponding some of the buried members 262 at a plurality (in the example of FIG. 26, two) of positions separated from each other in the extending direction LD. In addition, in planar view of the seat pad 1 (cushion pad 10), at least one (in the example of FIG. 26, both) of both end parts 70b of the sheet member 70 in the extending direction LD overlaps with the corresponding some of the buried members 262 at a plurality (in the example of FIG. 26, three) of positions separated from each other in the right-left direction.

In the present embodiment as well, as illustrated in FIGS. 26 and 27, at least the central part of the sheet member 70 (in the illustrated example, the part on the inner periphery side of the plurality of buried members 262) is curved in a convex shape on the back surface (lower surface) BS side of the cushion pad 10 in each of the right-left direction and the extending direction LD (FIGS. 26 and 27).

Subsequently, the seat pad manufacturing method according to the third embodiment of the present disclosure for manufacturing the seat pad 1 according to the third embodiment of the present disclosure (cushion pad 10) described above will be described below with reference to FIGS. 28 to 34.

Figure 28:
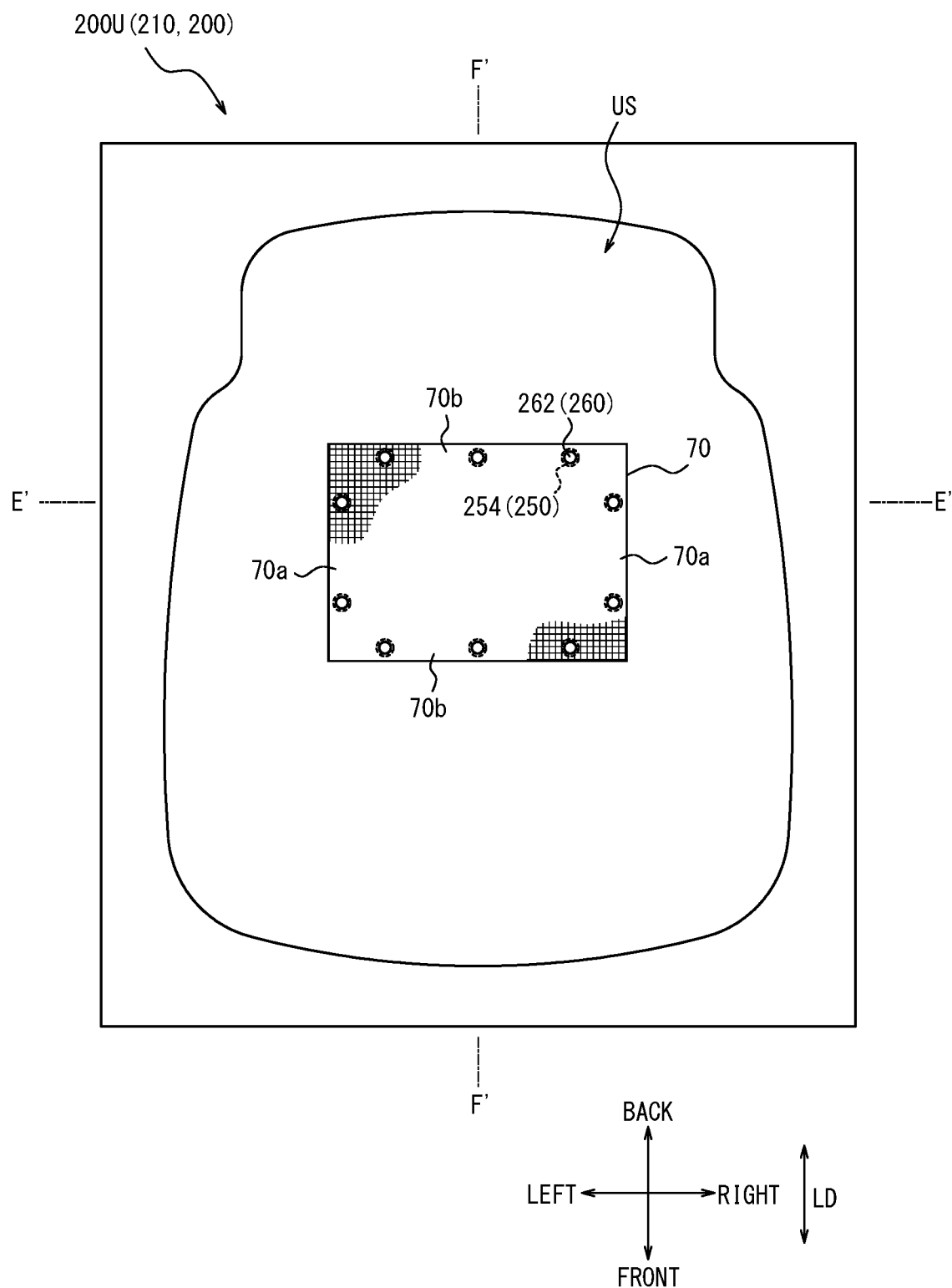
FIG. 28 is a plan view illustrating an upper mold piece of a cushion-pad foaming mold for shaping the cushion pad in FIG. 25 in a state before a foaming resin material is injected.

As illustrated in FIGS. 28 to 30, the plurality of back convex parts 254 as the convex part 250 are formed at the upper-mold-piece shaping surface US of the cushion-pad foaming mold 210 used to manufacture the cushion pad 10 in the present embodiment.

At the sheet disposition step, as illustrated in FIGS. 28 to 30, both end parts 70a of the sheet member 70 in the right-left direction and both end parts 70b of the sheet member 70 in the extending direction LD are temporarily fastened through the fasteners 260 to the back convex parts 254 as the convex part 250 provided at the upper-mold-piece shaping surface US.

In the present example, as illustrated in FIG. 28, at least one (in the illustrated example, both) of both end parts 70a of the sheet member 70 in the right-left direction is temporarily fastened to the convex part 250 (specifically, the back convex parts 254) of the upper mold piece 200U through the corresponding some of the fasteners 260 at a plurality (in the illustrated example, two) of positions separated from each other in the extending direction LD. In addition, at least one (in the illustrated example, both) of both end parts 70b of the sheet member 70 in the extending direction LD is temporarily fastened to the convex part 250 (specifically, the back convex parts 254) of the upper mold piece 200U through the corresponding some of the fasteners 260 at a plurality (in the illustrated example, three) of positions separated from each other in the right-left direction.

As illustrated in FIGS. 29 and 30, in the present example, each fastener 260 includes the first fastener component 261 made of one (in the present example, a magnet) among a metal and a magnet, and the second fastener component 262 made of the other (in the present example, metal) of a metal and a magnet. The first fastener component 261 is fixed to the edge surface (lower surface) of the convex part 250 (specifically, the back convex parts 254) of the upper mold piece 200U. Each second fastener component 262 is disposed on the side opposite to the corresponding first fastener component 261 through the sheet member 70 at the sheet disposition step so that the sheet member 70 is sandwiched between the second fastener component 262 and the first fastener component 261. Accordingly, each second fastener component 262 faces the corresponding first fastener component 261 through the sheet member 70 (FIGS. 29 and 30).

In the present example, since each fastener 260 is formed as described above, the sheet member 70 is sandwiched between the first fastener component 261 and the second fastener component 262 and detachably fixed (temporarily fastened) to the upper-mold-piece shaping surface US by magnetic force acting between the first fastener component 261 and the second fastener component 262.

Note that, in the illustrated example, at the sheet disposition step, the sheet member 70 is disposed in a flat shape so that the sheet member 70 is separated from both the lower-mold-piece shaping surface LS of the lower mold piece 200L and the upper-mold-piece shaping surface US of the upper mold piece 200U when mold clamping is performed at the subsequent foaming step.

Figure 31:
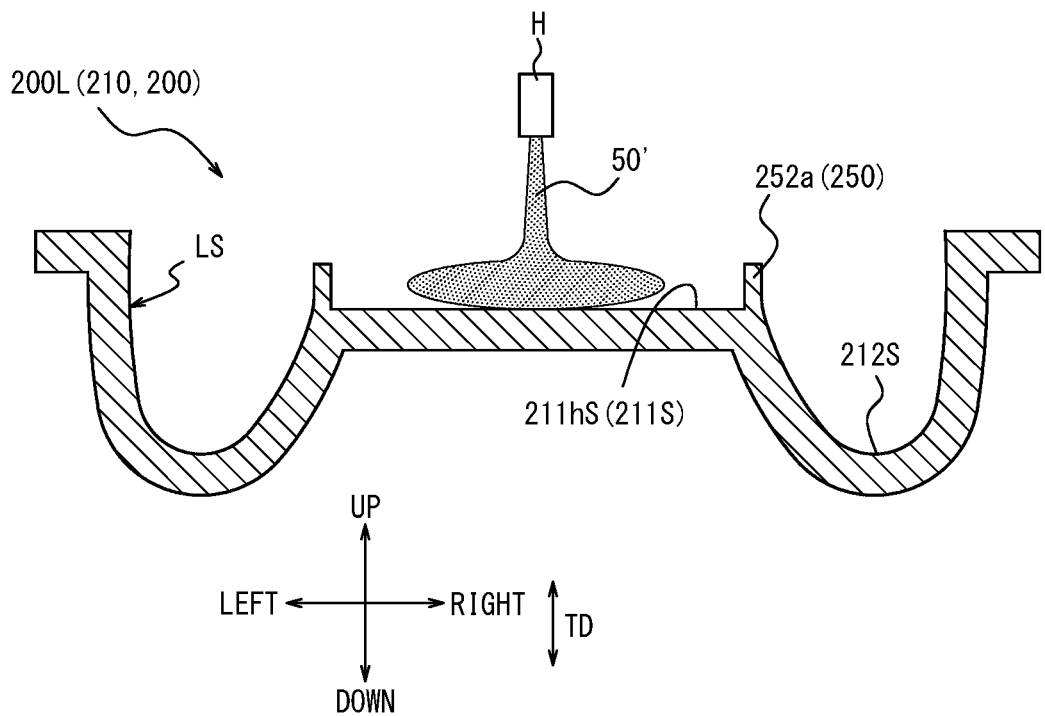
FIG. 31 is a right-left direction cross-sectional view illustrating a situation in which the foaming resin material is injected into a lower mold piece fitted to the upper mold piece in FIG. 29.
Figure 32:
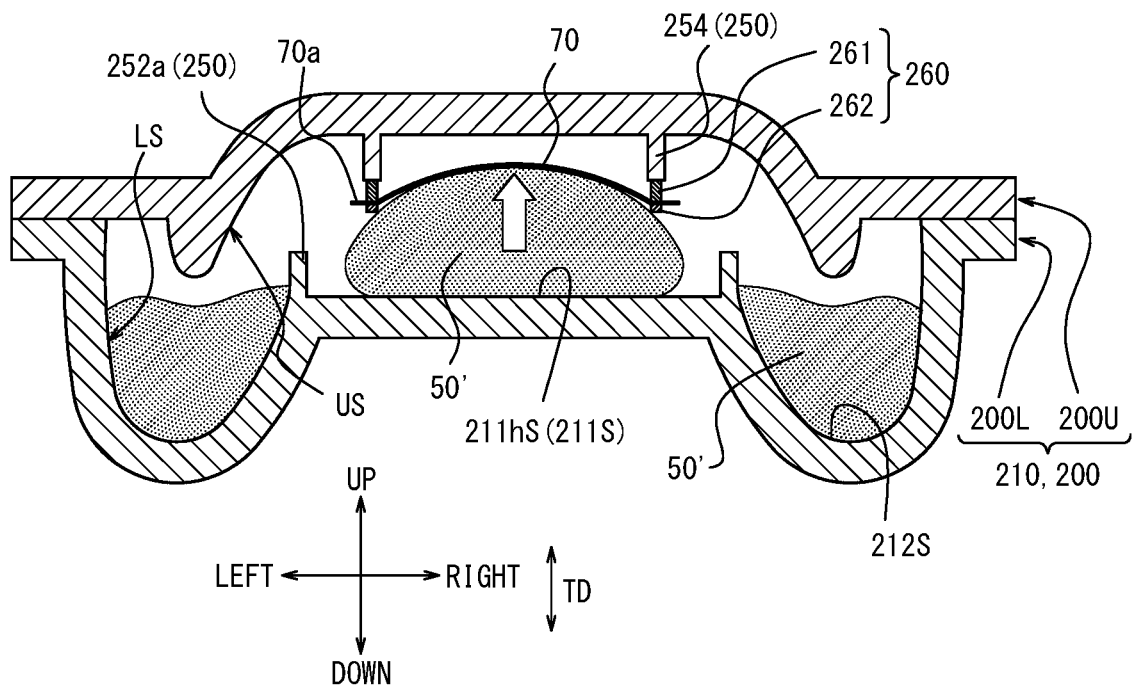
FIG. 32 is a right-left direction cross-sectional view illustrating a situation in which the injected foaming resin material expands inside the cushion-pad foaming mold in which the upper mold piece in FIG. 29 is fitted to the lower mold piece in FIG. 31.
Figure 33:
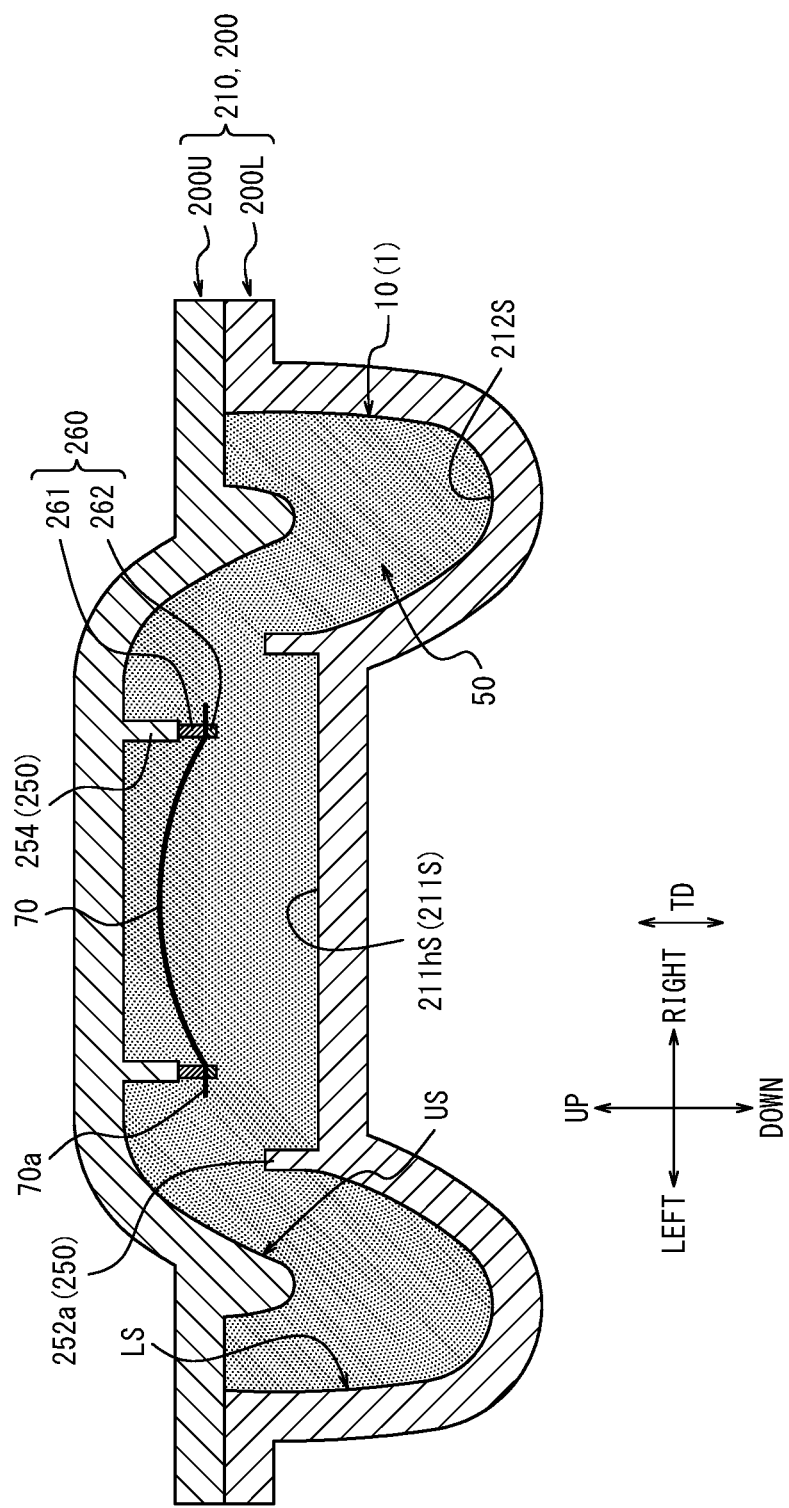
FIG. 33 is a right-left direction cross-sectional view illustrating a situation in which a resin foamed body is foamed in the cushion-pad foaming mold in FIG. 32.
Figure 34:
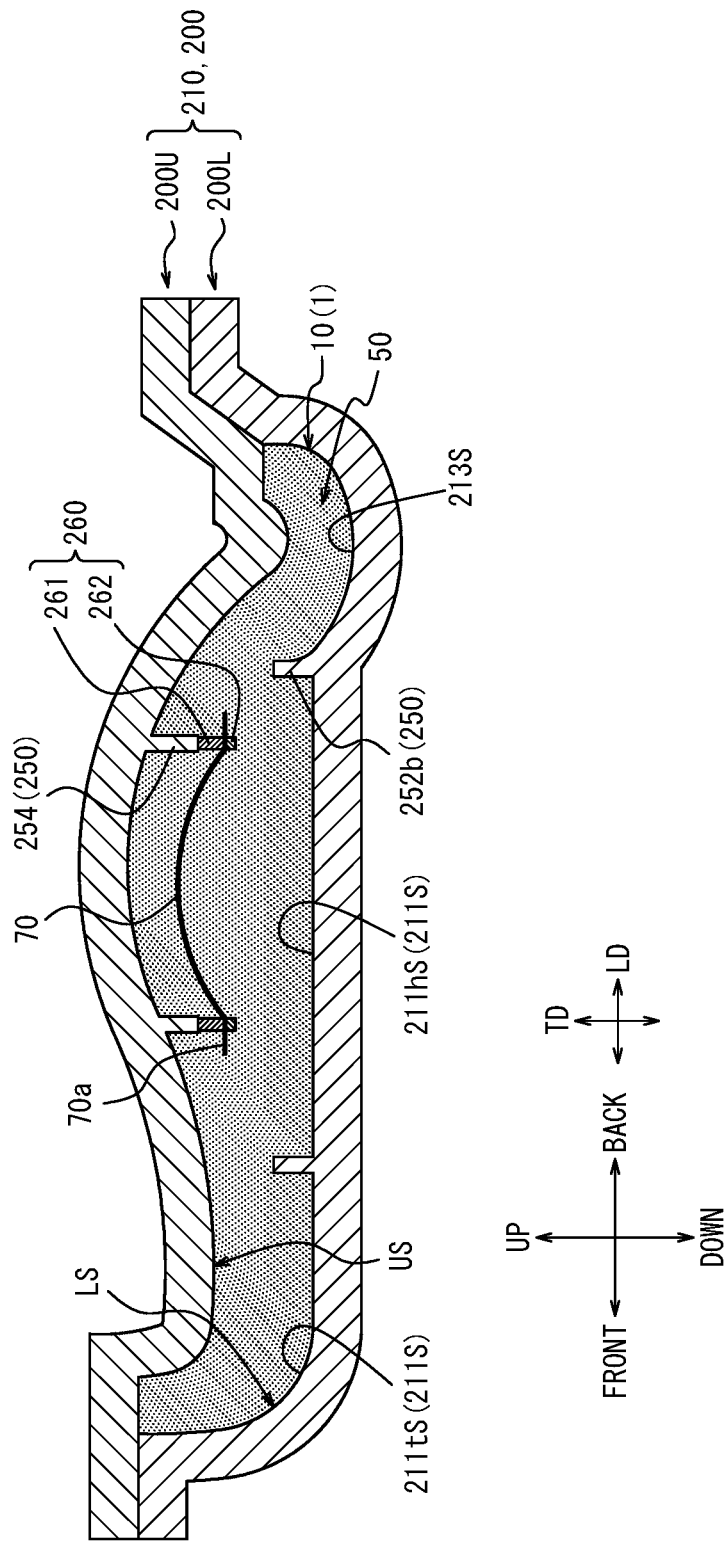
FIG. 34 is a front-back direction (extending direction) cross-sectional view illustrating the cushion-pad foaming mold in the state in FIG. 33.

First at the foaming step, as illustrated in FIG. 31, the foaming resin material 50' that is liquid is injected onto the lower-mold-piece shaping surface LS of the cushion-pad foaming mold 210. In this case, since the sheet member 70 is attached to the upper-mold-piece shaping surface US as described above (FIGS. 29 and 30), the foaming resin material 50' is injected onto the lower-mold-piece shaping surface LS not through the sheet member 70. Thereafter, as illustrated in FIG. 32, mold clamping is performed by fitting the upper mold piece 200U to the lower mold piece 200L, and accordingly, the sheet member 70 is positioned close and opposite to the foaming resin material 50' on the lower-mold-piece shaping surface LS. In this state, part of the sheet member 70 other than places temporarily fastened by the fasteners 260 is pressed upward to the upper-mold-piece shaping surface US side (upper side) as the foaming resin material 50' disposed at the space between the lower-mold-piece shaping surface LS and the sheet member 70 gradually expands, and accordingly, at least the central part of the sheet member 70 (specifically, part on the inner periphery side of the temporarily fastened places) deforms into a shape curved in a convex shape on the upper-mold-piece shaping surface US side (upper side) in each of the right-left direction and the extending direction LD. In this manner, the resin foamed body 50 is foamed in a cavity partitioned by the lower mold piece 200L and the upper mold piece 200U (FIGS. 33 and 34).

Note that each back concave part 54 (FIGS. 26 and 27) of the cushion pad 10 described above is formed by the corresponding back convex part 254.

In the third embodiment, the demolding step can be performed similarly to the first and second embodiments. Note that each second fastener component 262 remains inside the resin foamed body 50 and becomes the above-described buried member 262, and each first fastener component 261 remains on the upper mold piece 200U side.

After the demolding step, the cushion pad 10 having the configuration described above with reference to FIGS. 25 to 27 can be obtained.

According to the third embodiment as well, effects same as those of the first embodiment can be achieved.

Note that, in the cushion pad 10 in the example of FIGS. 25 to 27, the area of the sheet member 70 is smaller than the area of the under-hip part 11h in planar view of the cushion pad 10 (FIG. 25). In the cushion-pad foaming mold 210 in the example of FIGS. 28 to 34, the area of the sheet member 70 is smaller than the area of the under-hip-part shaping surface 211hS in a planar view of the upper mold piece 200U.

However, the third embodiment is not limited to the illustrated example, but the area of the sheet member 70 may be equal to or larger than the area of the under-hip part 11h in planar view of the cushion pad 10, and the area of the sheet member 70 may be equal to or larger than the area of the under-hip-part shaping surface 211hS in planar view of the upper mold piece 200U of the cushion-pad foaming mold 210. In this case, the back concave parts 54 of the cushion pad 10 may be provided at positions overlapping with the grooves 52a and 52b provided at the surface FS of the cushion pad 10 on the seated person side in planar view of the cushion pad 10, and the back convex parts 254 of the upper mold piece 200U may be provided at positions overlapping with the ridges 252a and 252b provided at the lower-mold-piece shaping surface LS of the lower mold piece 200L in a planar view of the cushion-pad foaming mold 210 being clamped.

Alternatively, the back convex parts 254 may be provided at the femoral-region-placed-part shaping surface 211tS of the upper mold piece 200U of the cushion-pad foaming mold 210, or the back concave parts 54 may be provided at positions overlapping with the femoral region-placed part 11t of the cushion pad 10 in planar view of the cushion pad 10.

Fourth Embodiment

Subsequently, differences of the seat pad 1 according to a fourth embodiment of the present disclosure and a seat pad manufacturing method according to the fourth embodiment of the present disclosure from those of the first embodiment will be mainly described below with reference to FIGS. 35 to 37.

Figure 35:
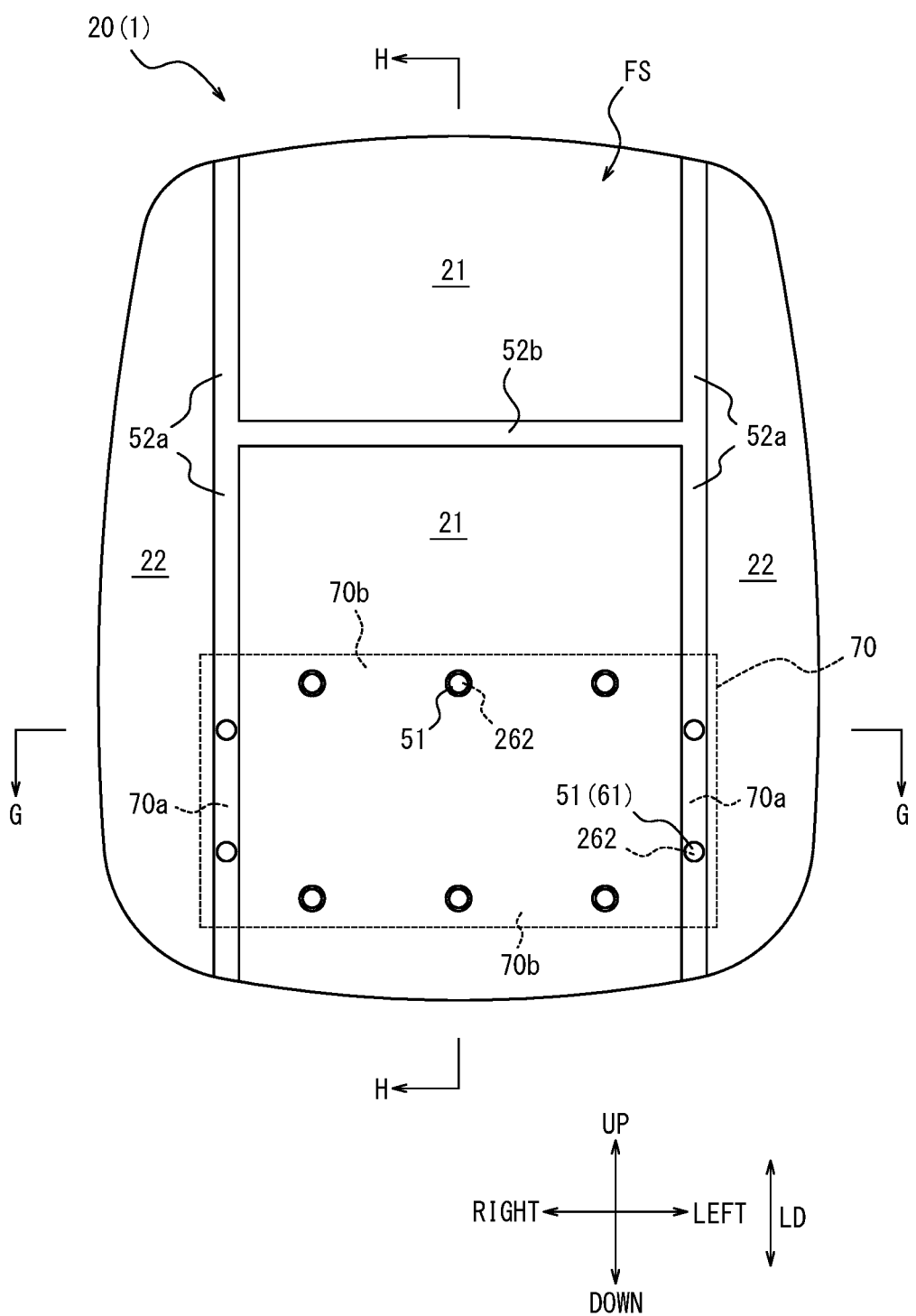
FIG. 35 is a plan view illustrating a seat pad according to a fourth embodiment of the present disclosure, which is formed as a back pad.
Figure 36:
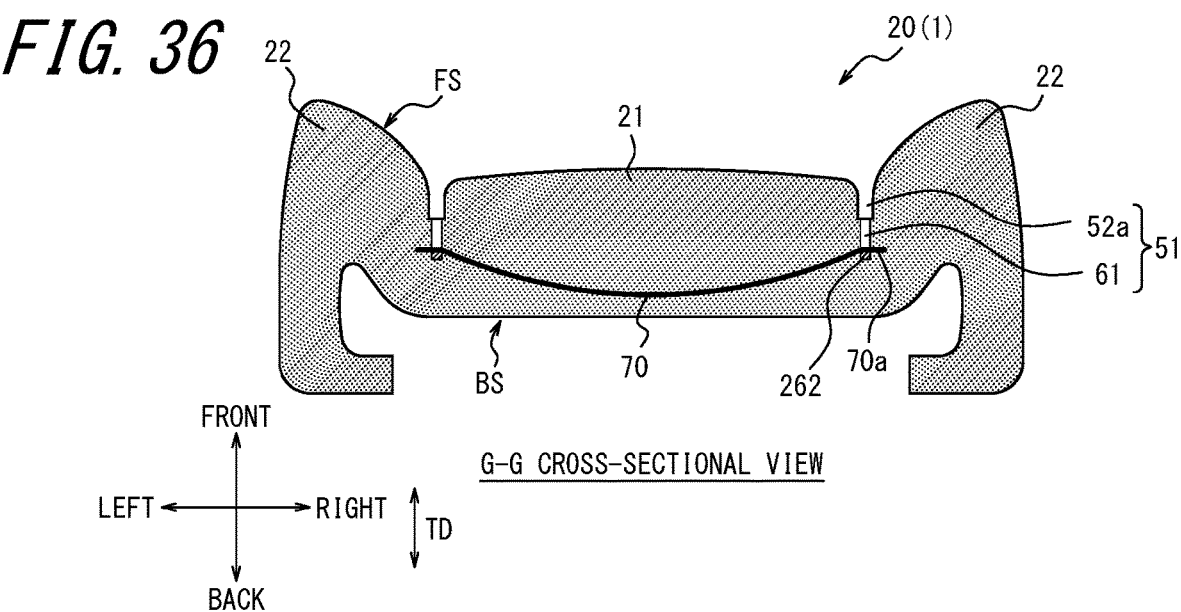
FIG. 36 is a right-left direction cross-sectional view illustrating the back pad in FIG. 35 at a section taken along line G-G in FIG. 35.
Figure 37:
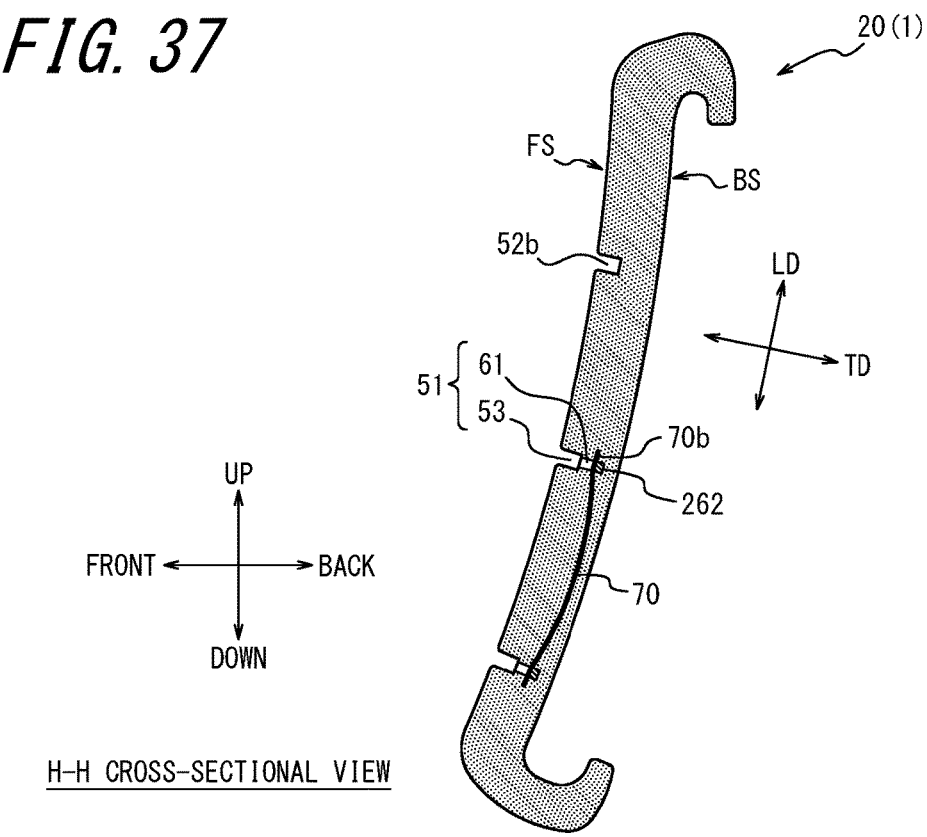
FIG. 37 is an extending direction cross-sectional view illustrating the back pad in FIG. 35 at a section taken along line H-H in FIG. 35.
Figure 38:
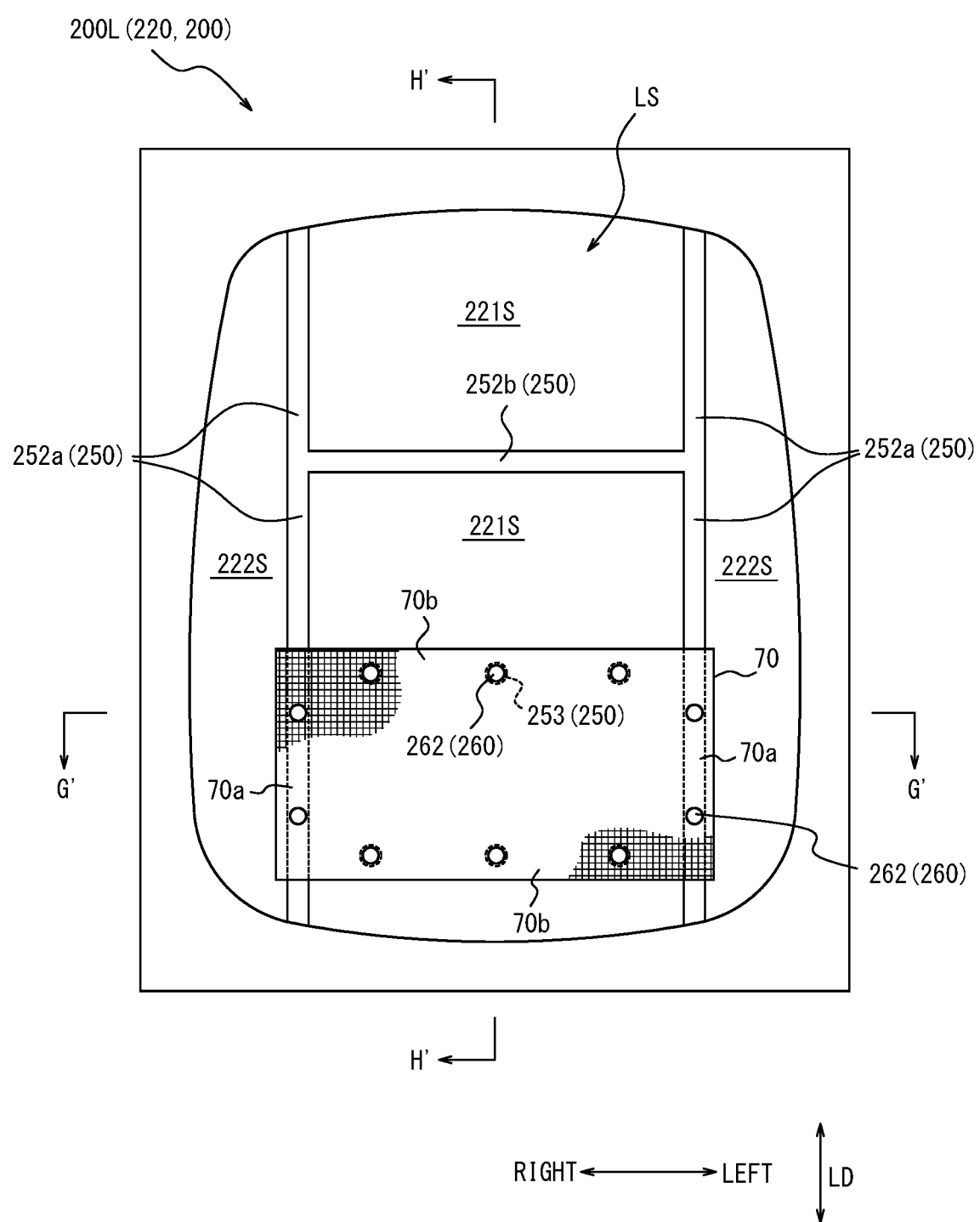
FIG. 38 is a plan view illustrating a lower mold piece of a back-pad foaming mold for shaping the back pad in FIG. 35 in a state before a foaming resin material is injected.
Figure 39:
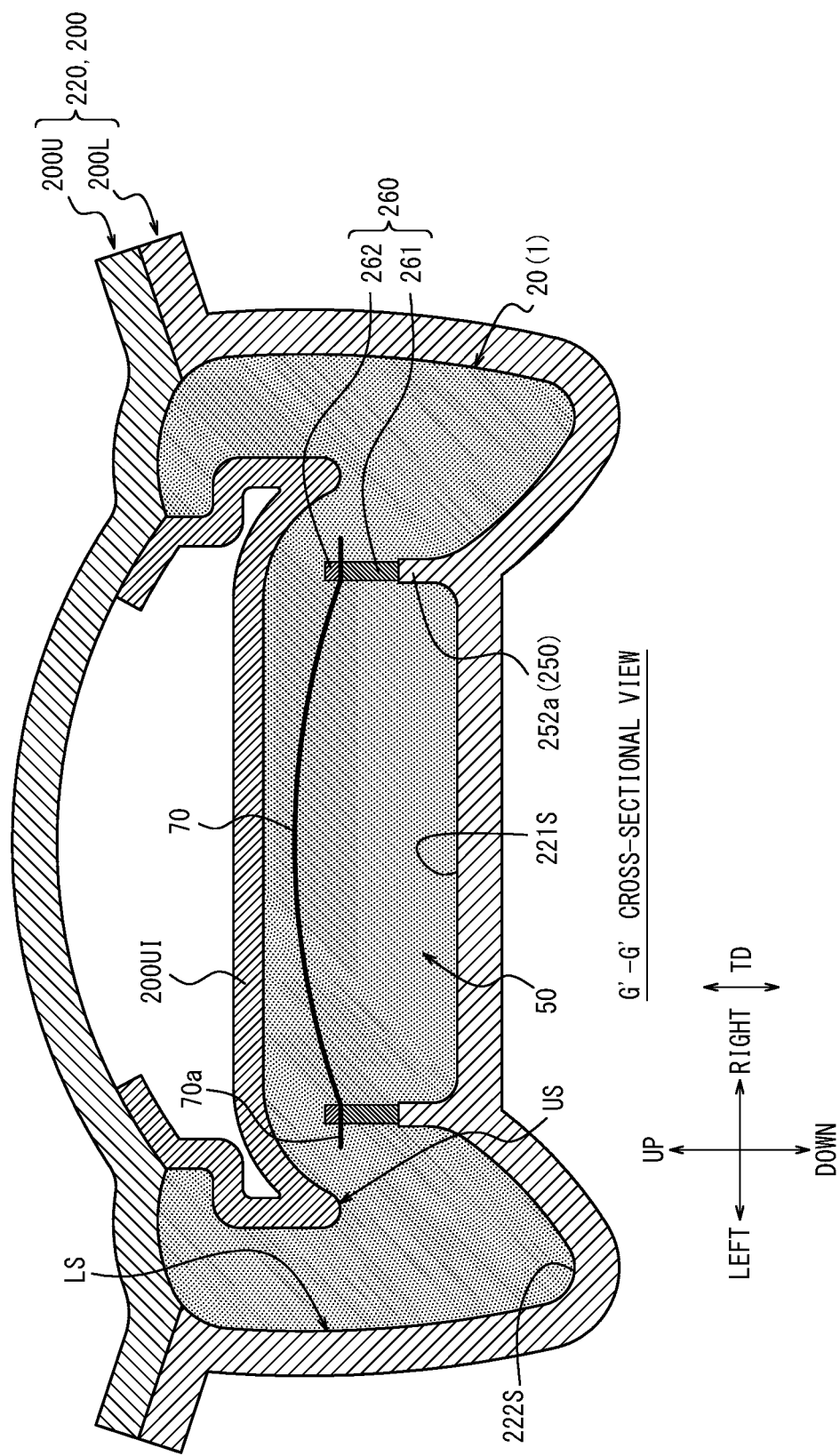
FIG. 39 is a right-left direction cross-sectional view illustrating a situation in which a resin foamed body is foamed in the back-pad foaming mold in which an upper mold piece is fitted to the lower mold piece in FIG. 38 at a section taken along line G'-G' in FIG. 38.
Figure 40:
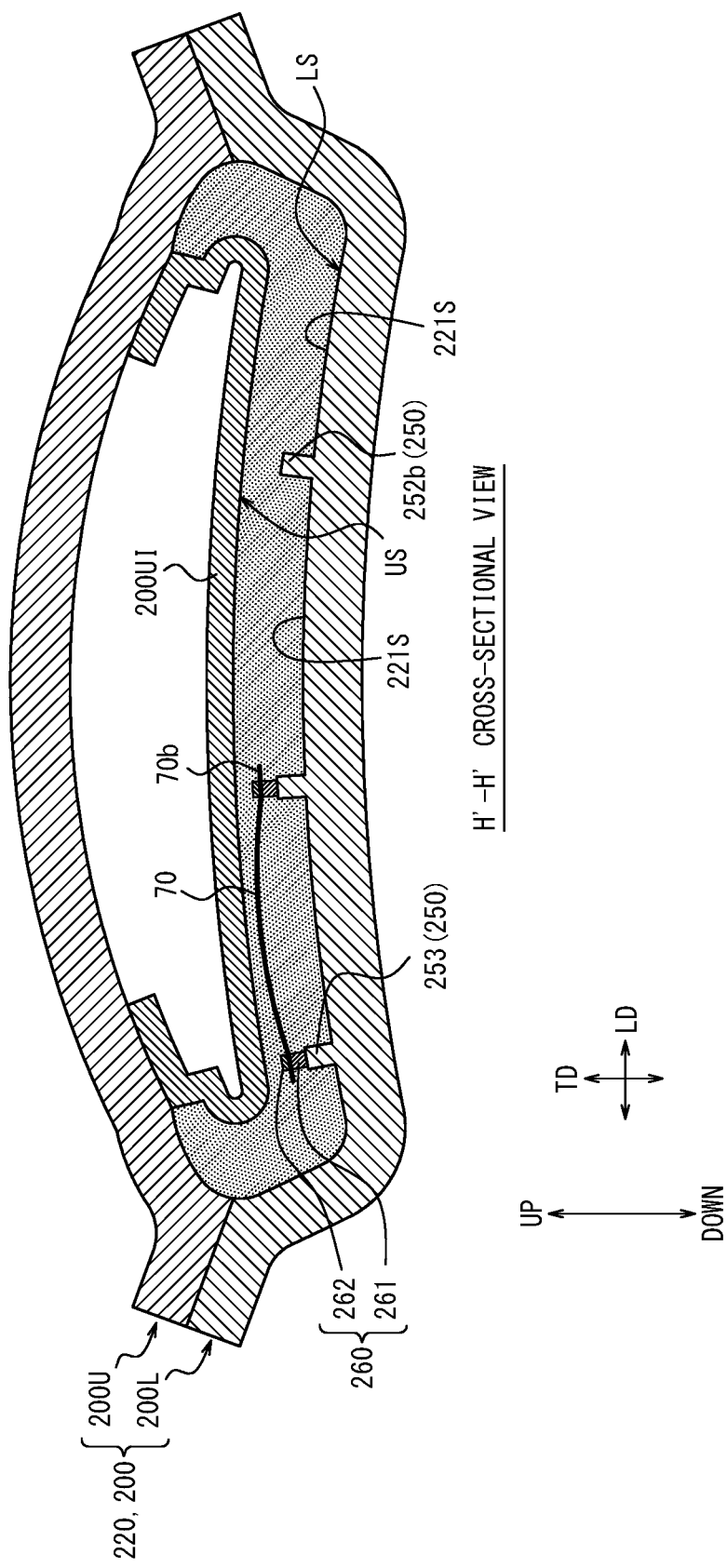
FIG. 40 is an extending direction cross-sectional view illustrating the back-pad foaming mold in the state in FIG. 39 at a section taken along line H'-H' in FIG. 38.

FIGS. 35 to 37 illustrate the seat pad 1 according to the fourth embodiment of the present disclosure, which is formed as the back pad 20, and FIGS. 38 to 40 are drawings for description of the seat pad manufacturing method according to the fourth embodiment of the present disclosure, which can be used to manufacture the back pad 20 in FIGS. 35 to 37.

In the fourth embodiment, the sheet member 70 is buried in the back pad 20, not in the cushion pad 10.

First, the seat pad 1 (hereinafter also referred to as the "back pad 20") of the fourth embodiment will be described below with reference to FIGS. 35 to 37. FIG. 35 is a plan view illustrating a situation in which the surface (front surface) FS of the back pad 20 of the present embodiment on the seated person side is planarly viewed. FIG. 36 illustrates the back pad 20 in FIG. 35 at a section taken along line G-G extending in the right-left direction in FIG. 35. FIG. 37 illustrates the back pad 20 in FIG. 35 at a section taken along line H-H extending in the extending direction LD in FIG. 35.

As illustrated in FIGS. 35 to 37, the back pad 20 of the present embodiment includes the resin foamed body 50, and the sheet member 70 buried in the resin foamed body 50.

Resin of which the resin foamed body 50 is made is flexible resin, and specifically, is preferably elastomer resin, more preferably polyurethane.

The resin foamed body 50 forms the surface FS of the back pad on the seated person side and the back surface BS thereof. A plurality (in the illustrated example, two) grooves 52a extending substantially in the extending direction LD and separated from each other in the right-left direction, and one or a plurality (in the illustrated example, one) of grooves 52b extending substantially in the right-left direction are formed at the surface FS of the back pad 20 on the seated person side. In the illustrated example, the two grooves 52a extending substantially in the extending direction LD each serve as a boundary between the main pad part 21 and the corresponding side pad part 22. However, the grooves 52a and 52b may be formed at the surface FS of the back pad 20 on the seated person side in a configuration different from that in FIG. 35.

For example, attachments for attaching the top skin 30 (FIG. 1) are provided at the grooves 52a and 52b.

The sheet member 70 has a sheet shape that is thin in the thickness direction TD of the seat pad 1. The sheet member 70 is disposed at a position separated from both the surface FS of the seat pad 1 on the seated person side and the back surface BS thereof. As illustrated in FIGS. 36 and 37, at least the central part of the sheet member 70 is curved in a convex shape on the back surface (rear surface) BS side of the back pad 20 in each of the right-left direction and the extending direction LD. Specifically, at least the central part of the sheet member 70 is curved in a substantially spherical shape that is convex on the back surface (rear surface) BS side of the back pad 20. In the illustrated example, a part (in other words, a part on the inner periphery side of the plurality of buried members 262) surrounded by a plurality of buried members 262 to be described later, which are disposed at both end parts 70a in the right-left direction and both end parts 70b in the extending direction LD in the sheet member 70 is curved in a convex shape on the back surface BS side of the back pad 20 in each of the right-left direction and the extending direction LD.

As illustrated in FIGS. 35 to 37, the back pad 20 also includes the plurality of buried members 262 made of a metal or a magnet and buried in the resin foamed body 50. In the present example, each buried member 262 is made of a metal. Note that each buried member 262 is a second fastener component 262 (FIGS. 39 and 40) as part of the corresponding fastener 260 used in manufacturing of the seat pad 1.

The plurality of buried members 262 each contact a surface of the sheet member 70 on any one side (in the illustrated example, a surface on the back surface BS side).

In planar view (FIG. 35) of the seat pad 1 (back pad 20), both end parts 70a of the sheet member 70 in the right-left direction and both end parts 70b of the sheet member 70 in the extending direction LD each overlap with one or the plurality of buried members 262.

More specifically, in planar view of the seat pad 1 (back pad at least one (in the example illustrated in FIG. 2, both) of both end parts 70a of the sheet member 70 in the right-left direction overlaps with the corresponding some of the buried members 262 at a plurality (in the example illustrated in FIG. 2, two) of positions separated from each other in the extending direction LD. In addition, in planar view of the seat pad 1 (back pad 20), at least one (in the example illustrated in FIG. 2, both) of both end parts 70b of the sheet member 70 in the extending direction LD overlaps with the corresponding some of the buried members 262 at a plurality (in the example illustrated in FIG. 2, three) of positions separated from each other in the right-left direction.

In planar view (FIG. 35) of the seat pad 1 (back pad 20), at least some (in the example of FIG. 35, only some) of the plurality of buried members 262 buried in the resin foamed body 50 are provided at positions overlapping with the grooves 52a and 52b provided at the surface FS of the seat pad 1 (back pad 20) on the seated person side.

As illustrated in FIGS. 35 to 37, the plurality of bottomed concave parts (hereinafter referred to as "reaching concave parts") 51 opened at the surface FS of the seat pad 1 (back pad 20) on the seated person side or the back surface BS (in the illustrated example, the surface FS on the seated person side) and extending to and terminating at the sheet member 70 are formed in the resin foamed body 50. In the present example, some of the reaching concave parts 51 overlap with the grooves 52a extending substantially in the extending direction LD in planar view (FIG. 35) of the back pad 20, and are each constituted by an above-described groove 52a opened at the surface FS on the seated person side, extending in the thickness direction TD, and terminating before reaching the sheet member 70 at the section (FIG. 36) in the thickness direction TD, and a coupling hole 61 extending in the thickness direction TD from the groove bottom surface of the groove 52a to the sheet member 70. Each remaining reaching concave part 51 among the plurality of reaching concave parts 51 formed in the resin foamed body 50 is disposed between the pair of grooves 52a extending substantially in the extending direction LD in planar view (FIG. 35) of the back pad 20, and is composed of an inner concave part 53 opened at the surface FS on the seated person side, extending in the thickness direction TD, and terminating before reaching the sheet member 70 at the section (FIG. 37) in the thickness direction TD, and a coupling hole 61 extending in the thickness direction TD from the bottom surface of the inner concave part 53 to the sheet member 70. The plurality of buried members 262 buried in the resin foamed body 50 face the respective reaching concave parts 51 through the sheet member 70. Note that each coupling hole 61 is formed by the first fastener component 261 (FIGS. 39 and 40) as part of the corresponding fastener 260 used in manufacturing of the seat pad 1.

Subsequently, the seat pad manufacturing method according to the fourth embodiment of the present disclosure for manufacturing the seat pad 1 according to the fourth embodiment of the present disclosure (the back pad 20) described above will be described below with reference to FIGS. 38 to 40.

In the present embodiment, the back pad 20 is manufactured by using a back-pad foaming mold 220. As illustrated in FIGS. 39 and 40, the back-pad foaming mold 220 includes the lower mold piece 200L having the lower-mold-piece shaping surface LS and provided for shaping the surface FS of the back pad 20 on the seated person side, and the upper mold piece 200U having the upper-mold-piece shaping surface US and provided for shaping the back surface BS of the back pad 20. The upper mold piece 200U is disposed on the upper side of the lower mold piece 200L in the vertical direction. The lower-mold-piece shaping surface LS includes a main-pad-part (seating-part) shaping surface 221S provided for shaping the surface FS on the seated person side of the main pad part (seating part) 21 of the back pad 20, and a pair of side-pad-part shaping surfaces 222S positioned on the right and left sides of the main-pad-part (seating-part) shaping surface 221S and provided for shaping the surface FS on the seated person side of the pair of side pad parts 22 of the back pad 20. In the illustrated example, the upper mold piece 200U includes a core 200UI, and the core 200UI includes the upper-mold-piece shaping surface US. However, the upper mold piece 200U may include no core 200UI.

In the present embodiment, as illustrated in FIG. 38, a plurality (in the illustrated example, two) of ridges 252a extending substantially in the extending direction LD and separated from each other in the right-left direction, and one or a plurality (in the illustrated example, one) of ridges 252b extending substantially in the right-left direction are formed at the lower-mold-piece shaping surface LS. The ridges 252a extending substantially in the extending direction LD are provided to shape the grooves 52a (FIG. 35) extending substantially in the extending direction LD in the back pad and the ridges 252b extending substantially in the right-left direction are provided to shape the grooves 52b (FIG. 35) extending substantially in the right-left direction in the back pad 20. In the illustrated example, the two ridges 252a extending substantially in the extending direction LD each serve as a boundary between the main-pad-part shaping surface 221S and the corresponding one of the side-pad-part shaping surfaces 222S. However, the ridges 252a and 252b may be formed at the lower-mold-piece shaping surface LS in a configuration different from that in FIG. 38.

At the lower-mold-piece shaping surface LS of the back-pad foaming mold 220 used to manufacture the back pad 20 in the present example, as illustrated in FIGS. 38 and 40, the plurality of inner convex parts 253 as the convex part 250 are formed between the pair of ridges 252a extending substantially in the extending direction LD at the main-pad-part shaping surface 221S.

At the sheet disposition step, as illustrated in FIGS. 38 to 40, both end parts 70a of the sheet member 70 in the right-left direction are temporarily fastened through the fasteners 260 to the ridges 252a as the convex part 250 provided at the lower-mold-piece shaping surface LS, and both end parts 70b of the sheet member 70 in the extending direction LD are temporarily fastened through the fasteners 260 to the inner convex parts 253 as the convex part 250 provided at the lower-mold-piece shaping surface LS.

In the present example, as illustrated in FIG. 38, at least one (in the illustrated example, both) of both end parts 70a of the sheet member 70 in the right-left direction is temporarily fastened to the convex part 250 (specifically, the ridges 252a) of the lower mold piece 200L through the corresponding some of the fasteners 260 at a plurality (in the illustrated example, two) of positions separated from each other in the extending direction LD. In addition, at least one (in the illustrated example, both) of both end parts 70b of the sheet member 70 in the extending direction LD is temporarily fastened to the convex part 250 (specifically, the inner convex parts 253) of the lower mold piece 200L through the corresponding some of the fasteners 260 at a plurality (in the illustrated example, three) of positions separated from each other in the right-left direction.

As illustrated in FIGS. 39 and 40, in the present example, each fastener 260 includes the first fastener component 261 made of one (in the present example, a magnet) among a metal and a magnet, and the second fastener component 262 made of the other (in the present example, metal) of a metal and a magnet. The first fastener component 261 is fixed to the edge surface (upper surface) of the convex part 250 (specifically, the ridges 252a, the inner convex part 253) of the lower mold piece 200L. Each second fastener component 262 is disposed on the side opposite to the corresponding first fastener component 261 through the sheet member 70 at the sheet disposition step so that the sheet member 70 is sandwiched between the second fastener component 262 and the first fastener component 261. Accordingly, each second fastener component 262 faces the corresponding first fastener component 261 through the sheet member (FIGS. 39 and 40).

In the present example, since each fastener 260 is formed as described above, the sheet member 70 is sandwiched between the first fastener component 261 and the second fastener component 262 and detachably fixed (temporarily fastened) to the lower-mold-piece shaping surface LS by magnetic force acting between the first fastener component 261 and the second fastener component 262.

Note that, in the illustrated example, at the sheet disposition step, the sheet member 70 is disposed in a flat shape so that the sheet member 70 is separated from both the lower-mold-piece shaping surface LS of the lower mold piece 200L and the upper-mold-piece shaping surface US of the upper mold piece 200U when mold clamping is performed at the subsequent foaming step.

In the fourth embodiment, the foaming step can be performed similarly to the first embodiment. FIGS. 39 and 40 illustrate a situation in which the resin foamed body 50 is foamed in the back-pad foaming mold 220 being clamped in the present embodiment. At the foaming step, the foaming resin material 50' that is liquid is injected into the space between the lower-mold-piece shaping surface LS of the back-pad foaming mold 220 and the sheet member 70, and at least the central part of the sheet member 70 deforms into a shape curved in a convex shape on the upper-mold-piece shaping surface US side in each of the right-left direction and the extending direction LD as the sheet member 70 is pressed upward to the upper-mold-piece shaping surface US side through expansion of the foaming resin material (FIGS. 39 and 40).

Note that each inner concave part 53 (FIG. 37) of the back pad described above is formed by the corresponding inner convex part 253.

In the fourth embodiment, the demolding step can be performed similarly to the first embodiment.

After the demolding step, the back pad 20 having the configuration described above with reference to FIGS. 35 to 37 can be obtained.

As described above, at the foaming step in the method for manufacturing the seat pad 1 (back pad 20) of the present embodiment, the foaming resin material 50' that is liquid is injected into the space between the lower-mold-piece shaping surface LS of the back-pad foaming mold 220 and the sheet member 70, and at least the central part of the sheet member 70 deforms into a shape curved in a convex shape on the upper-mold-piece shaping surface US side in each of the right-left direction and the extending direction LD as the sheet member 70 is pressed upward to the upper-mold-piece shaping surface US side through expansion of the foaming resin material (FIGS. 39 and 40).

Accordingly, in the seat pad 1 (back pad 20) of the present embodiment, at least the central part of the sheet member 70 is curved in a convex shape on the back surface BS side of the seat pad 1 in each of the right-left direction and the extending direction LD (FIGS. 36 and 37).

In this manner, in the seat pad 1 (back pad 20), since the sheet member 70 curved in a convex shape on the back surface BS side is buried inside the resin foamed body 50, the resin foamed body 50 is divided in the thickness direction TD by the sheet member 70 in effect, a layer on the seated person side (front side) of the sheet member 70 in the resin foamed body 50 of the back pad 20 is more likely to deflect than a layer on the back side (rear side) of the sheet member 70 in the resin foamed body 50. Accordingly, for example, when the seated person sits and reclines on the back pad 20 and a load is applied from the seated person to the back pad 20, the layer on the seated person side (front side) of the sheet member 70 in the resin foamed body 50 of the back pad 20 deflects earlier than the layer on the back side (rear side) of the sheet member 70 in the resin foamed body 50, and thereafter, the layer on the back side (rear side) of the sheet member 70 in the resin foamed body 50 deflects, in other words, the back pad 20 deflects at two stages.

Accordingly, when the thickness and 25% hardness of the back pad 20 are constant, deflection of the back pad 20 can be increased as compared to a case in which no sheet member 70 is provided and a case in which the sheet member 70 has a flat shape, and thus stroke feeling that the seated person has when sitting can be increased, thereby providing improved seating comfort. In other words, when the thickness of the back pad 20 is reduced as compared to a case in which no sheet member 70 is provided and a case in which the sheet member 70 has a flat shape, an equivalent stroke feeling and seating comfort can be ensured, and thus favorable seating comfort can be obtained with the reduced thickness of the back pad 20.

Note that, in the present embodiment, since the sheet member has a shape curved in a convex shape on the back surface BS side in each of the right-left direction and the extending direction LD, the shape of the sheet member 70 fits the body shape of the seated person as compared to a case in which the sheet member 70 has a flat shape or has a cylindrical shape curved in a convex shape on the back surface BS side in only one of the right-left direction and the extending direction LD. Accordingly, the above-described effect such as seating comfort improvement can be further achieved.

Note that, at the sheet disposition step in the method for manufacturing the seat pad 1 according to each of the first to fourth embodiments described above, both end parts 70a of the sheet member in the right-left direction and both end parts 70b of the sheet member 70 in the extending direction LD are temporarily fastened to the lower-mold-piece shaping surface LS or the upper-mold-piece shaping surface US through the one or plurality of fasteners 260 as described above (FIGS. 8, 20, 28, and 38). The central part of the sheet member 70 is not temporarily fastened through the fasteners 260.

Accordingly, in the seat pad 1 according to each of the first to fourth embodiments described above, as described above, the plurality of buried members (second fastener components) 262 buried in the resin foamed body 50 each contact a surface of the sheet member 70 on any one side, both end parts 70a of the sheet member 70 in the right-left direction and both end parts 70b of the sheet member in the extending direction LD each overlap with one or the plurality of buried members 262 in planar view of the seat pad 1, the plurality of reaching concave parts 51 opened at the surface FS of the seat pad 1 on the seated person side or the back surface BS thereof and extending to the sheet member 70 are formed in the resin foamed body and the plurality of buried members 262 buried in the resin foamed body 50 face the respective reaching concave parts 51 through the sheet member 70 (FIGS. 2 to 5, FIGS. 17 to 19, FIGS. 25 to 27, and FIGS. 35 to 37). In planar view of the seat pad 1, the central part of the sheet member 70 does not overlap with buried member 262 nor the reaching concave parts 51.

Accordingly, at the sheet disposition step in manufacturing of the seat pad 1, the positions of the four end parts 70a and 70b of the sheet member 70 are fixed but the position of the central part of the sheet member 70 is not fixed, and thus at the subsequent foaming step, the sheet member 70 is more likely to deform into a shape curved in a convex shape on the back surface BS side in each of the right-left direction and the extending direction LD as the foaming resin material 50' disposed at the space between the lower-mold-piece shaping surface LS and the sheet member 70 expands. Accordingly, the curved shape of the sheet member 70 in the seat pad 1 obtained after the manufacturing is more favorable, and thus further improved seating comfort of the seat pad 1 can be obtained.

Note that, in a state in which the sheet member 70 is temporarily fastened through the plurality of fasteners 260 at the sheet disposition step in manufacturing of the seat pad 1, a distance d (FIG. 8) from the outer edge of the sheet member 70 to the fastener 260 at a position most separated from the outer edge of the sheet member 70 among the plurality of fasteners 260 in a planar view of the foaming mold 200 is preferably equal to or shorter than 15 mm, more preferably equal to or shorter than 10 mm. Similarly, a distance d (FIG. 2) from the outer edge of the sheet member 70 to a buried member 262 at a position most separated from the outer edge of the sheet member 70 among the plurality of buried members (second fastener components) 262 buried in the seat pad 1 in planar view of the seat pad 1 is preferably equal to or shorter than 15 mm, more preferably equal to or shorter than 10 mm.

In the method for manufacturing the seat pad 1 according to each of the first to fourth embodiments described above, as described above, at the sheet disposition step, at least one of both end parts 70a of the sheet member 70 in the right-left direction is temporarily fastened to the convex part 250 of the foaming mold 200 through the corresponding some of the fasteners 260 at a plurality of positions separated from each other in the extending direction LD, and/or at least one of both end parts 70b of the sheet member 70 in the extending direction LD is temporarily fastened to the convex part 250 of the foaming mold 200 through the corresponding some of the fasteners 260 at a plurality of positions separated from each other in the right-left direction. None of the four end parts 70a and 70b of the sheet member 70 is entirely temporarily fastened in a linear manner.

Accordingly, in the seat pad 1 according to each of the first to fourth embodiments described above, as described above, in planar view of the seat pad 1, at least one of the end parts 70a and 70b of the sheet member 70 in the right-left direction overlaps with the corresponding some of the buried members 262 at a plurality of positions separated from each other in the extending direction LD, and/or at least one of both end parts 70b of the sheet member 70 in the extending direction LD overlaps with the corresponding some of the buried members 262 at a plurality of positions separated from each other in the right-left direction.

In this manner, since the four end parts 70a and 70b of the sheet member 70 are each temporarily fastened in a point-like manner at a plurality of places at the sheet disposition step in manufacturing of the seat pad 1, the sheet member 70 is more likely to deform into a shape curved in a convex shape on the back surface BS side in each of the right-left direction and the extending direction LD as the foaming resin material 50' disposed at the space between the lower-mold-piece shaping surface LS and the sheet member 70 expands at the subsequent foaming step as compared to a case in which the four end parts 70a and 70b of the sheet member 70 are continuously (linearly) temporarily fastened. Accordingly, the curved shape of the sheet member 70 in the seat pad 1 obtained after the manufacturing is more favorable, and thus further improved seating comfort of the seat pad 1 can be obtained. Moreover, each fastener 260 can have a small size, and thus improved manufacturability can be obtained.

In the method for manufacturing the seat pad 1 according to each of the first to fourth embodiments described above, as described above, both end parts 70a of the sheet member 70 in the right-left direction and both end parts 70b of the sheet member 70 in the extending direction LD are temporarily fastened through the one or plurality of fasteners 260 to the convex part 250 provided at the lower-mold-piece shaping surface LS or the upper-mold-piece shaping surface US at the sheet disposition step. In this manner, since the four end parts 70a and 70b of the sheet member 70 are temporarily fastened to the convex part 250 provided at the lower-mold-piece shaping surface LS or the upper-mold-piece shaping surface US at the sheet disposition step, the sheet member 70 can be reliably disposed at a position separated by a predetermined distance from the lower-moldpiece shaping surface LS or the upper-mold-piece shaping surface US, and accordingly, the curved shape of the sheet member 70 obtained at the subsequent foaming step is more favorable, and thus further improved seating comfort of the seat pad 1 can be obtained.

However, at the sheet disposition step, the four end parts 70*a* and 70*b* of the sheet member 70 may be directly temporarily fastened to the lower-mold-piece shaping surface LS or the upper-mold-piece shaping surface US through the one or plurality of fasteners 260. In this case, the first fastener component 261 of each fastener 260 is fixed to the lower-mold-piece shaping surface LS or the upper-mold-piece shaping surface US. The positions of the four end parts 70*a* and 70*b* of the sheet member 70 in the thickness direction TD may be adjusted by adjusting the length of each first fastener component 261 in the thickness direction TD.

In the method for manufacturing the seat pad 1 according to each of the first and fourth embodiments described above, as described above, the ridges 252*a* and 252*b* as the convex part 250 are provided at the lower-mold-piece shaping surface LS of the foaming mold 200, and the sheet member 70 is temporarily fastened to the ridges 252*a* and 252*b* through the fasteners 260 at the sheet disposition step.

Accordingly, in the seat pad 1 according to each of the first and fourth embodiments described above, as described above, at least some of the plurality of buried members 262 are provided at positions overlapping with the grooves 52*a* and 52*b* provided at the surface FS of the seat pad 1 on the seated person side in planar view of the seat pad 1.

A groove at which an attachment for attaching a top skin is disposed is provided at a surface of a typical seat pad on the seated person side in conventional cases, but with the above-described configuration, a ridge for shaping the groove can be effectively utilized to reliably dispose the sheet member 70 at a position separated by a predetermined distance from the lower-mold-piece shaping surface. Accordingly, no convex part 250 dedicated to disposition of the sheet member 70 in the foaming mold 200 needs to be provided, and thus improved manufacturability can be obtained.

In the method for manufacturing the seat pad 1 according to each of the first to fourth embodiments described above, as described above, each fastener 260 is fixed to the convex part 250 of the foaming mold 200 and includes the first fastener component 261 made of one of a metal and a magnet, and the second fastener component 262 that is made of the other of a metal and a magnet and together with the first fastener component 261 sandwiches the sheet member 70 at the sheet disposition step, and at the demolding step, the first fastener component 261 remains on the foaming mold 200 side, and the second fastener component 262 remains inside the resin foamed body 50.

Accordingly, in the seat pad 1 according to each of the first to fourth embodiments described above, as described above, the plurality of buried members (second fastener components) 262 made of a metal or a magnet and buried in the resin foamed body 50 each contact a surface of the sheet member 70 on any one side, the plurality of reaching concave parts 51 opened at the surface FS of the seat pad 1 on the seated person side or the back surface BS thereof and extending to the sheet member 70 are formed in the resin foamed body and the plurality of buried members 262 buried in the resin foamed body 50 face the respective reaching concave parts 51 through the sheet member 70 (FIGS. 2 to 5, FIGS. 17 to 19, FIGS. 25 to 27, and FIGS. 35 to 37).

In this manner, at the sheet disposition step, the sheet member is temporarily fastened by being sandwiched with magnetic force acting between the first fastener component 261 and the second fastener component 262 of each fastener 260, and thus the temporary fastening can be easily performed again as necessary, and at the demolding step, demolding can be easily performed only by separating the second fastener component 262 from the first fastener component 261 against magnetic force acting between the first fastener component 261 and the second fastener component 262. Thus, improved manufacturability can be obtained.

Note that, in this case, the magnet of which any one of the first fastener component 261 and the second fastener component 262 of each fastener 260 is made is preferably, for example, a neodymium magnet because of its strong magnetic force. The metal of which the other of the first fastener component 261 and the second fastener component 262 of the fastener 260 is made preferably has a magnet attractive property (ferromagnetic body) and is preferably, for example, iron.

However, each fastener 260 is not limited to that described above but may have an optional configuration with which the sheet member 70 can be temporarily fastened (detachably fixed) to the foaming mold 200.

For example, in the illustrated example, each first fastener component 261 has a column shape, and each second fastener component (buried member) 262 has a plate shape, but the first fastener component 261 and the second fastener component (buried member) 262 may have optional shapes. For example, each fastener 260 may have a clip-type or hook-type configuration that does not use magnetic force. Each fastener 260 may include only the first fastener component 261 that remains on the foaming mold 200 side at the demolding step, and in this case, no second fastener component (buried member) 262 is provided inside the resin foamed body 50 obtained after the demolding step. Alternatively, each fastener 260 may include only the second fastener component (buried member) 262 that remains inside the resin foamed body 50 at the demolding step. The material of which each member (the first fastener component 261 and/or the second fastener component 262) included in each fastener 260 is made may be a material other than a metal and a magnet and may be, for example, resin.

In the seat pad 1 (cushion pad 10) according to each of the first to third embodiments described above, at least part of the sheet member 70 preferably overlaps with the main pad part 11 in planar view of the cushion pad 10 as in the examples of FIGS. 2, 17, and 25, more preferably overlaps with the under-hip part 11*h*. In this case, the curved shape of the sheet member 70 excellently fits the shape of the hip region of the seated person sitting on the cushion pad 10, and thus further improved seating comfort of the seat pad 1 can be obtained.

At the same viewpoint, in the method for manufacturing the seat pad 1 (cushion pad 10) according to each of the first to third embodiments, at least part of the sheet member 70 being temporarily fastened through the fasteners 260 preferably overlaps with the main-pad-part shaping surface 211S in planar view of the cushion-pad foaming mold 210 as in the examples of FIGS. 8, 20, and 28, more preferably overlaps with the under-hip-part shaping surface 211*h*S.

In the seat pad 1 (back pad 20) according to the fourth embodiment described above, at least part of the sheet member 70 preferably overlaps with the main pad part 21 in planar view of the back pad 20 as in the example of FIG. 35. In this case, the curved shape of the sheet member 70 excellently fits the shape of the back of the seated person reclining on the back pad 20, and thus further improved seating comfort of the seat pad 1 can be obtained.

At the same viewpoint, in the method for manufacturing the seat pad 1 (back pad 20) according to the fourth embodiment, at least part of the sheet member 70 being temporarily fastened through the fasteners 260 preferably overlaps with the main-pad-part shaping surface 221S in planar view of the back-pad foaming mold 220 as in example of FIG. 38.

In each of the first to fourth embodiments described above, the sheet member 70 has a mesh shape having a large number of holes 72. Accordingly, seating comfort of the seat pad 1 can be improved as compared to a case in which the sheet member 70 has a continuous sheet shape with no holes 72. Moreover, as in the first, second, and fourth embodiments described above, the foaming resin material 50' that is liquid can be disposed on the lower-mold-piece shaping surface LS by being injected from above the sheet member 70 and transmitted through the sheet member 70 in the foaming process in manufacturing of the seat pad 1. Accordingly, the foaming resin material 50' can be injected and shaped through one stage without a divided stage for each side of the sheet member 70 unlike a case in which the sheet member 70 has a continuous sheet shape, and thus improved manufacturability can be obtained.

Note that, to facilitate transmission of the foaming resin material 50' that is liquid through the sheet member 70 in the foaming process, the diameter of each hole 72 (FIGS. 6 and 7) in a planar view of the sheet member 70 is preferably equal to or larger than 1 mm, more preferably equal to or larger than 3 mm. In addition, to facilitate upward pressing of the sheet member 70 as the foaming resin material 50' that is liquid expands in the foaming process, the diameter of each hole 72 (FIGS. 6 and 7) in planar view of the sheet member 70 is preferably equal to or shorter than 25 mm, more preferably equal to or shorter than 22 mm.

The "diameter of each hole 72 in planar view of the sheet member 70" is the diameter of a circumscribed circle of the hole 72 in planar view of the sheet member 70 when the hole 72 has a non-circular (in the illustrated example, rectangular) shape as in the examples of FIGS. 6 and 7.

For example, to facilitate deformation of the sheet member 70 in the foaming process and improve seating comfort of the seat pad 1 and durability of the sheet member 70, the distance between the holes 72 in planar view of the sheet member 70 (which is the diameter of each string 71 in the case of the example of FIG. 6) is preferably 1 to 3 mm approximately.

However, the sheet member 70 may have a continuous sheet shape with no holes 72.

In the seat pad 1 according to each of the first to fourth embodiments described above, the sheet member 70 is preferably disposed closer to the back surface BS of the seat pad 1 to improve seating comfort. Specifically, as in the examples illustrated in FIGS. 4 and 5, FIGS. 18 and 19, FIGS. 26 and 27, and FIGS. 36 and 37, an apex of the curved shape of the sheet member 70 on the back surface BS side is preferably closer to the back surface BS of the seat pad 1 than the surface FS of the seat pad 1 on the seated person side in the thickness direction TD. Note that a stroke feeling cannot significantly increased with a too short distance from the apex of the curved shape of the sheet member 70 on the back surface BS side to the back surface BS of the seat pad 1 in the thickness direction TD (in other words, the shortest distance from the sheet member 70 to the back surface BS of the seat pad 1 in the thickness direction TD), and thus the distance is preferably 3 mm or longer, more preferably 5 mm or longer.

Similarly, in the method for manufacturing the seat pad 1 according to each of the first to fourth embodiments described above, the sheet member 70 after having deformed into a curved shape in the foaming mold 200 at the foaming step is preferably disposed closer to the upper-mold-piece shaping surface US. Specifically, as in the examples illustrated in FIGS. 15 and 16, FIGS. 23 and 24, FIGS. 33 and 34, and FIGS. 39 and 40, an apex of the curved shape of the sheet member 70 on the upper-mold-piece shaping surface US side after deformation into the curved shape in the foaming mold 200 at the foaming step is preferably closer to the upper-mold-piece shaping surface US than the lower-mold-piece shaping surface LS in the thickness direction TD. In addition, the distance from the apex of the curved shape of the sheet member 70 on the upper-mold-piece shaping surface US side to the upper-mold-piece shaping surface US in the thickness direction TD after deformation into the curved shape in the foaming mold 200 at the foaming step (in other words, the shortest distance from the sheet member 70 to the upper-mold-piece shaping surface US in the thickness direction TD) is preferably 3 mm or longer, more preferably 5 mm or longer.

Note that the position of the sheet member 70 in the thickness direction TD can be adjusted by, for example, adjusting the length of the first fastener component 261 of each fastener 260 at the sheet disposition step.

Note that, in the seat pad 1 of each above-described example, at least the central part of the sheet member 70 is curved in a convex shape on the back surface BS side of the seat pad 1 in each of the right-left direction and the extending direction LD, but the present disclosure is not limited thereto. In the seat pad 1 of each above-described example, at least the central part of the sheet member 70 only needs to be curved in a convex shape on the back surface BS side of the seat pad 1 at least in the extending direction LD but may not be curved in the right-left direction. For example, in the seat pad 1, at least the central part of the sheet member 70 may be curved in a substantially cylindrical shape that is convex on the back surface BS side of the seat pad 1 only in the extending direction LD. In such a case as well, the sheet member 70 has a shape along the body shape of the seated person, and thus seating comfort of the seat pad 1 can be improved.

Similarly, in the method for manufacturing the seat pad 1 of each above-described example, at the foaming step, at least the central part of the sheet member 70 deforms into a shape curved in a convex shape on the upper-mold-piece shaping surface US side in each of the right-left direction and the extending direction LD, but the present disclosure is not limited thereto. In the method for manufacturing the seat pad 1 of each above-described example, at least the central part of the sheet member 70 only needs to deform into a shape curved in a convex shape on the upper-mold-piece shaping surface US side at least in the extending direction LD but may not be curved in the right-left direction. For example, in the seat pad 1, at least the central part of the sheet member 70 may deform into a shape curved in a substantially cylindrical shape that is convex on the upper-mold-piece shaping surface US side only in the extending direction LD. This can be achieved by, for example, temporarily fastening only both end parts 70b of the sheet member 70 in the extending direction LD through the one or plurality of fasteners 260 at the sheet disposition step. In such a case as well, the sheet member in the seat pad 1 obtained after the manufacturing has a shape along the body shape of the seated person, and thus seating comfort of the seat pad 1 can be improved.

In the method for manufacturing the seat pad 1 of each above-described example, at the foaming step, part of the sheet member 70 other than places temporarily fastened by the fasteners 260 is pressed upward to the upper-mold-piece shaping surface US side (upper side) as the foaming resin material 50' disposed at the space between the lower-mold-piece shaping surface LS and the sheet member 70 gradually expands, and accordingly, at least the central part of the sheet member 70 deforms into a curved shape, but the present disclosure is not limited thereto. For example, in the method for manufacturing the seat pad 1 of each above-described example, at the sheet disposition step before the foaming step, the sheet member may be disposed in the foaming mold 200 while being bent in a desired curved shape (at least the central part of the sheet member 70 has a shape curved in a convex shape on the upper-mold-piece shaping surface US side at least in the extending direction LD) through the fasteners 260 and/or another fixer (such as a propping bar) in advance. In this case, at the subsequent foaming step, only the neighborhood of the sheet member 70 is preferably filled with the foaming resin material 50' while the shape of the sheet member 70 is not changed.

EXAMPLES AND COMPARATIVE EXAMPLES

Subsequently, examples and comparative examples of a seat pad of the present disclosure will be described below with reference to FIGS. 41 and 42.

Comparative Example 1 and Comparative Example 2

Figure 41:
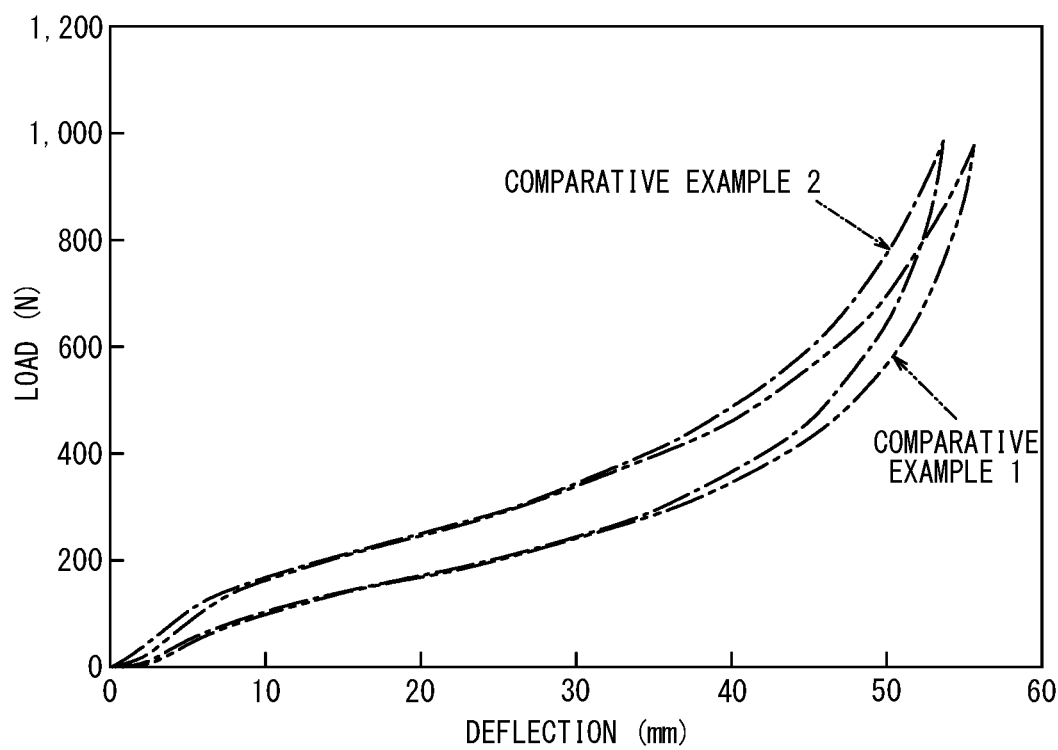
FIG. 41 is a drawing illustrating test results of seat pads of Comparative Examples 1 and 2 of the present disclosure.

FIG. 41 illustrates a result (compression deflection curve) of a compression test performed on a seat pad (cushion pad) according to each of Comparative Examples 1 and 2 of the present disclosure. For each compression deflection curve in FIG. 41, the horizontal axis represents deflection (mm) in the up-down direction, and the vertical axis represents a load (N). In the compression test, a test body of each of Comparative Examples 1 and 2 was compressed by applying a load in the up-down direction (thickness direction).

The test bodies of Comparative Examples 1 and 2 had the same outer dimension and the same 25% hardness (N). The "25% hardness (N)" was measured in accordance with the JIS K6400-1 D method.

The test body of Comparative Example 1 was made of only a resin foamed body and included no sheet member inside. The resin foamed body was poly urethane foam.

The test body of Comparative Example 2 included a resin foamed body, and a sheet member buried in the resin foamed body. The resin foamed body was poly urethane foam. The sheet member had a mesh shape as in the example illustrated in FIG. 6 and entirely had a flat shape.

In each compression deflection curve in FIG. 41, the upper curve is a curve at compression, and the lower curve is a curve at restoration. As understood from FIG. 41, with Comparative Example 2, deflection at compression was smaller and the gradient at high load application was larger than with Comparative Example 1. Thus, with Comparative Example 2, a bottom touching feeling was larger, a stroke feeling is smaller, and seating comfort was lower than with Comparative Example 1.

Comparative Example 3 and Example 1

Figure 42:
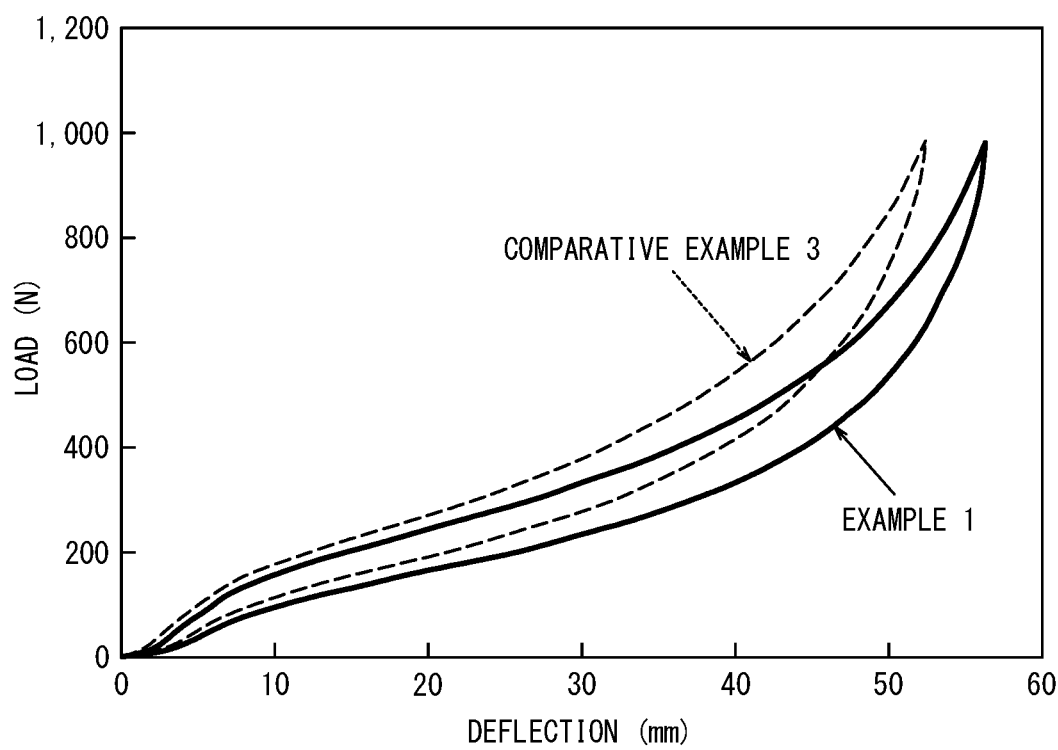
FIG. 42 is a drawing illustrating test results of seat pads of Comparative Example 3 and Example 1 of the present disclosure.

FIG. 42 illustrates a result (compression deflection curve) of a compression test performed on a seat pad (cushion pad) according to each of Comparative Example 3 and Example 1 of the present disclosure. For each compression deflection curve in FIG. 42, the horizontal axis represents deflection (mm) in the up-down direction, and the vertical axis represents a load (N). In the compression test, a test body of each of Comparative Example 3 and Example 1 was compressed by applying a load in the up-down direction (thickness direction).

The test bodies of Comparative Example 3 and Example 1 had the same outer dimension and the same 25% hardness.

The test body of Comparative Example 3 was made of only a resin foamed body and included no sheet member inside. The resin foamed body was poly urethane foam.

The test body of Example 1 included a resin foamed body, and a sheet member buried in the resin foamed body. The resin foamed body was poly urethane foam. The sheet member had a mesh shape as in the example illustrated in FIG. 6 and was substantially entirely curved in a convex shape on the back surface side of the seat pad in each of the right-left direction and the extending direction of the cushion pad of the test body as in the examples of FIGS. 2 to 5.

As understood from FIG. 42, with Example 1, deflection at compression was larger and the gradient at high load application was smaller than with Comparative Example 3. Thus, with Example 1, a bottom touching feeling was smaller, a stroke feeling was favorable, and seating comfort was more excellent than with Comparative Example 3.

INDUSTRIAL APPLICABILITY

A seat pad of the present disclosure, and a seat pad manufactured by a seat pad manufacturing method of the present disclosure are preferably used for an optional vehicle seat and an optional vehicle seat pad, and are particularly preferably used for car seat and a car seat pad.

REFERENCE SIGNS LIST

1 seat pad
10 cushion pad
11 main pad part (seating part)
11*t* femoral region-placed part
11*h* under-hip part
12 side pad part
13 back-pad opposing part
20 back pad
21 main pad part
22 side pad part
30 top skin
40 head rest
50 resin foamed body
50' foaming resin material
51 reaching concave part (concave part)
52*a*, 52*b* groove
53 inner concave part
54 back concave part
61 coupling hole
70 sheet member
70*a* end part in right-left direction
70*b* end part in extending direction
71 string
72 hole
100 carseat
200 foaming mold for seat pad
200L lower mold piece
LS lower-mold-piece shaping surface
200U upper mold piece US upper-mold-piece shaping surface
200UI core
210 cushion-pad foaming mold
211S main-pad-part (seating-part) shaping surface
211tS femoral-region-placed-part shaping surface
211hS under-hip-part shaping surface
212S side-pad-part shaping surface
213S back-pad-opposing-part shaping surface
220 back-pad foaming mold
221S main-pad-part (seating-part) shaping surface
222S side-pad-part shaping surface
250 convex part
252a, 252b ridge
253 inner convex part
254 back convex part
260 fastener
261 first fastener component
262 buried member/second fastener component
TD thickness direction
LD extending direction
FF surface (front surface) on seated person side
BS back surface
H injection head

The invention claimed is:

1. A seat pad manufacturing method comprising:
a sheet disposition step of disposing a sheet member inside a foaming mold for shaping a seat pad;
a foaming step of injecting a foaming resin material into the foaming mold and foaming a resin foamed body through mold clamping after the sheet disposition step; and
a demolding step of demolding the resin foamed body in a state in which the sheet member is buried in the resin foamed body, wherein
the foaming mold includes a lower mold piece having a lower-mold-piece shaping surface for shaping a surface of the seat pad on a seated person side, and an upper mold piece having an upper-mold-piece shaping surface for shaping a back surface of the seat pad, and
when a direction orthogonal to a right-left direction and a thickness direction of the seat pad is referred to as an extending direction of the seat pad,
in the sheet disposition step, both end parts of the sheet member in the right-left direction and both end parts of the sheet member in the extending direction are each temporarily fastened to the lower-mold-piece shaping surface or the upper-mold-piece shaping surface through one or a plurality of fasteners, and
in the foaming step, the foaming resin material is injected into a space between the lower-mold-piece shaping surface and the sheet member, and at least a central part of the sheet member deforms into a shape curved in a convex shape on the upper-mold-piece shaping surface side in each of the right-left direction and the extending direction as the sheet member is pressed upward to the upper-mold-piece shaping surface side through expansion of the foaming resin material.

2. The seat pad manufacturing method according to claim 1, wherein, in the sheet disposition step, both end parts of the sheet member in the right-left direction and both end parts of the sheet member in the extending direction are each temporarily fastened to a convex part provided on the lower-mold-piece shaping surface or the upper-mold-piece shaping surface through one or a plurality of fasteners.

3. The seat pad manufacturing method according to claim 2, wherein in the sheet disposition step,
at least one of the both end parts of the sheet member in the right-left direction is temporarily fastened to the convex part of the foaming mold through corresponding some of the fasteners at a plurality of positions separated from each other in the extending direction, and/or
at least one of the both end parts of the sheet member in the extending direction is temporarily fastened to the convex part of the foaming mold through corresponding some of the fasteners at a plurality of positions separated from each other in the right-left direction.

4. The seat pad manufacturing method according to claim 2, wherein
a ridge as the convex part is provided on the lower-mold-piece shaping surface, and
in the sheet disposition step, the sheet member is temporarily fastened to the ridge through the fasteners.

5. The seat pad manufacturing method according to claim 3, wherein
a ridge as the convex part is provided on the lower-mold-piece shaping surface, and
in the sheet disposition step, the sheet member is temporarily fastened to the ridge through the fasteners.

* * * * *